United States Patent
Rieger et al.

(10) Patent No.: US 10,336,550 B2
(45) Date of Patent: Jul. 2, 2019

(54) SUPPORT STRUCTURE AND METHOD FOR SUPPORTING AN ENCLOSED BELT CONVEYOR

(71) Applicant: SANDVIK INTELLECTUAL PROPERTY AB, Sandviken (SE)

(72) Inventors: Hubert Rieger, Mobersdorf-Siedlung (AT); Stefan Dampfhofer, Eatten (AT)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 13 days.

(21) Appl. No.: 15/551,242

(22) PCT Filed: Feb. 16, 2015

(86) PCT No.: PCT/EP2015/053227
§ 371 (c)(1),
(2) Date: Aug. 15, 2017

(87) PCT Pub. No.: WO2016/131469
PCT Pub. Date: Aug. 25, 2016

(65) Prior Publication Data
US 2018/0029802 A1    Feb. 1, 2018

(51) Int. Cl.
| | |
|---|---|
| *B65G 41/00* | (2006.01) |
| *B65G 39/12* | (2006.01) |
| *B65G 15/08* | (2006.01) |
| *E21F 13/02* | (2006.01) |

(Continued)

(52) U.S. Cl.
CPC .......... *B65G 41/008* (2013.01); *B65G 15/08* (2013.01); *B65G 15/60* (2013.01); *B65G 39/125* (2013.01); *B65G 41/001* (2013.01); *E21F 13/02* (2013.01); *E21F 13/08* (2013.01); *E21F 13/083* (2013.01); *B65G 2201/045* (2013.01)

(58) Field of Classification Search
CPC ...... B65G 39/12; B65G 41/00; B65G 41/005; B65G 41/008; B65G 21/12; B65G 21/14
USPC .................................................. 198/300, 303
See application file for complete search history.

(56) References Cited

U.S. PATENT DOCUMENTS

| | | |
|---|---|---|
| 3,003,612 A | 10/1961 | Poundstone |
| 3,974,907 A | 8/1976 | Shaw et al. |

(Continued)

FOREIGN PATENT DOCUMENTS

| | | |
|---|---|---|
| CN | 2496823 Y | 6/2002 |
| CN | 101492120 A | 7/2009 |

(Continued)

*Primary Examiner* — James R Bidwell
(74) *Attorney, Agent, or Firm* — Corinne R. Gorski

(57) ABSTRACT

The disclosure relates to a support structure for supporting a belt of an enclosed belt conveyor between two transport units and a corresponding method. The support structure between two transport units includes a first end element having a main extension in a longitudinal direction, a width extension in a width direction orthogonal to the longitudinal direction, and a height extension in a height direction orthogonal to the longitudinal and the width direction. At least one guide assembly is arranged to engage opposite longitudinal edges of the belt. A first telescopic element is connected to the first end element, wherein an outer end of the first end element has a first end connector arranged to form a connection with a first transport unit.

19 Claims, 39 Drawing Sheets

(51) Int. Cl.
*B65G 15/60* (2006.01)
*E21F 13/08* (2006.01)

(56) References Cited

U.S. PATENT DOCUMENTS

| | | | | |
|---|---|---|---|---|
| 4,538,722 | A | * 9/1985 | Sumner | B65G 41/008 |
| | | | | 198/309 |
| 4,865,185 | A | 9/1989 | Bodimer | |
| 4,951,801 | A | * 8/1990 | Koike | G01D 5/24404 |
| | | | | 324/207.25 |
| 5,042,646 | A | 8/1991 | Beatty | |
| 5,911,300 | A | * 6/1999 | Mraz | B65G 41/008 |
| | | | | 198/303 |

FOREIGN PATENT DOCUMENTS

| | | |
|---|---|---|
| CN | 103241494 A | 8/2013 |
| WO | 2008067802 A1 | 6/2008 |
| WO | 2012129597 A1 | 10/2012 |
| WO | 2012149596 A1 | 11/2012 |
| WO | 2012159132 A1 | 11/2012 |

* cited by examiner

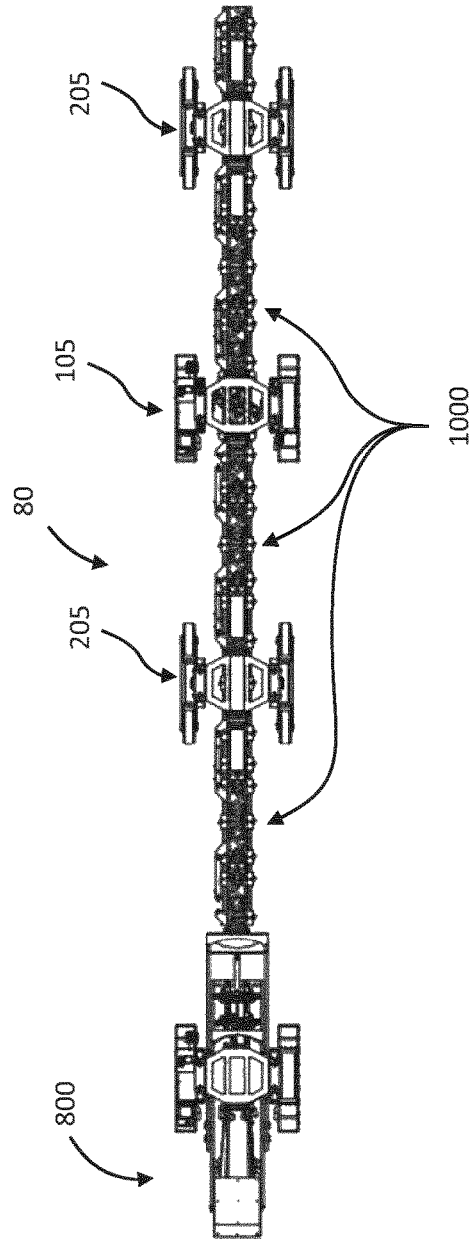
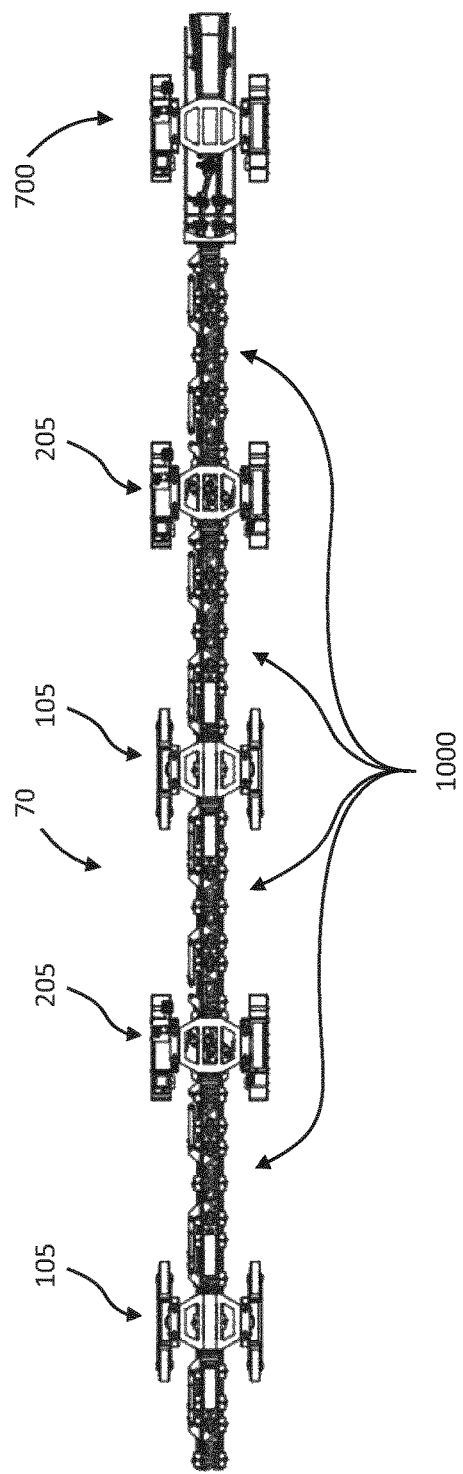
Fig. 3a
Fig. 3b

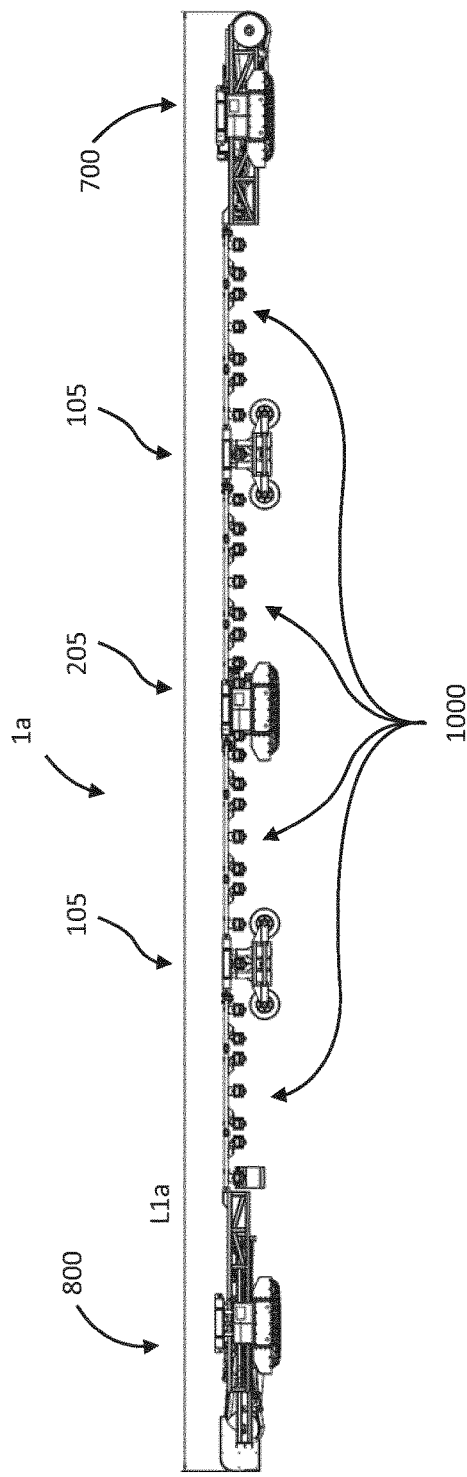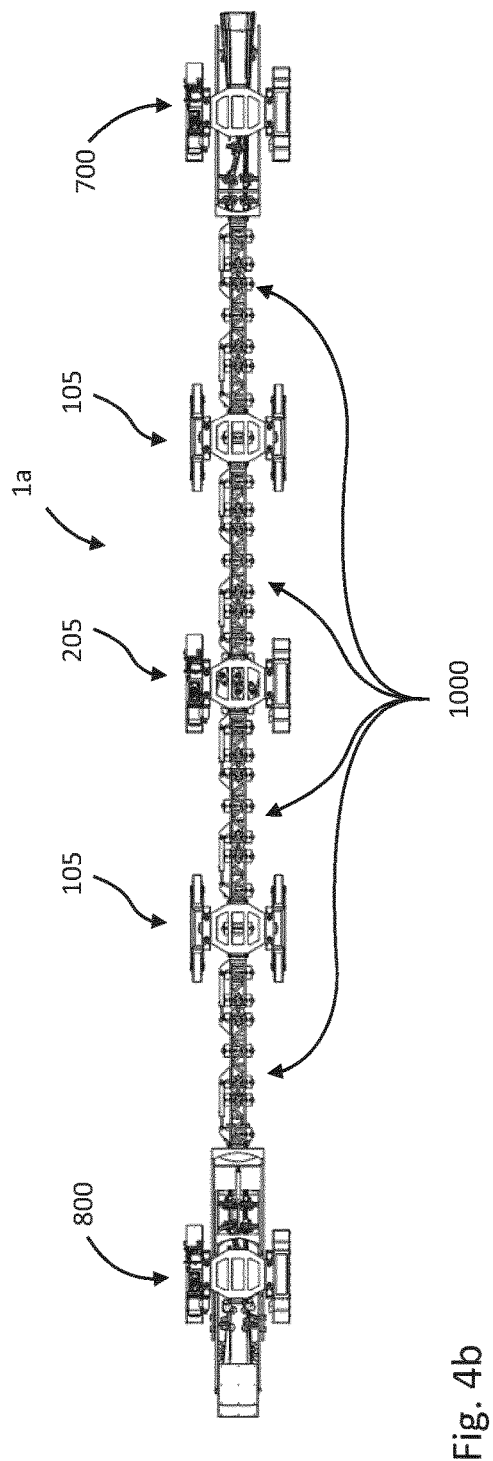
Fig. 4a
Fig. 4b

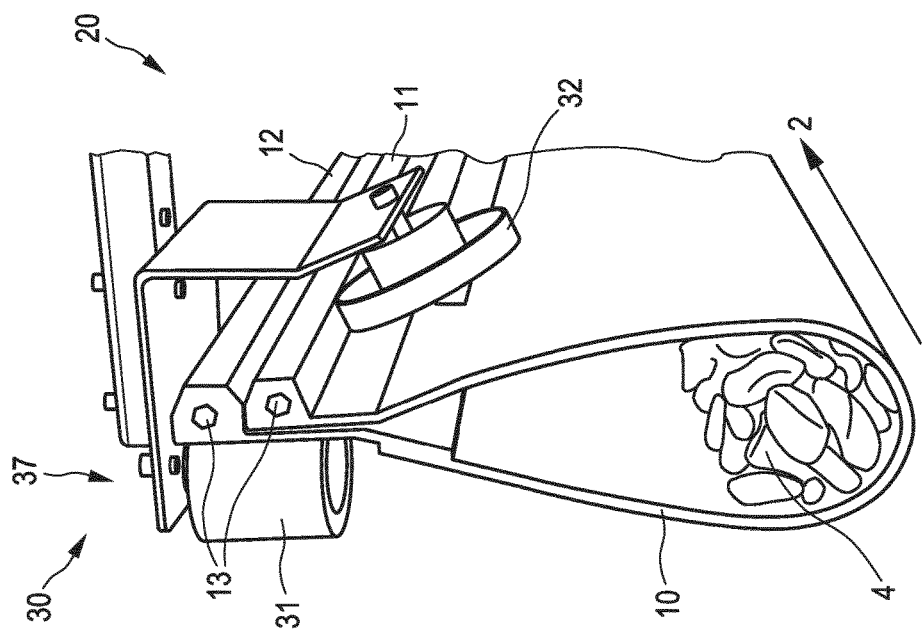

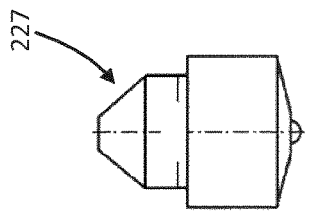
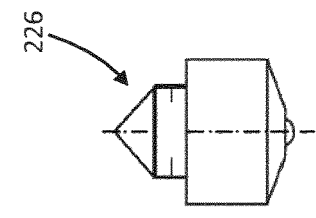
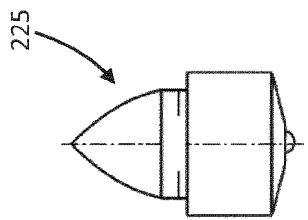
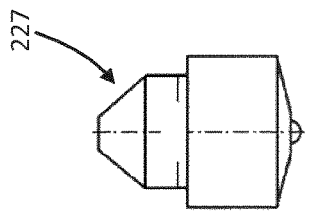
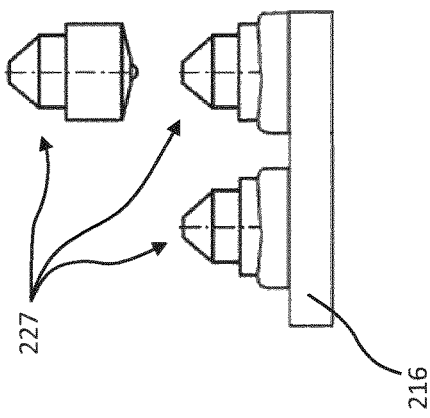
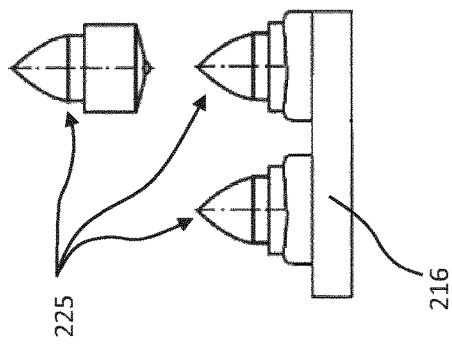
Fig. 15a  Fig. 15c  Fig. 15e
Fig. 15b  Fig. 15d  Fig. 15f

SUPPORT STRUCTURE AND METHOD FOR SUPPORTING AN ENCLOSED BELT CONVEYOR

RELATED APPLICATION DATA

This application is a § 371 National Stage Application of PCT International Application No. PCT/EP2015/053227 filed Feb. 16, 2015.

TECHNICAL FIELD

The invention relates to a support structure for supporting an enclosed belt conveyor between two transport units, the support structure extending between first and second ends. The invention further relates to a method for supporting an enclosed belt conveyor using said support structure.

BACKGROUND

In mining, it is generally an objective to transport fragmented material being mined by a cutting or mining device from a mining location, for example in a mining shaft under-ground, to a dispose location, for example a dump or a further conveyor inside or outside the mining shaft. Usually, a mining device, such as a drill, releases the drilled material in a fragmented form to a conveyor device, preferably a conveyor belt, through which the material is conveyed away from the mining location to a dispose location. At the dispose location, the material is usually disposed from the conveyor device. Since the path from mining location to dispose location will not always be straight an even, it is necessary to provide a mechanism to compensate for changes in direction of the conveyor belt.

Document US 2013/0334864 A1, for example, discloses a foldable conveyor to be used as part of a transport machine. The foldable conveyor has a first conveyor section and a second conveyor section pivotally connected to it, such as to pivot in an upward and downward direction relative to a substantially horizontal ground level by means of a complex pivoting mechanism. A disadvantage of this arrangement is its lack in flexibility and modularity, as the pivoting mechanism is permanently provided for a single application, and its complexity of said pivoting mechanism.

Document U.S. Pat. No. 5,749,452 A discloses an articulated mobile conveyor. The mobile conveyor includes a first section having first and second ends that are provided at a certain length from each other, a second section having first and second ends that are provided at a certain length from each other, and a ball joint that is connecting the second end of the first section to the first end of the second section for pivotal movement about a vertical and a horizontal axis. A disadvantage of this arrangement is also its lack in flexibility and, furthermore, in stability.

SUMMARY

It is therefore an object of the invention to provide a support structure and a method for supporting an enclosed belt conveyor, which reduce or eliminate one or several of the disadvantages of the prior art.

In particular, it is an object of the invention to provide a support structure and a method for supporting an enclosed belt conveyor, which increase the efficiency, stability, flexibility and/or modularity of the mining process and/or equipment. Further, it is an objection of the invention to provide a support structure and a method for supporting an enclosed belt conveyor, which reduce complexity of the mining process and/or equipment.

This object is achieved by a support structure for supporting an enclosed belt conveyor between two transport units, the support structure comprising: a first end element with a main extension in a longitudinal direction, a width extension in a width direction orthogonal to the longitudinal direction and a height extension in a height direction orthogonal to the longitudinal and the width direction, at least one guide assembly for engaging opposite longitudinal edges of a belt of an enclosed belt conveyor, a first telescopic element connected to the first end element, wherein an outer end of the first end element has a first end connector adapted to form a connection with a first transport unit, the connection allowing for rotation about an axis parallel to the width direction and about an axis parallel to the longitudinal direction, the first end element has an inner connector adapted to form a connection allowing for rotation about an axis parallel to the height direction, and the first telescopic element is arranged to form a connection with a second end element, a link element or a transport unit connected to the inner connector of the first end element.

Preferably, a support structure is a structure provided as a bridge between two transport units, for example, of a mobile haulage arrangement as described below. A transport unit in this case is arranged to form a ground support unit, i.e. a unit that may support the whole arrangement on the ground. Preferably, the support structure extends between a first end and a second end, whereby the first end and the second end are preferably connected to one of the two transport structures, respectively.

The support structure comprises a first end element. This first end element has a main extension in a longitudinal direction, a width extension in a width direction orthogonal to the longitudinal direction and a height extension in a height direction orthogonal to both, the longitudinal and the width direction. In a basic operation position of a mobile haulage arrangement comprising at least one support structure, the mobile haulage arrangement is used on a substantially horizontal ground. In this case, the longitudinal direction preferably is a direction along an axis that is substantially parallel to said substantially horizontal ground. Likewise, the width direction is preferably a direction along an axis that is substantially parallel to said substantially horizontal ground and extends orthogonal to the axis in the longitudinal direction. The height direction is the direction along an axis that is extending substantially orthogonal to the substantially horizontal ground and, accordingly, orthogonal to the longitudinal and the width direction, respectively. In the following, a reference to the longitudinal, width and height direction, respectively, refers to the respective axes indicating these directions, which are considered to be defined for a basic operation position of a mobile haulage arrangement provided on a substantially horizontal ground.

At least one guide assembly is provided that engages two opposite longitudinal edges of a belt of an enclosed belt conveyor. Preferably, the belt of an enclosed belt conveyor is arranged on the at least one guide assembly. A guide assembly consists of a plurality of guide rollers that are brought into friction contact with the enclosed belt conveyor. An enclosed belt conveyor comprises an endless conveyor belt for conveying loads, typically in the form of fragmented material, comprising two opposite longitudinal edges that are arranged along the whole length of the belt. Preferably, the term opposite is to be understood such that the two longitudinal edges are arranged on opposite sides of the belt relative to the conveying or return direction. When the belt is in a loading or discharge position, the edges preferably are spaced apart from each other to allow loads to be put onto the belt or to be discharged from the belt. When the belt is in a closed or conveying position, the two longitudinal edges of the belt are arranged in close proximity to one another. This spacing and enclosing is achieved by means of the respective guide assemblies guiding the belt of the enclosed belt conveyor in the respective positions.

A telescopic element is an element that is connected to the first end element. The telescopic element is arranged in a plane that is parallel to the plane that is formed by the longitudinal direction and the width direction. The telescopic element is further configured to be extendable and/or retractable in said plane.

In order to achieve a connection of the first end element with a first one of the two transport units, a first end connector is provided at an outer end of the first end element. This connector is configured such as to allow a rotation about a rotation axis that is parallel to the width direction. Further, the connector is also configured to allow a rotation about a rotation axis parallel to the longitudinal direction. As such, the connector preferably allows for two degrees of freedom in the rotation movement of the connection between the first transport unit and the support structure. Preferably, the telescopic element is arranged at or near the first end connector.

Additionally, the first end element comprises an inner connector that is configured to allow a rotation about a rotation axis that is parallel to the height direction. The first telescopic element is further configured to be connected to a further element, such as a second end element, a link element, or a transport unit. Thus, an element that is connected to the first end element via the inner connector will preferably also be in connective contact with the telescopic element. Preferably, the telescopic element is arranged closer to the first end connector than to the inner connector.

An advantage of the support structure as described herein is its capability to provide for a rotational movement of the elements connected to it about three rotation axes. In particular, the support structure enables to compensate for irregularities and height differences of the ground by rotating the connectors accordingly. Further, the support structure provides for a non-complex pivoting mechanism by using respective connectors. This provision of connectors also provides for flexibility and modularity of the arrangement.

In a preferred embodiment of the support structure, the first telescopic element is arranged to control a rotational movement about the inner connector of the first end element.

Preferably, the first telescopic element is configured to actuate a controlled rotational movement about the inner connector of the first end element. Accordingly, the first telescopic element may preferably also prevent a rotational movement if it is not desired. Finally, it is also preferable that the first telescopic element is configured to allow for a free, uncontrolled rotational movement about the inner connector if desired.

This embodiment has the advantage that it is possible to avoid undesired rotational movement about a certain rotation axis at the first end element. This embodiment allows for precisely controlling the rotational movement, in particular the extent to which a rotation is allowed or prevented. As a result, this embodiment further enhances stability and efficiency of the whole arrangement.

In a further preferred embodiment, the support structure comprises a second end element with a main extension in a longitudinal direction, a width extension in a width direction orthogonal to the longitudinal direction and a height extension in a height direction orthogonal to the longitudinal and the width direction, wherein an outer end of the second end element has a second end connector adapted to form a connection with a second transport unit, the connection allowing for rotation about an axis parallel to the width direction, and the second end element has an inner connector adapted to form a connection allowing for rotation about an axis parallel to the height direction.

Preferably, the support structure also comprises a second end element comprising extensions along respective extension directions similar to the first end element. The second end element is configured to be connected to the second one of the two transport units. In order to achieve this connection, the second end element is provided with a respective second end connector. Contrary to the first end connector, the second end connector only allows a rotation about an axis parallel to the width direction, i.e. provides one degree of freedom. Preferably, a rotation about an axis parallel the longitudinal direction is not provided for. Further, similar to the first end element, the second end element is provided with an inner connector that allows for a rotation about an axis parallel to the height direction.

Thus, the second end element is preferably implemented in a manner similar to that of the first end element, whereby the second end connector and the inner connector of the second end element preferably only allow for a rotation movement about two axes. Indeed, a rotation about a third axis is not necessary, as this rotation is already achieved by the connector of the first end element of the support structure. This reduces the complexity of the arrangement, in particular in relation to the connectors, and further enhances the overall stability of the arrangement.

In a preferred embodiment, the support structure further comprises a link element with a main extension in a longitudinal direction, a width extension in a width direction orthogonal to the longitudinal direction and a height extension in a height direction orthogonal to the longitudinal and the width direction; the link element having two opposite inner connectors, each inner connector being adapted to form a connection allowing for rotation about an axis parallel to the height direction.

A link element is a further element that may be inserted between the first end element and the second end element or between the first end element and a second transport unit. Preferably, the connection of the link element with the first end element is achieved by a first one of the two opposite inner connectors. Likewise, the connection of the link element with the second element or the second transport unit is preferably achieved by a second one of the two opposite inner connectors.

In order to maintain functionality of the inner connectors of the first and second end element, each inner connector, comprising the two opposite connectors, is preferably configured to provide a connection that allows for a rotational movement about an axis that is parallel to the height direction. Thus, the connection between the first end element, the link element and the second end element or the second transport unit is such that the first end element may, for example, be arranged in under a horizontal angle relative to the link element and the second end element or the second transport unit, such as to follow a bend along the conveying direction, whereas the link element and the second end element or the second transport unit may be provided along a straight line. Further, the link element may also be positioned under a horizontal angle relative to the first end element and/or the second end element or the second transport unit, respectively, due to such a bend. Since the link element is preferably rigid, the stability of the arrangement is not affected.

This embodiment has the advantage that even small curvatures/bends along the conveying direction may be provided for. Thus, the embodiment further enhances flexibility and efficiency of the arrangement, while at the same time maintaining the necessary stability.

The previous embodiment may be improved in that the support structure further comprises a second telescopic element connected to the second end element, wherein the second telescopic element is arranged to form a connection with the link element connected to the inner connector of the second end element.

Preferably, the second end element is also connected to a second telescopic element. This second telescopic element is also arranged and extendable and/or retractable in the plane that is parallel to the plane that is formed by the longitudinal direction and the width direction. By means of this second connective contact between the second end element and the element that is also connected to its inner connector, the stability of the arrangement is even further increased.

The previous improvement may be even further improved in that the second telescopic element is arranged to control a rotational movement about the inner connector of the second end element.

Preferably, the second telescopic element is also configured to actuate a controlled rotational movement about the inner connector of the first end element, i.e. a pivoting about an axis parallel to the height direction. The second telescopic element may also preferably prevent said rotational movement or allow for a free, uncontrolled rotational movement about the inner connector.

This embodiment has the advantage that it is possible to avoid undesired rotational movement about the rotation axis at the second end element. By means of this precise control of the rotational movement, the stability and efficiency of the arrangement may be enhanced.

In a further preferred embodiment, the support structure is characterized in that the first end connector is fixed against rotation about an axis parallel to the height direction, and/or the second end connector is fixed against rotation about an axis parallel to the height direction and/or an axis parallel to the longitudinal direction, and/or the inner connectors are fixed against rotation about an axis parallel to the width direction and/or an axis parallel to the longitudinal direction.

Preferably, the first end connector may also be fixed against horizontal pivoting, i.e. against a rotation about an axis parallel to the height direction. In this case, a horizontal movement may only be achieved by means of the inner connectors and/or the second end connector. Accordingly, it is also possible to fix the second end connector, alternatively or additionally, against a rotation about an axis parallel to the height direction.

If both, the first and second end connectors are fixed against rotation about this direction, the horizontal movement—the movement about the axis parallel to the height direction—is effected only by the inner connectors either connecting the first and second end element or connecting a link element to the first and second end element, respectively. Further, the inner connectors may be selectively fixed against rotation about an axis that is parallel to the axes indicating the width direction and/or the longitudinal direction respectively. In such a case, the inner connectors may be used to provide horizontal movement only. Alternatively or additionally, they may be used to provide a rotation either about an axis parallel to the width direction (vertical up- and down movement) or about an axis parallel to the longitudinal direction (vertical twisting movement).

This embodiment has the further advantage that the rotational properties of each connector may be selected in accordance with environmental parameters. Thus, it may be possible, for example, to prevent vertical twisting movement of the link elements in cases where an elevation of a certain slope on an otherwise even ground has to be covered. Likewise, it may be possible to allow for vertical twisting movement and prevent vertical up- and down movement of the link element when the ground does not have a slope, but is covered with irregularities. This embodiment thus provides for further flexibility, reliability and adjustment possibility to environmental influences, while at the same time providing necessary stability.

According to a preferred embodiment, the support structure is characterized in that the inner connectors of the first and second end elements are connected to each other, or the inner connector of the first end element is connected to one of the inner connectors of the link element and the inner connector of the second end element is connected to the other one of the inner connectors of the link element.

Preferably, the inner connectors may be used to connect either the first and second end element with each other or to connect the first and second end element to both sides of a link element. This further enhances the flexibility of the arrangement, in particular since both, size and stability may be hand-tailored to each situation.

In a further preferred embodiment, the support structure is characterized in that the first telescopic element is adapted to bridge at least one connection formed between two inner connectors and/or the second telescopic element is adapted to bridge at least one connection formed between two inner connectors.

Preferably, the first and second telescopic elements are provided such as to bridge a connection between either the first and second end element via the inner connector or between the first end element and the link element and/or the second element and the link element via the inner connectors, respectively. In this way, a relative movement of the elements connected by the telescopic elements may be initiated and/or limited. The telescopic elements preferably ensure that the arrangement remains stable and accordingly rigid, even while being moved.

This particular embodiment allows for an additional connection between the respective elements and a higher mobility of the arrangement. This enhances the stability, safety and flexibility of the arrangement.

According to a preferred embodiment, the support structure is characterized in that the first and/or the second telescopic element is a hydraulic cylinder.

Preferably, hydraulic cylinders are used as the first and/or second telescopic element. This has the advantage that the telescopic elements may be controlled by means of a hydraulic pressure. This is specifically beneficial if the support structure is implemented in a mobile haulage system comprising a drive arrangement as described herein, as, preferably, a single hydraulic system may be provided to drive all hydraulic components. A hydraulic cylinder has the further advantage of remaining in its current position, even if the power is cut off. As such, employing hydraulic cylinders as telescopic elements further enhances stability of the arrangement.

According to a further preferred embodiment, the support structure is characterized in that the first and/or the second telescopic element is adapted to register a distance by which it is retracted and/or extended. In this way, a history of retracting and extending of the telescopic elements can be stored.

In a preferred embodiment, the support structure is characterized in that at least one guide assembly is arranged at at least one connection formed between two inner connectors such that the guide assembly is rotatable about an axis parallel to the height direction.

Preferably, this guide assembly is used to guide the enclosed belt conveyor, for example, in the direction of a drive arrangement as described herein. The guide assembly is preferably arranged such that it will rotate—together with the rotation of the connector)—about an axis parallel to the height direction. By means of this arrangement, the guide assembly is capable of guiding the enclosed belt conveyor more reliably, when the support structure performs a horizontal movement, for example in case of a bend along the conveying direction. In particular, the guide assembly is capable of providing consistent guiding, even during bending of the enclosed belt conveyor, thereby further enhancing flexibility and stability of the arrangement, while at the same time increasing reliability.

The previous embodiment may be improved such that the support structure is characterized in that the at least one guide assembly arranged at at least one connection formed between two inner connectors comprises at least two sets of guide rollers, wherein each set of guide rollers is adapted for engaging opposite longitudinal edges of a belt of an enclosed belt conveyor.

Preferably, these guide rollers are engaged with the two opposite longitudinal edges of the belt by being brought into friction contact with the belt. These guide rollers may be idle or they may be drive rollers driven by a driving arrangement as described herein. In case they are provided as idle, the guide rollers will be actuated to rotate around their center axis by a friction force that is transferred from the (moving) enclosed belt conveyor to the guide rollers. In case they are provided as drive rollers, they will drive due to an actuating force transferred from respective drive units to the drive rollers, thereby driving the belt by means of a friction force transfer. This improvement thus provides for a higher flexibility and efficiency of the arrangement.

In accordance with a further embodiment, the support structure is characterized in that the first and/or the second end connector is adapted to limit the rotation about the axis parallel to the width direction and/or that the first end connector is adapted to limit the rotation about the axis parallel to the longitudinal direction.

Preferably, the rotation about the axis parallel to the width direction and/or the longitudinal direction, respectively, may not be fully prevented, such as to achieve a rigid connection, but it may be limited to a certain degree of rotation. This degree of rotation may be different for both axes or it may be the same. Preferably, the degree of rotation is selected in accordance with the conditions at the mining site. Alternatively or additionally, it may be selected in accordance with further influences, such as maintenance requirements. This limitation may be performed for only the first end connector or only the second end connector or both. Likewise, it may differ between the first end connector and the second end connector. It may be permanent, by using an accordingly manufactures connector as first and/or second end connector, or it may be variable, by using an adjustable connector as first and/or second end connector.

This embodiment ensures that the rigidity of the arrangement may be adjusted, such as to prevent dangerous situations, in which the arrangement may move in a manner that would lead to damage to the enclosed belt conveyor and/or a person close to it. Thus, this embodiment enhances the overall safety of the arrangement.

According to a further embodiment, the support structure is characterized in that the inner connectors and/or the first and/or the second telescopic element and/or the at least one guide assembly arranged at at least one connection formed between two inner connectors is adapted to limit the rotation about an axis parallel to the height direction.

Preferably, the rotation of the inner connectors about an axis parallel to the height direction, i.e. the horizontal rotation, may also be limited. Such a limitation may be achieved by the inner connectors themselves, which may be provided such as to have a certain limitation permanently or such as to have a variable limitation value. It may also be achieved by the telescopic elements by means of their retraction and/or extension. Further to that, a combination of both elements may be used to achieve the limitation. For example, an inner connector may be used which allows for a certain range of rotation and the telescopic element may be used to adjust the rotation in accordance with the desired limitation within this certain range. This embodiment further enhances safety and flexibility of the arrangement.

In a preferred embodiment, the support structure is characterized in that the first end element and/or the second end element and/or the link element is a framework element with longitudinal and width extensions exceeding the height extension. Preferably, the dimensions of the first and/or second end element and/or the link element are such that the length of the longitudinal direction exceeds the length of the height direction and the length of the width direction also exceeds the length of the height direction. The length of the longitudinal direction may also exceed the length of the width direction, thereby achieving a support structure that has the shape of an elongated frame.

In a further preferred embodiment, the support structure is characterized in that the support structure is free of ground supporting elements. Preferably, the support structure is instead supported by the transport units arranged at the first and second end, respectively. This embodiment achieves a signification reduction of components and, thus, achieves a reduction in costs and complexity.

In accordance with a further preferred embodiment, the support structure is characterized in that the combined extension along the longitudinal direction of the first and second end element and a link element is about 6 m. This length has been shown to be applicable to most conventional mining conditions.

A further aspect relates to a method for supporting an enclosed belt conveyor between two transport units, the method comprising: providing a support structure as described herein, connecting the first end connector to a first transport unit, connecting the second end connector to a second transport unit.

By means of this connection process, it is possible to arrange a support unit between a plurality of transport units. This arrangement forms modules that may be connected to each other in a manner, such as to suit the respective requirements at the mining site. In particular, it is possible to connect as many of the modules to one another as necessary to bridge the distance from loading to discharge location. The support structure arranged in between the respective transport units ensures an ideal relation between flexibility and stability of the arrangement—by means of fixing and/or releasing and/or controlling the rotation movement of the connectors—that may be adjusted to certain conditions at the mining site, such as the unevenness and/or irregularity of the ground or elevations along the conveying direction. Further, the support structure reduces the amount of transport units necessary, thereby reducing costs and complexity of the arrangement.

As to the advantages, preferred embodiments and details of the method for supporting an enclosed belt conveyor of a mobile haulage arrangement and its preferred embodiments, reference is made to the corresponding aspects and embodiments of the support structure and mobile haulage arrangement described herein.

The support structure for supporting an enclosed belt conveyor preferably is used in a mobile haulage arrangement and its preferred embodiments as described below. Further, the support structure preferably is used in combination with a drive arrangement and its preferred embodiments as described below.

A transport unit for a mobile haulage arrangement for continuously conveying fragmented material in a conveying direction preferably comprises two ground transportation structures arranged for movement along the conveying direction; a support frame connecting the two ground transportation structures and suitable for fitting a belt of an enclosed belt conveyor thereunder; each of the two ground transportation structures comprising at least one height adjustment device; wherein the support frame comprises at least one connector, which is adapted for connecting a support structure thereto; and wherein each of the height adjustment devices is adapted to vary the position of at least a portion of the support frame in relation to one or both of the ground transportation structures.

The transport unit comprises two ground transportation structures and a support frame connecting the two ground transportation structures with each other. The transport unit is suitable for a mobile haulage arrangement for continuously conveying fragmented material in a conveying direction. A mobile haulage arrangement is a setup to facilitate transportation of material, which results from a mining device, such as a drill or a cutting device, at a mining location. The material may be in a fragmented form, for example rocks, ore, sand, or pebbles being released by the mining device. To support the propulsion of the mining device and to clear the mining location, the released fragmented material is transported from the mining location away to a discharge location, which is located in a certain distance from the mining location. The material is continuously conveyed by the mobile haulage arrangement in a conveying direction.

The conveying direction can be described as leading away from the mining location towards a discharge location. The conveying direction does not necessarily mean that it is in form of a straight line but can be curved in any direction and vary in routes and over varying distances. Continuous conveying preferably is to be understood, that the mobile haulage arrangement is adapted to convey fragmented material without any significant pauses or interruption, in particular not in a batch process. This is usually performed with an endless belt conveyor, preferably with an enclosed belt conveyor, moving continuously from the mining location to the discharge location, adapted to transport the fragmented material. Such a mobile haulage arrangement has the advantage of an increased mobility and variability, as it is possible to adjust the length of the mobile haulage arrangement to the environmental requirements of each mining site by introducing a variable number of transport units.

The two ground transportation structures each have—in a basic operation position on a substantially horizontal ground—a main extension in a longitudinal direction, preferably substantially parallel to the conveying direction, an extension in a substantially vertical height direction, and an extension in substantially horizontal width direction orthogonal to the conveying direction. The ground transportation structures are arranged for a movement along the conveying direction and are in connection with or placed on the ground, for example the floor of a mining shaft on the bottom side. The two ground transportation structures are also arranged for a movement in an opposite direction of the conveying direction. Further, the ground transportation structures are also arranged for a movement, which is different from the conveying direction, for example a movement under an angle away from the conveying direction.

The support frame is preferably arranged above the two ground transportation structures with—in a basic operation position on a substantially horizontal ground—a main extension in a substantially horizontal width direction orthogonal to the conveying direction, an extension in a longitudinal direction, preferably substantially parallel to the conveying direction, and an extension in a substantially vertical height direction and connects the two ground transportation structures in a way that a belt of an enclosed belt conveyor can be fitted below the support frame, under the bottom side of the support frame, preferably between the two ground transportation structures. The support frame is preferably made from a strong and rigid material as for example steel or the like. Preferably, two runs (a conveyor run and a return run) of an enclosed belt conveyor can be fitted below the support frame, bridging a gap between the two ground transportation structures above the two ground transportation structures.

Each of the ground transportation structures comprises at least one height adjustment device, wherein each of the height adjustment devices is adapted to vary the position of at least a portion of the support frame in relation to one or both of the ground transportation structures. Preferably, at least one height adjustment device is arranged at the top end of the ground transportation structure, preferably between the top end of the ground transportation structure and one side of the support frame, thus being able to adjust the height of one side of the support frame towards one or both ground transportation structures. At least one height adjustment device is further preferably adapted to vary the position of at least a portion of the support frame in a vertical or substantially vertical direction in relation to the ground.

Furthermore, at least one height adjustment device is preferably arranged such that by varying the height of at least a portion of the support frame towards one or both of the ground transportation structures, the one and/or two runs of an enclosed belt conveyor fitted under the support frame can be adjusted relative to the ground. This is advantageous, as the transport unit is able to compensate height differences, for example caused by bumps or dips, of the ground, thus being able to avoid contact of the one or two runs of the enclosed belt conveyor fitted under the support frame with the ground. This may also be advantageous if there are two runs fitted under the support frame because they can vary in load, possibly leading to a tipover of the transport unit, if the support frame is not kept in balance, which is prevented by the at least height adjustment device on each of the ground transportation structures. Preferably, the height adjustment devices both comprise at least one height adjustment support structure, increasing the support of the support frame, facilitating a better balancing of heavy loads. It is particularly preferred that each of the height adjustment devices comprises two height adjustment support structures.

The support frame comprises at least one connector, which is adapted for connecting a support structure thereto. The connector is preferably located at one side of the support frame, in conveying direction or in opposite direction. The connector could be, for example, a snap-on or a fixed connector, engaging with a support structure. The connector is preferably in form of a bar. This is particularly advantageous, as the application of support structures reduces the necessity for further transport units within the mobile haulage arrangement.

The transport unit may be improved in that the that the transport unit is arranged such that a longitudinal extension of the support frame is parallel to a longitudinal extension of the two ground transportation structures independent from a position of the height adjustment devices. This is particularly advantageous, as the one or two runs of the belt of the enclosed belt conveyor being fitted under the support frame of the transport unit would be easily damaged by a rotation about a horizontal axis orthogonal to the conveying direction, as a rotation of the support frame about a horizontal axis orthogonal to the conveying direction could hamper the movement, leading to bruises of the belt, or even block or the movement of the belt. In particular, the transport unit is arranged such that the support frame exhibits no relative movement in longitudinal direction in relation to the two ground transportation structures, independent from a position of the height adjustment devices. Preferably, the transport unit is arranged such that the support frame is fixed in longitudinal direction in relation to the two ground transportation structures, independent from a position of the height adjustment device.

The transport unit may be improved in that the support frame comprises two connectors, wherein each of the connectors is adapted for connecting a support structure thereto. This is further advantageous, as it increases the flexibility, and interchangeability of the transport unit. The connectors are preferably located at opposite ends, further preferably on opposite ends of the support frame in the conveying direction.

The transport unit may be further improved in that the transport unit is a crawler unit and the two ground transportation structures are crawler tracks, wherein the transport unit comprises at least one crawler drive for driving the crawler. The crawler drive drives at least one crawler track, preferably both crawler tracks thus driving the crawler, for example, in a conveying direction. Preferably, the crawler drive is adapted to drive the crawler tracks in a forward direction, which is substantially the same direction as the conveying direction, and also in a backward direction, which is substantially the same direction as the opposite direction. The crawler unit is preferably adapted to drive the crawler tracks independent of each other. By this, the crawler unit is able not only to move in a forward and backward direction, but also in a turning direction. This is achieved by driving one crawler track at a different speed than the other, resulting in a turning of the crawler unit towards the track that is driven at the slower speed than the other track The crawler tracks are usually made of a rigid material to be robust against the ground structure and comprise multiple chain links being formed into a chain. This has the advantage that the transport unit is robust and can drive on different undergrounds. Each crawler preferably comprises one or more main crawler drive means, driven by the crawler drive, and one or more auxiliary crawler drive means, which are preferably not driven by the crawler drive, supporting the crawler track and the main crawler drive means. The crawler drive is preferably powered by a hydraulic drive but can also be driven by an electric drive or a combustion engine, for example. A hydraulic drive has the advantage that when the hydraulic drive is actuated, the crawler tracks move and when the hydraulic drive is switched of, the crawler tracks are braked. Thus, the crawler tracks are not able to move when the hydraulic drive is not actuated. This has the further advantage that no brakes are required as the speed and stoppage can be easily controlled through the actuation of the hydraulic crawler drive.

The crawler tracks preferably comprise a set of crawler spike, increasing the friction between ground and the crawler unit facilitating the crawler to climb steep hills, thus increasing the safety. The crawler unit is preferably adapted to carry a weight larger than 1.000 kg, more preferably a weight larger than 10.000 kg, more preferably a weight of more than 13.000 kg.

The transport unit may also be improved in that that the transport unit is a wheel unit and the two ground transportation structures each comprise at least one wheel, wherein the transport unit comprises a brake unit for braking the wheels. A wheel can for example be a solid tire or an air pneumatic tire, preferably arranged at a wheel rim. Preferably, each ground transportation structure comprises at least two wheels. Each ground transportation structure can comprise more than two wheels to increase the rolling stability of the transport unit. Preferably, each ground transportation unit comprises the same number of wheels. Preferably, a wheel unit does not comprise a drive for driving the wheels. This embodiment has the advantage that the transport unit is light and can be built in a cost effective way while being robust and yet easy to service.

The brake unit can be arranged as a braking pad or brake shoe being located on the outside of the wheels, to brake the wheel, in particular the rubber outside of the wheel, directly. The brake unit can also be arranged on the axis, to brake the rolling axis of the wheel. The brake unit is preferably hydraulically powered but can also be electrically or manually powered. Preferably, the wheel unit comprises at least two brake units, to brake at least two wheels of the wheel unit. More preferably, the wheel unit comprises a brake unit on each wheel of the wheel unit. This has the advantage for the wheel unit to brake the wheels in a simultaneous way, avoiding a lateral movement of the wheel unit during the braking process.

The transport unit may also be improved in that the height adjustment devices are hydraulic cylinders arranged in—in a basic operation position on a substantially horizontal ground—a vertical direction. A vertical direction is a direction vertical to the ground and/or the conveying direction and/or the transport direction. The hydraulic cylinders are preferably adapted to extend and retreat in a vertical direction.

The transport unit may be further improved in that an extension of the support frame in the conveying direction is smaller than an extension of one or both of the ground transportation structures in the conveying direction. This is in particular advantageous as the support frame can have a small outline, resulting in a more compact design, while the ground transportation structures can maintain a large footprint to provide a robust and stable ground support.

The transport unit may be further improved by at least one guide assembly for engaging opposite longitudinal edges of a belt of an enclosed belt conveyor. It is particularly preferred that the transport unit has two guide assemblies each capable of engaging opposite longitudinal edges of a belt of an enclosed belt conveyor. More preferably, the guide assembly or the guide assemblies is/are arranged on the lower side of the support frame, between the ground transportation structures. In a basic operation position on a substantially horizontal ground, a lower side means that side of the support frame, which is closer to the ground than an opposite upper side. The lower side faces the ground while the upper side faces away from the ground. Both, the lower side and the upper side are preferably parallel to the horizontal ground in a basic operation position on a substantially horizontal ground.

The guide assembly preferably comprises at least one guide roller, guiding the opposite longitudinal edges of the belt on an enclosed belt conveyor in an engaged position. More preferably, the guide assembly comprises at least two guide rollers. More preferably, the guide assembly comprises three guide rollers. Even more preferably, the guide assembly comprises four, five, six, seven or eight guide rollers. The guide roller can be, for example, a side guide roller, engaging one or both longitudinal edges of a belt of an enclosed belt conveyor from the side. The guide roller can also be a lower guide roller, engaging one or both longitudinal edges of the belt from below. The guide roller can also be a top guide roller, engaging one or both longitudinal edges of the belt from the top. A guide assembly with two guide rollers preferably comprises a side guide roller and a lower guide roller for engaging the opposite longitudinal edges of a belt of an enclosed belt conveyor and can also be called a single guide assembly. A guide assembly with three guide rollers preferably comprises a side guide roller, a lower guide roller and a top guide roller for engaging opposite longitudinal edges of a belt of an enclosed belt conveyor and can be called a half guide assembly. A guide assembly with four guide rollers preferably comprises two side guide rollers on opposite sides of the longitudinal edges of the belt, a lower guide roller and a top guide roller for engaging opposite longitudinal edges of a belt of an enclosed belt conveyor and can also be called a full guide assembly. A guide assembly with six guide rollers preferably comprises a total of four side guide rollers, two on each side of the longitudinal edges of the belt, a top guide roller and a lower guide roller, engaging the opposite longitudinal edges of a belt of an enclosed belt conveyor.

The transport unit may be further improved by at least one drive arrangement for driving the belt of an enclosed belt conveyor. The drive unit is preferably arranged at the support frame, more preferably on the lower side of the support frame. Preferable embodiments of the drive arrangement are described below.

The transport unit may also be improved in that the transport unit comprises a hydraulic valve block. The hydraulic valve block is preferably adapted to drive and/or control one or more hydraulically operated or powered devices, such as drives and cylinders, arranged on the transport unit, for example the height adjustment devices, and/or the crawler drive and/or the brake unit. Further preferably, the hydraulic valve block can also drive and/or control one or more hydraulically operated or powered devices not arranged on the same transport unit the hydraulic valve block is arranged at. This can be, for example, the devices like the brake unit of a wheel unit, connected to a crawler unit. This can also be device of a support structure, connected to one of the connectors of the transport unit, such as, for example, a hydraulic cylinder arranged on the support structure. The hydraulic valve block is preferably connected with the hydraulically operated or powered devices through a hydraulic structure, such as, for example, a hydraulic hose.

This embodiment has the advantage that not every transport unit and especially not the support structures connected to the transport unit, have to provide an individual valve block. This leads to lighter transport units, in particular to lighter wheel units. This also leads to reduced costs due to reduced service requirements of a mobile haulage arrangement.

The transport unit may also be improved in that the transport unit comprises an energy supply unit for providing electric energy. The energy supply unit can, for example, be a battery, a capacitor, an accumulator or a power wire, supplying energy to a device arranged on the transport unit, as, for example, lighting arrangements and/or control arrangements and/or operation arrangements.

According to a further aspect, a material transfer structure for a mobile haulage arrangement for continuously conveying fragmented material in a conveying direction is provided, the material transfer structure comprising a base frame with a first and second end; a plurality of guide assemblies for engaging opposite longitudinal edges of a belt of an enclosed belt conveyor; rolling means for turning the belt between a conveyor run and a return run arranged at the second end of the base frame; wherein the plurality of guide assemblies is arranged on the base frame for opening and/or closing the conveyor run and/or the return run of the belt between the first end and the second end of the base frame; and the conveyor run and the return run are positioned substantially at the same level at the first end of the base frame.

A material transfer structure comprises of a base frame with first and second ends, preferably in opposite directions in a longitudinal extension, a plurality of guide assemblies for engaging opposite longitudinal edges of a belt of an enclosed belt conveyor and rolling means for turning the belt between a conveyor run and a return run arranged at the second end of the base frame. A material transfer structure is preferably used to transfer material, preferably fragmented material, produced by a mining device, to and/or from of a belt of an enclosed belt conveyor, i.e. to load and/or discharge material to and/or from the belt of an enclosed belt conveyor.

The material transfer structure can be located at the mining location at the beginning of the mobile haulage arrangement and can be used for taking up the fragmented material from the mining device and loading the material onto an endless enclosed conveyor belt, for example. The material transfer structure can also be located at the discharge location at the end of a mobile haulage arrangement, and can be used for discharging the fragmented material from the endless enclosed conveyor belt, for example, to the ground or to a further conveying device.

The base frame preferably is a framework that has—in a basic operation position on a substantially horizontal ground—a main extension in a longitudinal direction, preferably substantially parallel to the conveying direction, an extension in substantially horizontal width direction, orthogonal to the conveying direction, and a substantially vertical height extension in a vertical direction from the conveying direction. The base frame is preferably made of steel or another strong and rigid material, being able to hold together the material transfer structure.

The rolling means are preferably mounted rotatably on an axis. The axis is preferably arranged at the base frame or a part of it and preferably arranged in a vertical direction, substantially parallel to the width extension of the base frame. The rolling means further preferably turn the belt of an enclosed belt conveyor between a conveyor run and a return run by 180°. Preferably, the rolling means turn the belt in a way that the inside of the conveyor run is turned into the outside of the return run and/or the inside of the return run is turned into the outside of the conveyor run.

The plurality of guide assemblies is arranged on the base frame, preferably on the framework, for example through holders adapted to adjust the position of each guide assembly. The guide assemblies are adapted for opening and/or closing the conveyor run and/or the return run of the belt between the first end and the second end of the base frame Preferably, the guide assemblies are spaced along the conveying direction and/or return direction so that the engaged opposite longitudinal edges of the belt of the enclosed belt conveyor are spread or brought together. In an application at a mining location, the return run of the belt is spread by the plurality of guide assemblies from a closed position to an open position. The return run of the belt is then guided over the rolling means and turned around so that the outside of the return run is turned into the inside of the conveyor run of the belt. Then, the opposite longitudinal edges of the belt are brought together from an open position into a closed position, guided a plurality of guide assemblies. In an application at a discharge location, the conveyor run of the belt is spread by the plurality of guide assemblies from a closed position to an open position. The conveyor run of the belt is then guided over the rolling means and turned around so that the outside of the conveyor run is turned into the inside of the return run of the belt. Then, opposite longitudinal edges of the belt are brought together from an open position into a closed position, guided by a plurality of guide assemblies.

At the first end of the base frame, the conveyor run and the return run of the belt are positioned substantially at the same level. This is advantageous, as the substantially same level of the conveyor run and the return run of the belt increases the flexibility and interchangeability of the material transfer structure, as it can easily be applied in different locations and functions, such as location loading station or a discharge station. In particular, this embodiment allows connecting the material transfer structure to a further part of the enclosed belt conveyor of a mobile haulage arrangement with the belt and the conveyor run in an interchangeable interface position. Additionally, this embodiment is very advantageous, as no additional transfer guiding structure is required to adjust the conveyor run and the return run of the belt to the substantially same level. Preferably, the conveyor run and the return run of the belt are positioned on the same level at the first end of the base frame.

The material transfer structure can be improved in that the rolling means comprise at least one return disc and/or a roller. The at least one return disc preferably has a substantially circular circumference and a small width in relation to the diameter. The roller preferably has a substantially cylindrical shape. The at least one return disc and/or the roller are preferably arranged on the axis of rotation of the rolling means, with the radius of the at least one return disc and/or the roller being orthogonal to the axis of rotation.

The material transfer structure can be further improved in that the rolling means comprise two return discs arranged rotatably independent from each other, wherein each return disc is arranged to guide one of the opposite longitudinal edges of the belt while turning the belt between the conveyor run and the return run. Preferably, the two return discs are arranged on each end of the axis of rotation of the rolling means. More preferably, the roller is arranged between the two discs, with a diameter smaller than the diameter of the return discs, supporting the belt between the two return discs.

The material transfer structure can be further improved in that the plurality of guide assemblies is arranged to guide the opposite longitudinal edges of the belt run between the first end of the base frame in a first, inclined section adjacent the first end of the base frame and a lower side of the second end of the base frame in a second, less or not inclined section adjacent the second end of the base frame. It is preferred that one of the conveyor run or the return run is guided by the guide assemblies in a way such that one of the conveyor run and the return run is arranged below the other one of the conveyor run and the return run at the second end of the base frame. For example, while the conveyor run is guided at substantially the same height level as it entered the base frame on the first end, the return run is guided through the first, inclined section to a lower level of the base frame, being guided underneath the conveyor run on the second end of the base frame. It is also possible that the return run is guided at substantially the same height as it entered the base frame on the first end, while the conveyor run is guided through the first, inclined section to a lower level of the base frame, being guided underneath the return run on the second end of the base frame. This embodiment has the advantage of having a compact design.

The material transfer structure can also be improved in that the plurality of guide assemblies is arranged such that the opposite longitudinal edges of the belt run between the first end of the base frame and a lower side of the second end of the base frame are partly open in the first, inclined section adjacent the first end of the base frame, and are guided from partly to fully open in the second, less or not inclined section adjacent the second end of the base frame. This embodiment has the advantage of providing a compact design that allows for opening and/or closing of the conveyor run and/or return run on a short length.

The material transfer structure can be further improved in that the material transfer structure has a longitudinal extension in the conveying direction of about 6 m. Preferably, the overall length of the material transfer structure does not exceed 6 m in a longitudinal extension in the conveying direction.

The material transfer structure can also be improved in that the base frame comprises two parts which are arranged to allow for relative translational movement in conveying direction between them, wherein the plurality of guide assemblies being arranged for opening and/or closing the conveyor run and/or the return run of the belt and the rolling means are arranged at one of the two parts of the base frame. The base frame comprises two parts, which can be moved relative to each other. The two parts are connected with each other, together forming the base frame. The two parts are preferably arranged such that the translational movement in the conveying direction is a sliding movement. Preferably, one of the two parts engages with the other through a sliding arrangement, for example through engaging rails and grooves or such. Preferably, the other part of the base frame is connected with another element of the mobile haulage arrangement, for example a support structure, through the connector arranged at the first end of the base frame. Through this embodiment, it is possible, that the guide assemblies for opening and/or closing the conveyor run and/or the return run can be moved in a translational movement in conveying direction, independent of the other part of the base frame, which is connected to the rest of the mobile haulage arrangement. This is in particular advantageous as it is possible to loosen and tighten the belt of the enclosed belt conveyor within the mobile haulage arrangement. This is further advantageous as the relative position, angle and/or orientation of plurality of guide assemblies for opening and/or closing the conveyor run and/or the return run relative to the rolling means, for example, does not change in case the belt has to be tightened or loosened.

The material transfer structure can be further improved in that the two parts of the base frame are connected by a hydraulic cylinder arranged to effect a relative translational movement in conveying direction between the two parts. Preferably, the hydraulic cylinder is mounted to each part of the two parts of the base frame, facilitating a relative translational movement between the two parts. Preferably, the hydraulic cylinder is powered by a hydraulic valve block being arranged at a transport unit. Further preferably, the hydraulic cylinder is arranged in a substantially horizontal direction, parallel to the conveying direction, and extrudes and retracts substantially in a direction substantially parallel to the conveying direction. As the cylinder is hydraulically actuated, the cylinder is moving, when it is actuated by the hydraulic valve block, for example, and is locked when it is not actuated. This has the advantage that an unwanted movement between the two parts of the base frame can be avoided.

The material transfer structure can be further improved in that the material transfer structure is a loading structure. The loading structure preferably comprises a loading arrangement, adapted to guide and focus fragmented material onto the belt of the enclosed belt conveyor. The loading arrangement is preferably arranged at the second end of the base frame of the material transfer structure, preferably in a section of the base frame where the belt of the enclosed belt conveyor is fully open. This has the advantage that the fragmented material to be conveyed by the enclosed belt conveyor is easily loaded onto the belt without or reduced spillage.

The material transfer structure can be further improved in that the material transfer structure is a discharge structure. The discharge structure preferably comprises a discharge arrangement, adapted to guide and focus fragmented material discharged from the belt of the enclosed belt conveyor to a discharge location. The discharge arrangement is preferably arranged at the second end of the base frame of the material transfer structure, preferably in a section of the base frame where the belt of the enclosed belt conveyor is fully open. This has the advantage that the fragmented material conveyed by the enclosed belt conveyor is easily discharge from the belt without spillage or the like.

According to a further aspect, a material transfer unit for a mobile haulage arrangement for continuously conveying fragmented material in a conveying direction is provided, the material transfer unit comprising a material transfer structure arranged at a transport unit. The material transfer structure is preferably mounted on the transport unit, preferably on the lower side of the support frame of the transport unit. The transport unit to which the material transfer structure is mounted is preferably a crawler unit. This has the advantage that the material transfer unit can be actively moved by the crawler tracks.

According to a further aspect, a mobile haulage arrangement for continuously conveying fragmented material in a conveying direction is provided, the haulage arrangement comprising a loading unit, comprising a material transfer unit for receiving fragmented material, a discharge unit, comprising a material transfer unit for discharging fragmented material, at least one transport unit arranged between the loading unit and the discharge unit; and a belt of an enclosed belt conveyor. Preferably, the loading unit comprises a loading structure, connected to a transport unit and the discharge unit comprises a discharge structure, connected to a transport unit. Further preferably, the loading unit is arranged at a mining location and the discharge unit is arranged at a discharge location. Further preferably, at least one transport unit is arranged between the loading unit and the discharge unit. This has the advantage that the mobile haulage arrangement can be moved, for example, through mining shafts of an underground mining site. For example, the mobile haulage arrangement can be moved following the propulsion of a mining device, continuously drilling, producing fragmented material to be conveyed away from the mining location. This embodiment is particularly advantageous as the mobile haulage arrangement is moveable while conveying the fragmented material. Preferably, the fragmented material is loaded to the belt of an enclosed belt conveyor through the loading station. The fragmented material is further conveyed away from the mining location to a discharge location, preferably via the belt of an enclosed conveyor belt. The belt of an enclosed conveyor belt is preferably supported by the at least one transport unit between the loading unit and the discharge unit. At the discharge unit, the fragmented material can be discharged from the belt of the enclosed conveyor belt to a discharge location. Preferably, the loading unit, the discharge unit and the transport unit are connected with each other, for example via a support structure, allowing for a continuous conveying movement.

The mobile haulage arrangement can be further improved in that a first support structure connecting the loading unit and the at least one transport unit and a second support structure connecting the discharge unit and the at least one transport unit. Preferably, a support structure is arranged between the loading unit and the transport unit and another support structure is arranged between the transport unit and the discharge unit in this embodiment. The support structures may be connected via connectors on the transport unit and/or the loading unit and/or the discharge unit. Preferably, the belt of an enclosed belt conveyor is supported by the support structure, thus reducing the necessity of further transport units between the loading unit and the discharge unit, advantageously prolonging the length of the mobile haulage arrangement at reduced costs.

The mobile haulage arrangement can also be improved in that it is further comprising a plurality of transport units interconnected by a plurality of support structures. By this embodiment, it is possible to interconnect as many transport units and support structures as required in the mining shaft of the mine. The length and setup of the mobile haulage arrangement can easily be adapted to the local needs. For further advantages, it is herewith referred to the advantages described in the embodiments of the individual parts of the mobile haulage arrangements.

Preferably, the mobile haulage arrangement further comprises a bridge structure connected to the loading unit for receiving fragmented material, preferably from a cutting or mining device, and conveying the fragmented material to the loading unit. The bridge structure can be, for example, a bridge conveyor, preferably without direct ground contact). The bridge structure can also be realized as or employ one or more transport devices, like shuttle cars. Further, the bridge structure may include a crushing device or other complementary devices. Preferably, a first end of the bridge structure is provided with a universal joint for a connection with a cutting or mining device, or the like. The universal joint preferably allows for a rotational movement about a substantially vertical axis and/or a rotational movement about one or two substantially horizontal axes (in a basic operation position of the mobile haulage arrangement and the cutting or mining device on a substantially horizontal ground) Further preferably, a second end of the bridge structure is adapted to form a connection with the loading unit to provide fragmented material to the loading unit.

According to a further embodiment, a discharging end of the mobile haulage arrangement, preferably the discharging unit, will discharge fragmented material onto a semi-permanent conveyor structure, which is preferably approximately 1 m above the ground. The discharging end of the mobile haulage arrangement preferably is adapted to advance or retracted according to the mining cycle. Therefore, it is preferred that the mobile haulage arrangement, in particular its discharge unit, is adapted to straddle or be positioned alongside the semi-permanent conveyor structure for some length.

According to a further aspect, a method for continuously conveying fragmented material in a conveying direction is provided, the method comprising providing a mobile haulage arrangement; moving the mobile haulage arrangement such that the loading unit is positioned where fragmented material can be fed to the mobile haulage arrangement and the discharge unit is positioned where fragmented material can be discharged from the mobile haulage arrangement; feeding fragmented material to the loading unit; conveying fragmented material via the belt of the enclosed belt conveyor; discharging fragmented material from the discharge unit.

As to the advantages, preferred embodiments and details of method for continuously conveying fragmented material in a conveying direction and its preferred embodiments, reference is made to the corresponding device aspects and their embodiments described herein.

A drive arrangement for driving a belt of enclosed belt conveyor preferably comprises a conveyor drive assembly arranged to drive the belt of the conveyor run in the conveying direction and a return drive assembly arranged to drive the belt of the return run in an opposite direction.

The drive arrangement comprises at least two drive assemblies that are preferably controlled and actuated as a unit. Each of these drive assemblies is capable of driving the belt of an enclosed belt conveyor in a pre-defined, respective direction, whereby these respective directions differ from one another, in particular are opposite to each other.

The conveyor drive assembly is configured to drive the belt of the enclosed belt conveyor from the loading unit toward the discharge unit. This direction is defined as the conveying direction. Accordingly, the return drive assembly is configured to provide a movement of the belt of the enclosed belt conveyor in the direction from the discharge unit toward the loading unit, i.e. in the opposite direction. This direction can be referred to as the return direction.

An enclosed belt conveyor comprises an endless conveyor belt for conveying loads, typically in the form of fragmented material. The enclosed belt conveyor comprises an endless conveyor belt with two opposite longitudinal edges that are arranged along the whole length of the belt. Preferably, the term opposite is to be understood such that the two longitudinal edges are arranged on opposite sides of the belt relative to the conveying or return direction. When the belt is in a loading or discharge position, the edges preferably are spaced apart from each other to allow loads to be put onto the belt or to be discharged from the belt. When the belt is in a closed or conveying position, the two longitudinal edges of the belt are arranged in close proximity to one another. In doing so, the belt is bended into the form of a closed loop, thereby forming a pouch for enclosing the load. It is preferred that the two opposite longitudinal edges are brought into contact with each other, such that they are arranged above each other in relation to a direction substantially orthogonal to the conveying direction of the belt and running from a bottom part of the enclosed belt conveyor to a top part of the enclosed belt conveyor. Alternatively, they may be arranged adjacent to each other in said direction.

The belt of the conveyor run is that part of the conveyor belt that is currently driven in the conveying direction. Accordingly, the belt of the return run is that part of the same conveyor belt that is currently driven in the return direction. The change in direction of the belt may be achieved by respective rolling means arranged at a material transfer structure at the two ends of the mobile haulage arrangement.

Preferably, the drive arrangement is further configured to change the driving direction of the belt of the enclosed belt conveyor, such that the belt of the conveyor run is driven in the opposite direction (the return direction) and the belt of the return run is driven in the conveying direction. This configuration may preferably be used in cases where the belt is overloaded with fragmented material, for example to remove all or parts of the fragmented material already loaded on the enclosed belt conveyor.

An advantage of a drive arrangement as described herein is that it is configured to drive the belt in both, the conveying and the return direction. This kind of arrangement allows for a constant driving movement of the closed conveyor belt in the conveying direction as well as in the return direction of said conveyor belt by a shared drive arrangement. The drive arrangement preferably is one group or unit, structurally and/or functionally coupled. Thus, it increases the stability of the return movement compared to arrangements where the belt is only driven in the conveying direction and is allowed to run freely in the return direction, in particular since the return movement is less affected by adverse effects such as an increased friction or full immobility of certain rollers. As a result, the drive arrangement further provides for a very reliable driving movement, even in cases where the length of the enclosed belt conveyor is increased.

Further, by providing a drive arrangement driving both, the conveyor and the return run, a flexible module is provided, which can be used, for example, in certain intervals along the conveyor belt. Thereby, for example, it is possible to provide conveyor belts of different lengths in an easy manner, since simply the corresponding number of drive arrangements needs to be employed in the respective intervals. Thus, the drive arrangement according to the present invention provides for a system that is both, flexible and reliable.

In a preferred embodiment of the drive arrangement, the conveyor drive assembly comprises a conveyor run drive roller in friction connection with at least one of two opposite longitudinal edges of the belt of the conveyor run driven by a conveyor drive unit, and the return drive assembly comprises a return run drive roller in friction connection with at least one of the two opposite longitudinal edges of the belt of the return run driven by a return drive unit. The conveyor run drive roller is configured to transfer a driving force from the conveyor drive unit to the belt of the conveyor run in order to move the belt of the conveyor run in the conveying direction and the return run drive roller is configured to transfer a driving force from the return drive unit to the belt of the return run in order to move the belt of the return run in the return direction.

Preferably, the conveyor run drive roller is actuated to perform a rotational movement by the conveyor drive unit, such as to move the belt of the conveyor run along the conveying direction by means of said friction connection. Preferably, the conveyor run drive roller cooperates with a further roller—that may either be driven or idle—arranged on the opposite side of the belt of the conveyor run, which facilitates the transfer of the driving force from the drive roller via friction to the belt. Accordingly, a return run drive roller is configured to perform the above described functionalities on the belt of the return run. The return drive roller equally cooperates with at further, driven or idle, roller that is arranged on the opposite side of the belt of the return run and facilitates the transfer of the driving force via friction to the belt. This embodiment allows for a cost-effective and reliable configuration of a drive arrangement that is capable of driving a belt of an enclosed belt conveyor in both, the conveyor as well as the return direction.

In a further preferred embodiment of the drive arrangement, the conveyor drive assembly comprises two conveyor run drive rollers in friction connection with the two opposite longitudinal edges of the belt of the conveyor run driven by a common conveyor drive unit or by two separate conveyor drive units, and the return drive assembly comprises two return run drive rollers in friction connection with the two opposite longitudinal edges of the belt of the return run driven by a common return drive unit or by two separate return drive units.

Preferably, the belt of the conveyor run is driven by two conveyor run drive rollers, whereby these two conveyor run drive rollers are in friction connection with at least one or both of the two opposite longitudinal edges of the belt of the conveyor run. In particular, it is preferred that a first one of the two conveyor run drive rollers is in friction connection with a first one of the two opposite longitudinal edges and a second one of the two conveyor run drive rollers is in friction connection with a second one of the two opposite longitudinal edges. These conveyor run drive rollers may preferably be driven by a common conveyor drive unit comprised by the conveyor run drive assembly. Alternatively, the two conveyor run drive rollers may be driven by two separate conveyor drive units of one conveyor run drive assembly.

Similarly, the belt of the return run is preferably driven by two return run drive rollers, being in friction connection with the two opposite longitudinal edges of the belt of the return run. The return run drive rollers may also preferably be driven by a common return drive unit or by two separate return drive units comprised by the return drive assembly.

This particular embodiment has the advantage that the two opposite longitudinal edges of the belt of the conveyor run and the return run, respectively, are evenly driven along the conveying respective return direction. This arrangement is therefore capable of preventing disturbances in the conveying and/or return movement, in particular in cases where one of the two opposite longitudinal edges of the belt of the conveying and/or return run moves differently that the second one of the two opposite longitudinal edges, for example due to a change of the friction properties of one of the two edges or external influences preventing an even movement. In particular, by providing two drive rollers each for the conveying and the return run, higher driving forces can be applied and/or the reliability of the drive arrangement is increased due to the redundancy.

In a further preferred embodiment, the drive arrangement comprises at least one guide assembly arranged upstream or downstream of the conveyor or return drive assembly to guide at least one of the two opposite longitudinal edges of the belt of the conveyor run or the return run. The terms upstream or downstream may refer to either the conveying or the return direction. Preferably, the terms upstream and downstream refer to the conveying direction.

In this context, a guide assembly is preferably an assembly of guide rollers, for example, configured to guide the movement of the belt of the conveyor run in the conveying direction and/or the belt of the return run in the return direction by means of guiding at least one of the two opposite longitudinal edges of said belt. Preferably, these guide assemblies are arranged in front of (downstream) and/or behind (upstream) the conveyor drive assembly or the return drive assembly along the conveying or return direction, respectively.

Preferably, one guide assembly is configured such as to guide one of the two opposite longitudinal edges of the belt of the conveyor run and the return run. Alternatively, it may be configured such as to guide both of the two opposite longitudinal edges of the belt of the conveyor run and the return run. Similarly, the guide assembly is preferably provided such as to simultaneously guide at least one of the two opposite longitudinal edges of both, the belt of the conveyor run and the belt of the return run. Alternatively, it may be provided to simultaneously guide both of the two opposite longitudinal edges of both belts. Further to that, two separate guide assemblies are preferably provided to guide one or both of the two opposite longitudinal edges of the belt of the conveyor run and the belt of the return run, respectively.

This particular embodiment has the further advantage of an even higher reliability, as the guide assembly provides additional guiding support to at least one of the two opposite longitudinal edges of the belt of the conveyor run and/or return run. This has the advantage that the driving force can be transferred from the drive assemblies to the conveyor and return run of the belt more reliably. Further to that, since they may be arranged upstream or downstream or both, upstream and downstream, they further enhance flexibility of the arrangement, as they allow for a choice at which locations along the belt it would be necessary to arrange one or more guide assemblies in addition or instead of the drive arrangements.

According to an improvement of the previous preferred embodiment, the at least one guide assembly comprises a top guide roller and a lower guide roller.

In accordance with this improvement, the top guide roller of the guide assembly is arranged on top of at least one of the two opposite longitudinal edges, i.e. above the enclosed conveyor belt in a direction substantially orthogonal to the conveying and/or return direction and running from the lower part of the enclosed belt conveyor to the upper part of the enclosed belt conveyor. Accordingly, the lower guide roller is arranged below at least one of the two opposite longitudinal edges in a direction substantially orthogonal to the conveying and/or return direction. The top guide roller and the lower guide roller are thus brought into friction contact with the enclosed belt conveyor, preferably at least one of the two opposite longitudinal edges, respectively.

In that context, the direction running from the lower part of the enclosed belt conveyor to the upper part of the enclosed belt conveyor may be defined by regarding the enclosed belt conveyor as a part of the mobile haulage system. Said mobile haulage system has a basic operation position in which it is located on a substantially horizontal ground. In a basic operational mode, the direction running from a lower part to an upper part is defined by an axis that is substantially orthogonal to the substantially horizontal ground. Accordingly, this axis (and the respective direction) is substantially orthogonal to the conveying direction. The lower part of the enclosed belt conveyor is that part that is located closer to the substantially horizontal ground and the upper part is that part located further away from the substantially horizontal ground along this direction. Similarly, a first element arranged below second element is closer to the substantially horizontal ground than said second element along this direction and a first element arranged above a second element is further away from the substantially horizontal ground than said second element.

Preferably, the center axis of the top guide roller is parallel to the direction running from the lower part of the enclosed belt conveyor to its upper part and, thus, orthogonal to the axis defining the conveying and/or the return direction. The center axis of the lower guide roller is preferably provided under an angle of approximately 45° in relation to said direction.

In a further improvement of the previous embodiment, the at least one guide assembly comprises first and second, opposite side guide rollers.

Preferably, these first and second opposite side guide rollers are arranged opposite of each other on both sides of the belt of the conveyor run and/or the belt of the return run. They are in contact with one or both of the two opposite longitudinal edges of the belt of the conveyor run and/or the return run. The center axis of these first and second opposite side guide rollers is preferably parallel to the direction running from the lower part of the enclosed belt conveyor to its upper part and orthogonal to the axis defining the conveying and/or the return direction.

These improvements have the further advantage that the two opposite longitudinal edges of the belt of the conveyor run and the return run, respectively, are strictly guided in their movement, thereby further preventing any unwanted or unfavorable movement in any other direction than the conveying and/or the return direction. By means of this further guiding support, the enclosed belt conveyor is therefore even more secured in its driving direction, further enhancing reliability of the arrangement and effectiveness of the drive assemblies.

According to a preferred embodiment, the drive arrangement comprises four guide assemblies, wherein a first guide assembly is arranged upstream of the conveyor drive assembly in the conveying direction to guide at least one of the two opposite longitudinal edges of the belt of the conveyor run, a second guide assembly is arranged downstream of the conveyor drive assembly in the conveying direction to guide at least one of the two opposite longitudinal edges of the belt of the conveyor run, a third guide assembly is arranged upstream of the return drive assembly in the opposite direction to guide at least one of the two opposite longitudinal edges of the belt of the return run, and a fourth guide assembly is arranged downstream of the return drive assembly in the opposite direction to guide at least one of the two opposite longitudinal edges of the belt of the return run.

In accordance with this embodiment, a guide assembly is arranged in front of and behind the conveyor drive assembly of the drive arrangement and in front of and behind the return drive assembly of the drive arrangement, respectively. Thus, the belt of the conveyor run is guided to one conveyor run drive assembly and away from it by two guide assemblies arranged along the conveyor run. Similarly, the belt of the return run is guided to one return run drive assembly and away from it by to guide assemblies arranged along the return run. This arrangement has the further advantage of increasing the reliability and effectiveness of the transfer of the driving force of the conveyor run drive assembly and the return run drive assembly to the belt of the conveyor run and the return run, respectively.

In a further preferred embodiment of the drive arrangement, a driving engagement of the conveyor drive assembly with the belt of the conveyor run and/or the return drive assembly with the belt of the return run is releasable in a relocation mode.

On some occasions, it may be necessary to relocate the enclosed belt conveyor, in particular a mobile haulage arrangement comprising an enclosed belt conveyor to another location or site. In such an instance, a relocation mode is used, i.e. the whole enclosed belt conveyor or mobile haulage arrangement is moved (relocated) without a conveying movement or action of the enclosed belt conveyor.

In these cases, it is preferred that the belt of the conveyor run and/or the belt of the drive run are not driven by the drive arrangements. In order to prevent friction by the drive rollers of each drive arrangement that is not driven, it is preferred that a driving engagement, i.e. a friction contact of the conveyor run drive roller(s) of the conveyor drive assembly and/or the return run drive roller(s) of the return drive assembly with two opposite longitudinal edges of the belt of the conveyor run and/or return run, respectively, is releasable. This is achieved, for example, by moving the conveyor and/or return drive rollers of the drive arrangement to a certain distance from the two opposite longitudinal edges of the belt, i.e. a gap is provided between the drive rollers and the belt. In this manner, the belt is allowed to move freely if the mobile haulage arrangement is moved through a curved path or over height differences during relocation. Thus, if the mobile haulage arrangement is, for example, moved through a curvature, the belt may automatically adjust to the bend without influencing (moving) the drive rollers and also without being inhibited by the drive rollers. Thus, the drive roller will not be actuated by a belt movement necessitated by the driving of a curvature by the mobile haulage arrangement during relocation and also a free movement of the belt will not be hindered by the drive rollers, when the driving engagement is released. In this manner, it is possible to reduce wear on the drive assemblies and the belt.

The gap between the drive rollers and the belt may be effected by a cylinder system which is configured to move the conveyor and/or return drive rollers away from the two opposite edges when relocation mode is required and back to these two opposite edges once the relocation mode has be executed and the enclosed conveyor belt may restart the conveying process. Preferably, one drive arrangement of a mobile haulage system comprising a plurality of drive arrangements, in particular, only one of the two drive assemblies, remains in friction contact with the belt in the relocation mode. Thereby, an uncontrolled movement of the belt may be prevented. According to a preferred embodiment of the drive arrangement, the conveyor drive unit and/or the return drive unit is a hydraulic motor.

It is further preferred that the conveyor drive unit(s) of and/or the return drive unit(s) the drive arrangement(s) are provided as hydraulic motors. The hydraulic motors preferably are configured not to allow for a movement of the conveyor drive rollers and/or return drive rollers (and, thus, the belt) when they are not driven or activated. This configuration has the advantage that without an active driven action, the whole arrangement will remain in is original position without the necessity of further braking means. This has the further advantage of preventing damages by unwanted movements in case of an unexpected loss in power.

It is also possible to employ non-hydraulic motors, such as an electric motor, as the conveyor and/or the return drive unit(s). However, in such a case, it is preferred that an immediate braking process is ensured in cases where the power of the system is switched off to prevent unwanted or uncontrolled movement of the enclosed conveyor belt.

The previous embodiment of the drive arrangement may be improved such that the conveyor and/or the return drive unit is adapted to drive the belt with a predetermined torque. In accordance with this improvement, the velocity of the enclosed belt conveyor results from the application of a predetermined torque to the belt via the friction contact between the conveyor drive rollers and/or return drive rollers and at least one of the opposite longitudinal edges of the belt. In contrast to velocity or speed controlled drive units, torque controlled drive units allow for different velocities of the belt, while a constant torque is applied, which may be the case when the belt is guided around a curve, for example.

To determine or estimate the predetermined torque applied by the conveyor and/or return drive units, preferably, a desired velocity can be determined and a torque of the conveyor and/or return drive units typically required to achieve this desired velocity can be determined. Preferably, also the typical load of the conveyor and a typical length of the conveyor to be driven (depending on the distance between drive arrangements) is taken into account. The corresponding torque typically needed for the desired velocity may then be set as the predetermined torque for the conveyor and/or return drive units. This predetermined torque is then provided to the conveyor and/or return drive units or hydraulic motors. The hydraulic motors preferably employ this predetermined torque to drive the enclosed belt conveyor.

The utilization of torque controlled drive units is particularly beneficial for a drive arrangement driving both, the belt of the conveyor run and the belt of the return run. Specifically, utilizing the torque as control parameter allows for driving the belt of the conveyor run and the belt of the return run at different velocities when the enclosed belt conveyor has to be driven around a corner. This arrangement makes use of the effect that in such a case the velocity is dependent on the radius and the angular velocity, i.e. that $r_1/r_2 = v_1/v_2$. In other words: For a smaller radius, i.e. the inside bending radius of the corner, a lower velocity is achieved, whereas for a larger radius. I.e. the outside bending radius of the corner, a higher velocity is achieved, both by application of the same torque value. Thus, in this drive arrangement the velocity of the enclosed belt conveyor will automatically adjusted by the bending radius of the outside and inside bend of the enclosed belt conveyor.

In a further preferred embodiment, the drive arrangement comprises at least one control unit, which is adapted to control the torque applied by the conveyor drive unit and/or the return drive unit. This control unit may preferably be used to control only the torque. This control unit may also provide a list of predetermined torque values corresponding to respective predetermined velocities of the enclosed belt conveyor. Preferably, the control unit is employed to control the torque directly at the drive arrangement.

A further aspect relates to a mobile haulage arrangement incorporating a drive arrangement as previously described. In particular, the further aspect relates to a mobile haulage arrangement for continuously conveying fragmented material in a conveying direction, the mobile haulage arrangement comprising a loading unit for receiving fragmented material, a discharge unit for discharging fragmented material, at least one transport unit arranged between the loading unit and the discharge unit, a belt of on an enclosed belt conveyor, at least one main drive arrangement and at least one auxiliary drive arrangement for driving the belt, wherein the at least one auxiliary drive arrangement is a drive arrangement according to one or more aspects of the drive arrangement as described herein.

A mobile haulage arrangement is a setup to facilitate transportation of material, which results from a mining device, such as a drill or a cutting device, at a mining location. The material is in a fragmented form, for example rocks, ore, sand, or pebbles being released by the mining device. To support the propulsion of the mining device and to clear the mining location, the released fragmented material is transported from the mining location away to a discharge location, which is located in a certain distance from the mining location. The material is continuously conveyed by the mobile haulage arrangement in a conveying direction.

The conveying direction can be described as leading away from the mining location towards a discharge location. The conveying direction does not necessarily mean that it is in form of a straight line but can be curved in any direction and vary in routes and over varying distances. Continuous conveying preferably is to be understood, that the mobile haulage arrangement is adapted to convey fragmented material without any significant pauses or interruption, in particular not in a batch process. This is usually performed with an endless belt conveyor, preferably with an enclosed belt conveyor, moving continuously from the mining location to the discharge location, adapted to transport the fragmented material.

Such a mobile haulage arrangement has the advantage of an increased mobility and variability, as it is possible to adjust the length of the mobile haulage arrangement to the environmental requirements of each mining site by introducing a variable number of transport units and respective drive arrangements between the loading unit and the discharge unit.

Preferably, the enclosed belt conveyor is mounted on the mobile haulage arrangement and driven in both, the conveying as well as the opposite direction, by one or more auxiliary drive arrangements. Preferably, these auxiliary drive arrangements are uniformly coupled to a main drive arrangement via respective signal connections and may thus be uniformly controlled by the main drive arrangement. For example, the predetermined torque may be set only in the main drive arrangement and all auxiliary drive arrangements are set to apply the same torque as the main drive arrangement. This arrangement has the advantage of a uniform actuation of all auxiliary drive arrangements and the main drive arrangement by said main drive arrangement and, thus, of a continuous and consistent driving movement of the enclosed belt conveyor along its entire length.

In a preferred embodiment the mobile haulage arrangement is implemented such that the at least one main drive arrangement for driving the belt is a drive arrangement as described herein.

In a further preferred embodiment of the mobile haulage arrangement, a number of wheel units and a number of crawler units are arranged between the loading unit and the discharge unit, a first main drive arrangement is arranged on the loading unit and a second main drive arrangement is arranged on the discharge unit and the at least one auxiliary drive arrangement is arranged on one of the crawler units.

A wheel unit preferably is a transport unit comprising at least two wheels and a brake unit for braking the wheels. A crawler unit preferably is a transport unit comprising respective crawler tracks and at least one crawler drive for driving at least one, preferably both, crawler tracks, such as to drive the crawler in the conveying direction.

Preferably, these wheel and crawler units are arranged between the loading unit and the discharge unit along the length of the enclosed conveyor belt in the conveying direction. In such a case, it is preferred that a drive arrangement as described herein is arranged on the loading unit such as to act as a first main drive arrangement. Similarly, a drive arrangement is arranged on the discharge unit such as to act as a second main drive arrangement. These first and second main drive arrangements are used to control at least one auxiliary drive arrangement that is arranged between the two main drive arrangements on at least one of a wheel or a crawler unit.

Arranging a first main drive arrangement on the loading unit and a second main drive arrangement on the discharge unit allows for centralizing the control functions of the mobile haulage system. In particular, this arrangement makes it possible to provide a respective control unit and control panel at the loading unit and the discharge unit, respectively, which may also be used to insert the parameters for the first and second main drive arrangements, such as the predetermined torque. Providing such a control unit and control panel on both, the loading and the discharge unit is particularly advantageous, since the mobile haulage arrangement is capable to drive both directions and, thus, may be controlled from both, the loading and the discharge end of the mobile haulage arrangement. In addition to this advantage, this embodiment allows for an overall high flexibility of the mobile haulage system. In particular, the embodiment enables providing respective "modules" for the mobile haulage arrangement, consisting of a wheel or a crawler unit provided with an auxiliary drive arrangement that can readily be provided in between the loading and the discharge unit in order to enhance the length of the mobile haulage system.

A further aspect relates to a method for driving a mobile haulage arrangement for continuously conveying fragmented material in a conveying direction using a drive arrangement as described herein, the method comprising: providing a mobile haulage arrangement as described herein and, during a conveying operation of the mobile haulage arrangement, driving the belt of the conveyor run in the conveying direction and/or the belt of the return run in an opposite direction; wherein the conveyor drive units and/or return drive units of the at least one main drive arrangement are operated with a torque depending on a desired velocity of the conveyor belt and the conveyor drive units and/or return drive units of the at least one auxiliary drive arrangement are operated with a preset torque.

As described herein, it can be preferred that the torque is determined or estimated based on a desired velocity. Such a torque preferably then is used as the predetermined torque of the main drive arrangement(s) and can be, for example, set (by an operator, for example) in the main drive arrangement(s). Preferably, the auxiliary drive arrangements then are operated with a preset torque, which further preferably is the same as the torque of the main drive arrangement(s).

In a preferred embodiment of the method, during relocation of the mobile haulage arrangement, a driving engagement of the at least one auxiliary drive arrangement with the belt of the conveyor run and/or the belt of the return run is released.

As to the advantages, preferred embodiments and details of method for driving a mobile haulage arrangement and its preferred embodiments, reference is made to the corresponding aspects and embodiments of the drive arrangement and mobile haulage arrangement described herein.

BRIEF DESCRIPTION OF THE DRAWINGS

Preferred embodiments of the invention shall now be described with reference to the attached drawings, in which

FIG. 3a: shows a detailed top view of a discharge end of a mobile haulage arrangement according to FIG. 2b;

FIG. 3b: shows a detailed top view of a loading end of a mobile haulage arrangement according to FIG. 2b;

FIG. 4a: shows a side view of an alternative setup of a mobile haulage arrangement;

FIG. 4b: shows a top view of an alternative setup of the mobile haulage arrangement according to FIG. 4a;

FIG. 5: shows a perspective view of an alternative setup of the mobile haulage arrangement according to FIG. 4a;

FIG. 6: shows a perspective cross-sectional view of an enclosed belt conveyor;

FIG. 10b: shows a top view of the lower guide roller according to FIG. 10a;

FIG. 15a: shows a cross-sectional side view of an embodiment of a spike of a crawler unit;

FIG. 15b: shows a side view of spikes according to FIG. 15a mounted in a crawler chain;

FIG. 15c: shows a cross-sectional side view of another embodiment of a spike of a crawler unit;

FIG. 15d: shows a side view of the spikes according to FIG. 15c mounted in a crawler chain;

FIG. 15e: shows a cross-sectional side view of yet another embodiment of a spike of a crawler unit;

FIG. 15f: shows a side view of the spikes according to FIG. 15e mounted in a crawler chain;

In the drawings, identical elements or elements with substantially identical function are indicated with identical reference signs.

DETAILED DESCRIPTION

Figure 1:
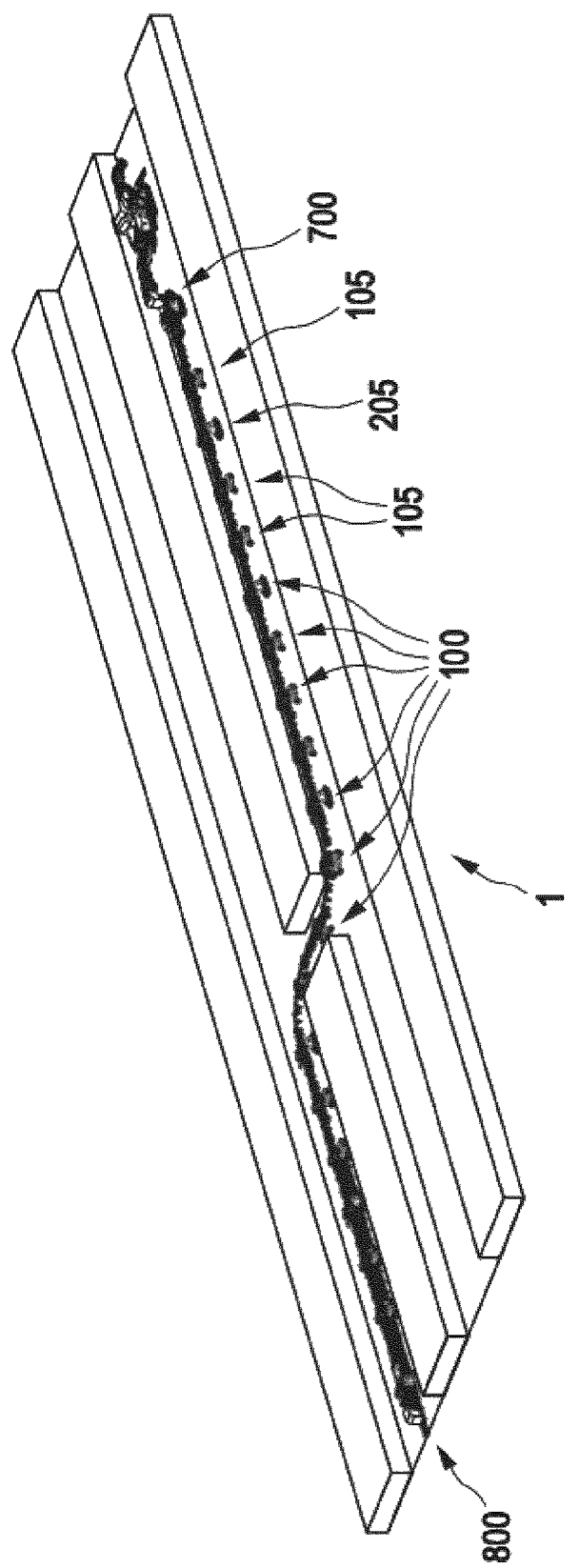
FIG. 1: shows a perspective view of a mobile haulage arrangement.
Figure 2A:
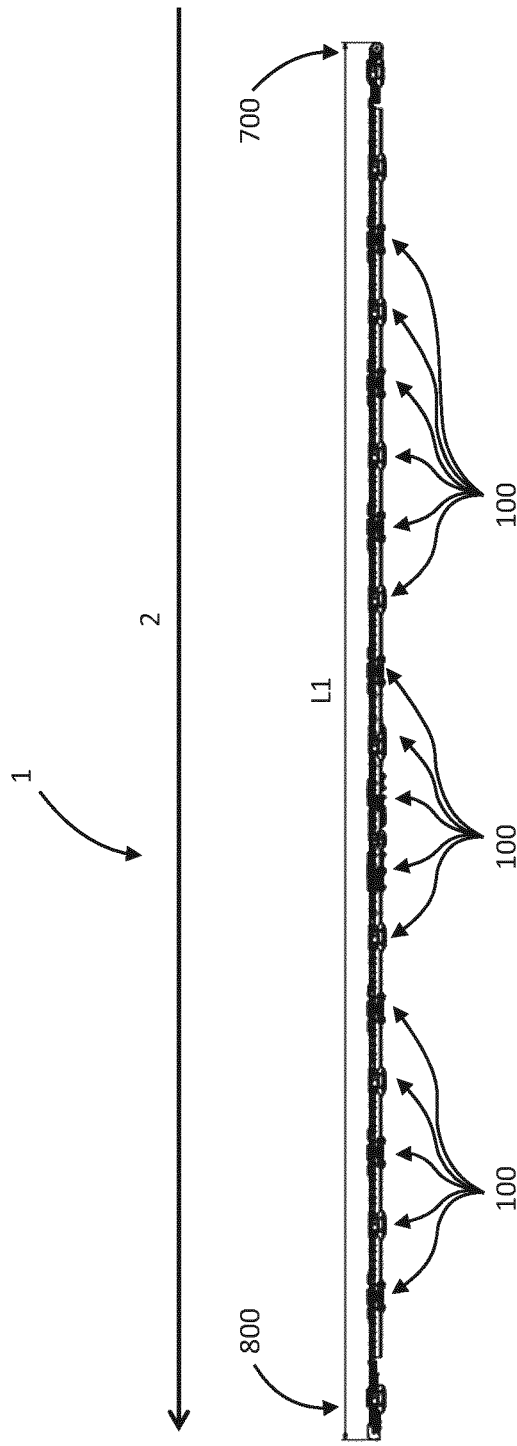
FIG. 2a: shows a side view of the mobile haulage arrangement according to FIG. 1 in a straight alignment.
Figure 2B:
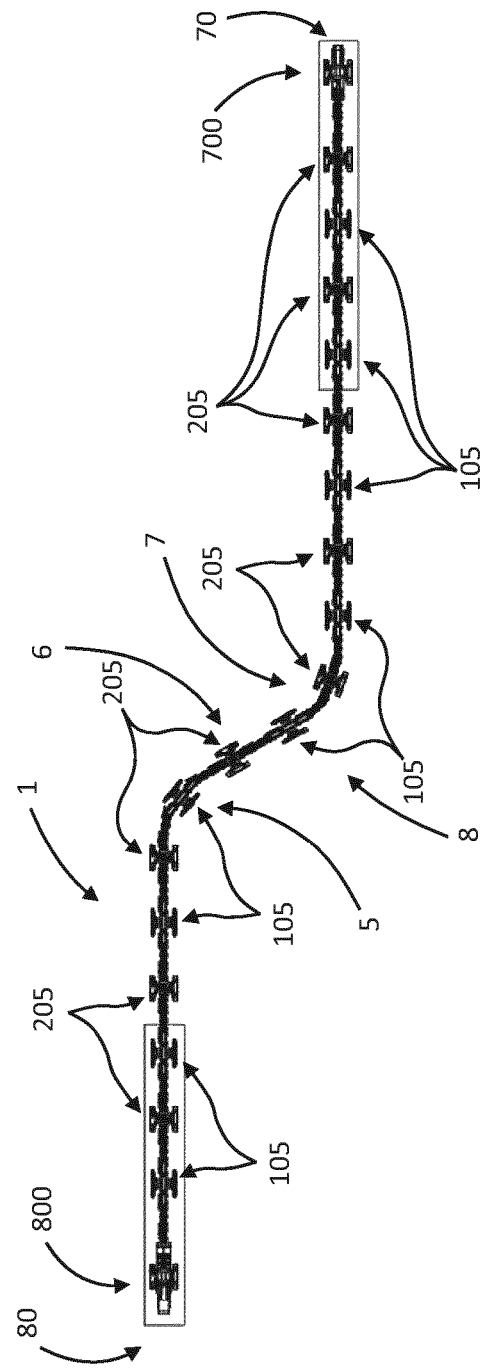
FIG. 2b: shows a top view of the mobile haulage arrangement according to FIG. 1.

In FIGS. 1, 2a, and 2b a perspective view, a side view, and a top view, respectively, of a mobile haulage arrangement 1 is shown. The mobile haulage arrangement 1 comprises a loading unit 700 on a mining location, next to a mining device, a discharge unit 800 on a discharge location, and several transport units 100, arranged between the loading unit 700 and the discharge unit 800. The mobile haulage arrangement 1 is located inside a mine and is connecting the mining location with the discharge location along a path through the mining shafts. The transport units 100 can either be wheel units 105 or crawler units 205, keeping the mobile haulage arrangement 1 movable within the mining shafts. As can be seen from FIGS. 1 and 2b, the mobile haulage arrangement is able to bend around corners within the mine, following a path through the mining shafts. The mobile haulage arrangement has an overall length L1. In FIG. 2b, the wheel units 105 and crawler units 205 are arranged in an alternating order. Because of the modularity of the arrangement, different setups of wheel units and crawler units are possible. The loading unit 700 together with two crawler units 205 and two wheel units 105 can be described as the loading end 70 of the mobile haulage arrangement 1, which is located at the mining location. The discharge unit 800 together with two wheel units 105 and a crawler unit 205 can be described as the discharge end 80 of a mobile haulage arrangement 1, which is located at the discharge location. As can be seen from FIG. 2b, the mobile haulage arrangement is able to turn in bends or around corners. When turning to the one side, an inside bend 7 on the inner side of the bending radius and an outside bend 8 on the outer side of the bending radius is formed. When turning to the other side, an inside bend 5 on the inner side of the bending radius and an outside bend 6 on the outer side of the bending radius is formed.

FIG. 3a shows a detailed top view of the discharge end 80 of the mobile haulage arrangement 1 of FIG. 2b, comprising the discharge unit 800, a crawler unit 205 and two wheel units 105. Between each of the discharge unit 800, the wheel units 105 and the crawler unit 205, a support structure 1000 is arranged, respectively. Starting from the discharge unit 800, a support structure 1000 is connected to a first wheel unit 105, followed by another support structure 1000, a crawler unit 205, a further support structure 1000 and another wheel unit 105. Another part of the next support structure 1000 is shown as well, extending away from the discharge unit 800. Because of the modularity of the arrangement, different setups of wheel units 105, crawler units 205 and support structures 1000 are possible.

FIG. 3b shows a detailed top view of the loading end 70 of a mobile haulage arrangement 1 of FIG. 2b, comprising the loading unit 700, two crawler units 205 and two wheel units 105. Between each of the loading unit 700, the wheel units 105 and the crawler units 205, a support structure 1000 is arranged, respectively. Starting from the loading unit 700, a support structure 1000 is connected to a first crawler unit 205, followed by another support structure 1000, a wheel unit 105, a further support structure 1000, another crawler unit 205, another support structure 1000 and a further wheel unit 105. Another part of the next support structure is shown as well, extending away from the loading unit 700. Because of the modularity of the arrangement, different setups of wheel units 105, crawler units 205 and support structures 1000 are possible.

Figure 5:
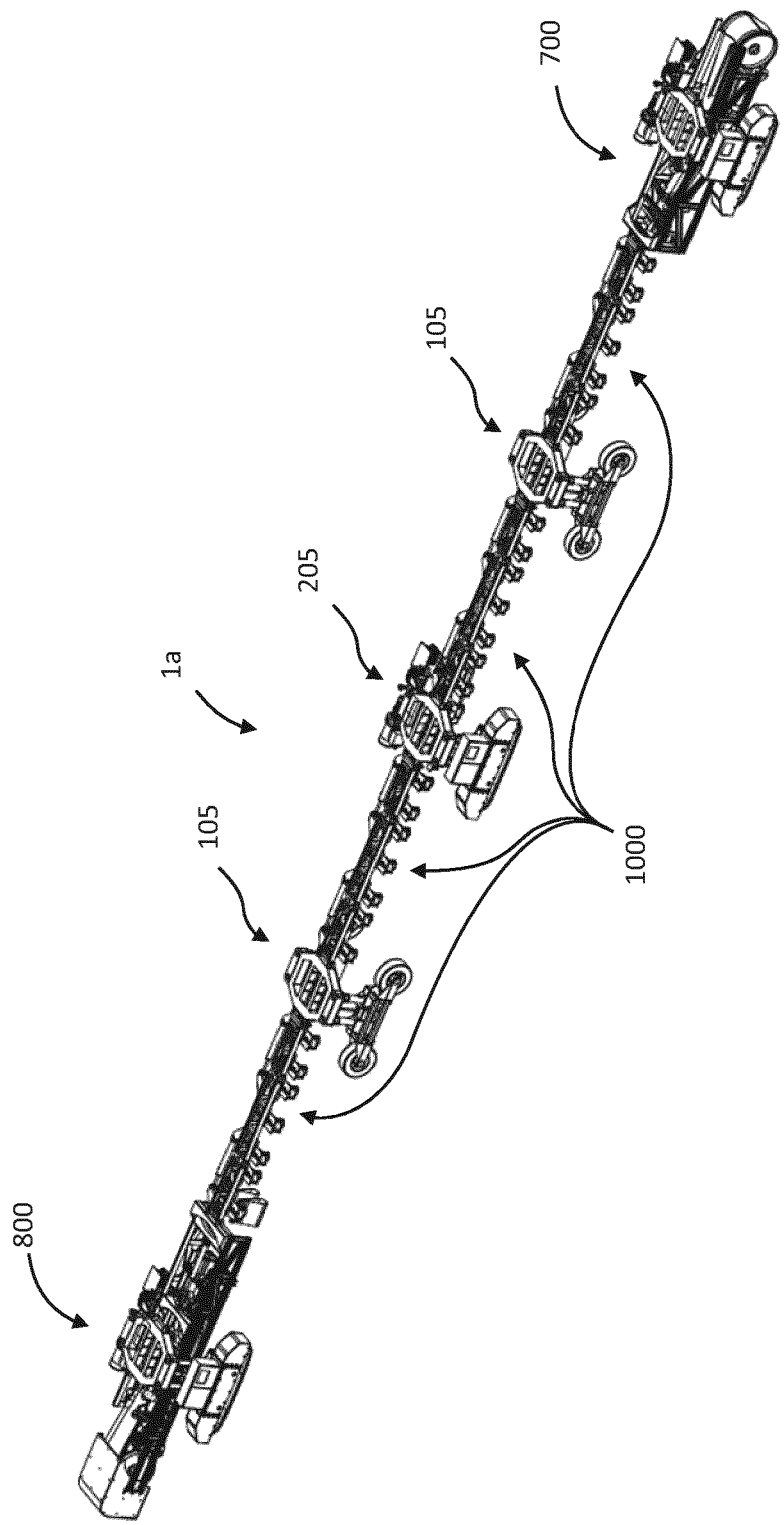

To describe the modularity of the mobile haulage arrangement, FIGS. 4a, 4b and 5 show side, top and perspective views, respectively, of an alternative setup of a mobile haulage arrangement 1a. This alternative setup 1a comprises a discharge unit 800, two wheel units 105, a crawler unit 205, a loading unit 700 and a total of four support structures 1000, interconnecting the discharge unit 800, the wheel units 105, the crawler unit 205 and the loading unit 800. The alternative setup of the mobile haulage arrangement 1a has an overall length L1a being shorter than the length L1 of the mobile haulage arrangement 1, shown in FIG. 2a.

FIG. 6 shows a perspective cross-sectional view of an enclosed belt conveyor 20 employing a belt 10. The belt 10 has two opposite longitudinal edges 11 and 12, which are formed as wedge-shaped profiles attached to either side of a highly flexible center part through a process of hot vulcanization. These two opposite longitudinal edges 11, 12 are each provided with a vulcanized belt edge core 13 for absorbing belt tension.

The belt 10 is folded by arranging the first one of the two opposite longitudinal edges 11 below the second one of the two opposite longitudinal edges 12. As a result, the belt 10 forms a pouch with a drop-like section, in which fragmented material 4 is placed and through which it is conveyed along the conveying direction 2. By means of this enclosed belt conveyor 20 it is possible to minimize dust and spillage. Particularly, the belt 10 has the advantage of being capable to drive even very small-radius curves, thus rendering transfer points superfluous. As a result, the belt 10 can be employed as a closed loop from the loading end 70 of the mobile haulage arrangement 1 to the discharge end 80 of the mobile haulage arrangement 1.

The belt 10 as shown in FIG. 6 is arranged in a guide assembly 30 that is implemented as a single guide assembly 37. A single guide assembly 37 is a guide assembly 30 which guides the belt by utilizing a single side guide roller 31 arranged on one side of the enclosed belt conveyor 20 and a lower guide roller 32 arranged below at least one of the two opposite longitudinal edges 11, 12 of the belt 10.

The single guide assembly 37 is used to guide the belt 10 along the conveying direction 2 from the loading end 70 of the mobile haulage arrangement 1 to the discharge end 80. This movement is effected by said single side guide roller 31 and a lower guide roller 32. The side guide roller 31 and the lower guide roller 32 are in friction contact with the belt 10 of the enclosed belt conveyor 20.

The side guide roller 31 is arranged such as to establish friction contact with a side of the enclosed belt conveyor 20 that is opposite to the wedge-shaped profiles that are provided as the two opposite longitudinal edges 11, 12. The center axis XS of the side guide roller 31 is parallel to an axis substantially orthogonal to the ground if the mobile haulage arrangement is provided in a basic operation position on a substantially horizontal ground as described herein. The lower guide roller 32 is brought into friction contact with the first opposite longitudinal edge 11. The center axis XE of the lower guide roller 32 is provided under an angle of approximately 45° in relation to the axis substantially orthogonal to the ground if the mobile haulage arrangement is provided in said basic operation position on a substantially horizontal ground. During movement of the enclosed belt conveyor 20 in the conveying direction 2, the side guide roller 31 and the lower guide roller 32 rotate around their respective center axes XS and XE such as to guide the belt 10 in a conveying direction 2.

Figure 7C:
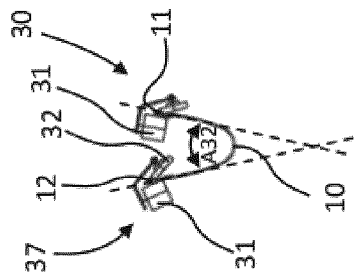
FIG. 7c: shows a cross-sectional view of a partly open belt of an enclosed belt conveyor.
Figure 7B:
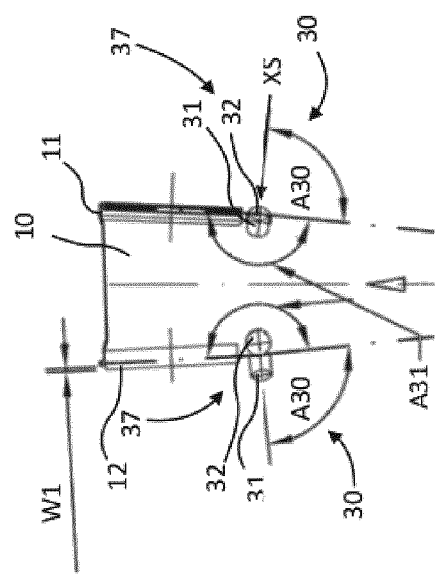
FIG. 7b: shows a top view of the fully open belt of an enclosed belt conveyor according to FIG. 7b.
Figure 7A:
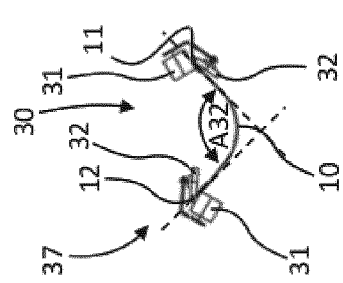
FIG. 7a: shows a cross-sectional view of a fully open belt of an enclosed belt conveyor.
Figure 7F:
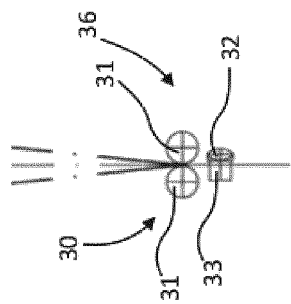
FIG. 7f: shows a top view of the closed belt of an enclosed belt conveyor according to FIG. 7e.
Figure 7E:
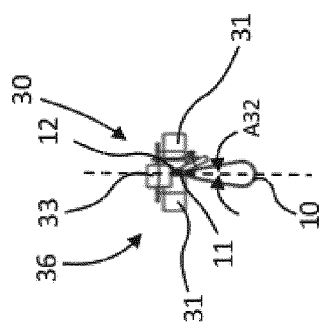
FIG. 7e: shows a cross-sectional view of a closed belt of an enclosed belt conveyor.
Figure 7D:
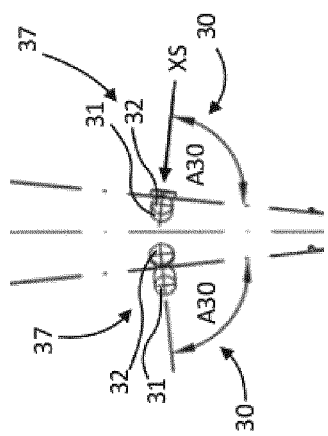
FIG. 7d: shows a top view of the partly open belt of an enclosed belt conveyor according to FIG. 7c.

FIG. 7*a*-7*f* show the opening and/or closing procedure of a belt 10 of an enclosed belt conveyor. While FIGS. 7*a*, 7*c* and 7*e* show a cross-sectional view, FIGS. 7*b*, 7*d* and 7*f* show a top view, respectively. In FIG. 7*a*, a cross-sectional view of a fully open belt 10 of an enclosed belt conveyor is shown. The opposite longitudinal edges 11, 12 of the belt of the enclosed belt conveyor are each engaged in a guide assembly 30. Both guide assemblies 30 are in this case single guide assemblies 37, comprising a side guide roller 31 and a lower guide roller 32. Each single guide assembly 37 engages a longitudinal edge 11, 12 of an enclosed belt conveyor, holding the edge between the space of the side guide roller 31 and the lower guide roller 32. FIG. 7*b* shows a top view of FIG. 7*a*, wherein the engagement of the belt 10 of an enclosed belt conveyor is visualized. The two single guide assemblies 37 engage the belt in a way such that an axis of rotation XS of each of the side guide rollers engaging the opposite longitudinal edges 11, 12 of the belt 10 include an angle A30, which is preferably between 90 degrees and 180 degrees. Each longitudinal edge 11, 12 of the belt 10 engaged by each single guide assembly 37 include an angle A31 around the axis of rotation of the each side guide rollers of approximately 179 degrees or less, resulting in the opening or closing of the belt. In FIGS. 7*a* and 7*b*, the position of the belt can be described as fully open. A belt 10 can be described as fully open, if two virtual lines extending tangential from each longitudinal edge 11, 12 of the belt 10 preferably include an angle A32 of 90 degrees or more. In a fully open position, the opposite longitudinal edges are spread such that fragmented material can be loaded to or discharged from the belt 10. The belt 10 further has a width W1 between the belt edge core 13 and the outer end of the longitudinal edge 11, 12 which preferably lies in a range within 10 to 20 mm. FIGS. 7*c* and 7*d* show a cross-sectional and a top view, respectively, of a partly open belt 10 of an enclosed belt conveyor. In this partly open position the angle A32 between the virtual lines tangentially extending from each longitudinal edge 11, 12 is preferably below 90 degrees and above 0 degrees. In this partly open position, each of the opposite longitudinal edges 11, 12 of the belt 10 is engaged by a single guide assembly 37. The two single guide assemblies 37 engage the belt in a way such that an axis of rotation XS of each of the side guide rollers engaging the opposite longitudinal edges 11, 12 of the belt 10 include an angle A30, which is preferably around 90 degrees. FIGS. 7*e* and 7*f* show a cross-sectional and a top view, respectively, of a closed belt 10 of an enclosed belt conveyor. In this closed position the angle A32 between the virtual lines tangentially extending from each longitudinal edge 11, 12 is preferably 0 degrees. In this closed position, the two opposite longitudinal edges 11, 12 of the belt 10 are engaged by one full guide assembly 36, comprising of two side guide rollers 31, a lower guide roller 33 and a top guide roller 33. It is understood that the application of various guide assemblies, comprising various guide roller setups can be used, depending on the necessity of guidance of the belt 10. It is further understood that various angles A31 can be applied by the arrangement of guide assemblies 30, to provide a faster or slower opening and/or closing procedure of the belt 10.

Figure 8:
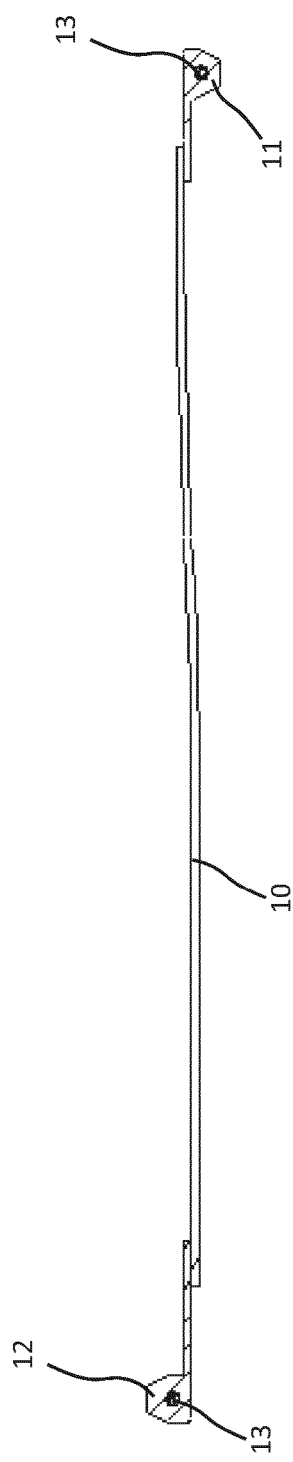
FIG. 8: shows a cross-sectional view of an open belt of an enclosed belt conveyor.

FIG. 8 shows a cross-sectional view of a belt of an enclosed belt conveyor in a fully open position. On each longitudinal edge 11, 12 of the belt 10 there is a thickening end of the belt, being unreleasably attached to the belt 10. The thickening end of the longitudinal edge each comprises a belt edge core 13, providing a stiffening of the longitudinal edge and avoiding an overbending of the longitudinal edge.

Figure 9B:
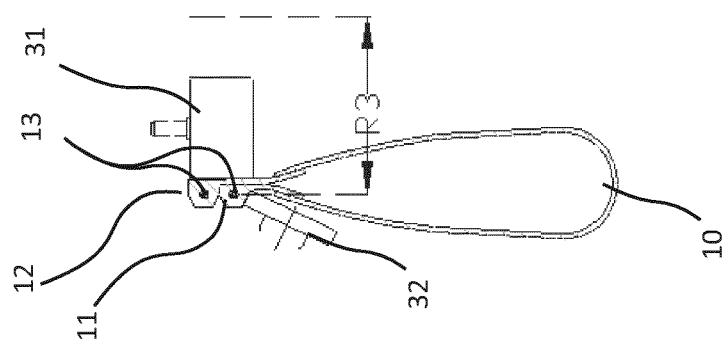
FIG. 9b: shows a cross-sectional side view of an enclosed belt conveyor.
Figure 9A:
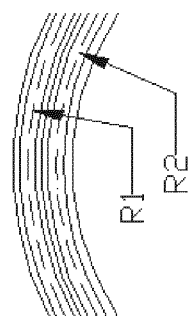
FIG. 9a: shows a side view of two opposite longitudinal edged of an enclosed belt conveyor in a vertical bend.

FIG. 9*a* shows a cross-sectional view of a bending of the belt edge cores 13 arranged inside the two opposite longitudinal edges 11, 12 of the belt 10 in case of a vertical curve. R2 designates the radius of the belt edge core 13 of the first one of the two opposite longitudinal edges 11 and R1 designates the radius of the belt edge core 13 of the second one of the two opposite longitudinal edges 12. If the two opposite longitudinal edges 11, 12 are arranged above each other in the vertical direction—as shown in FIG. 9*a*—the belt edge cores 13 do not have the same horizontal bending radius (R1≠R2). Further, in order to prevent overstressing of the belt edge cores 13, a certain minimum radius should be maintained.

FIG. 9*b* shows a cross-sectional view of an enclosed belt conveyor 20. The belt 10 is folded to form a pouch having a drop-like cross-sectional shape by arranging the two opposite longitudinal edges 11, 12 above one another in a vertical direction. A side guide roller 31 is arranged such as to be in friction contact with the side of the enclosed belt conveyor 20 that is opposite to the wedge-shaped profiles that are provided as the two opposite longitudinal edges 11, 12. A lower guide roller 32 is arranged below the first one of the two opposite longitudinal edges 11. The enclosed belt conveyor is driven by the side guide roller 31 and the lower guide roller 32. Radius R3 indicates a horizontal bending radius of the enclosed belt conveyor 20 when the enclosed belt conveyor is configured to convey along a horizontal curvature, for example, when the enclosed belt conveyor is configured to convey along a path around a corner having a certain radius.

Figure 10B:
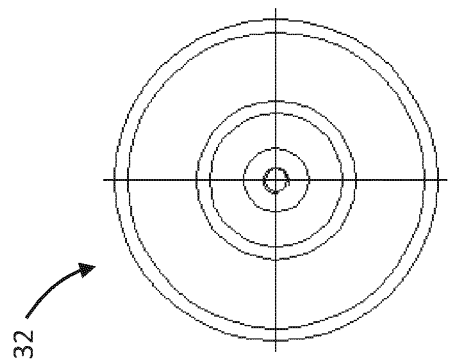
Figure 10A:
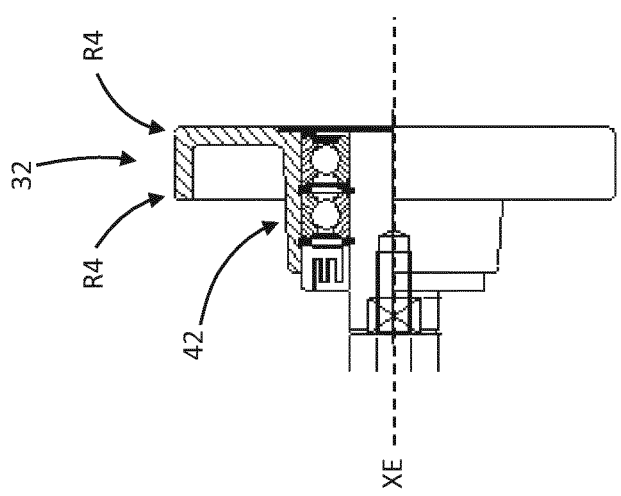
FIG. 10a: shows a partly cross-sectional side view of a lower guide roller.

FIG. 10a shows a partly cross-sectional side-view of the lower guide roller 32 and FIG. 10b shows a top view of a lower guide roller 32. The lower guide roller 32 comprises a lower guide roller bearing 42 and rotates around a center axis XE. R4 designates an outer radius of the lower guide roller 32.

Figure 11:
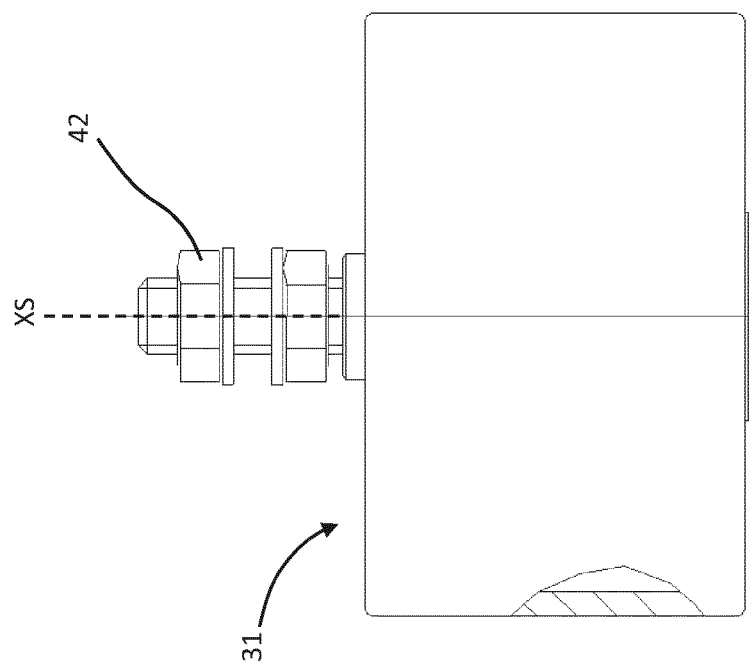
FIG. 11: shows a partly cross-sectional side view of a side guide roller.

FIG. 11 shows a partly cross-sectional side view of the side guide roller 31. The side guide roller 31 comprises side guide mounting means 41 for mounting the side guide roller 31 in the guide assembly 30. During rotation, side guide roller 31 rotates around the center axis XS.

Figure 12:
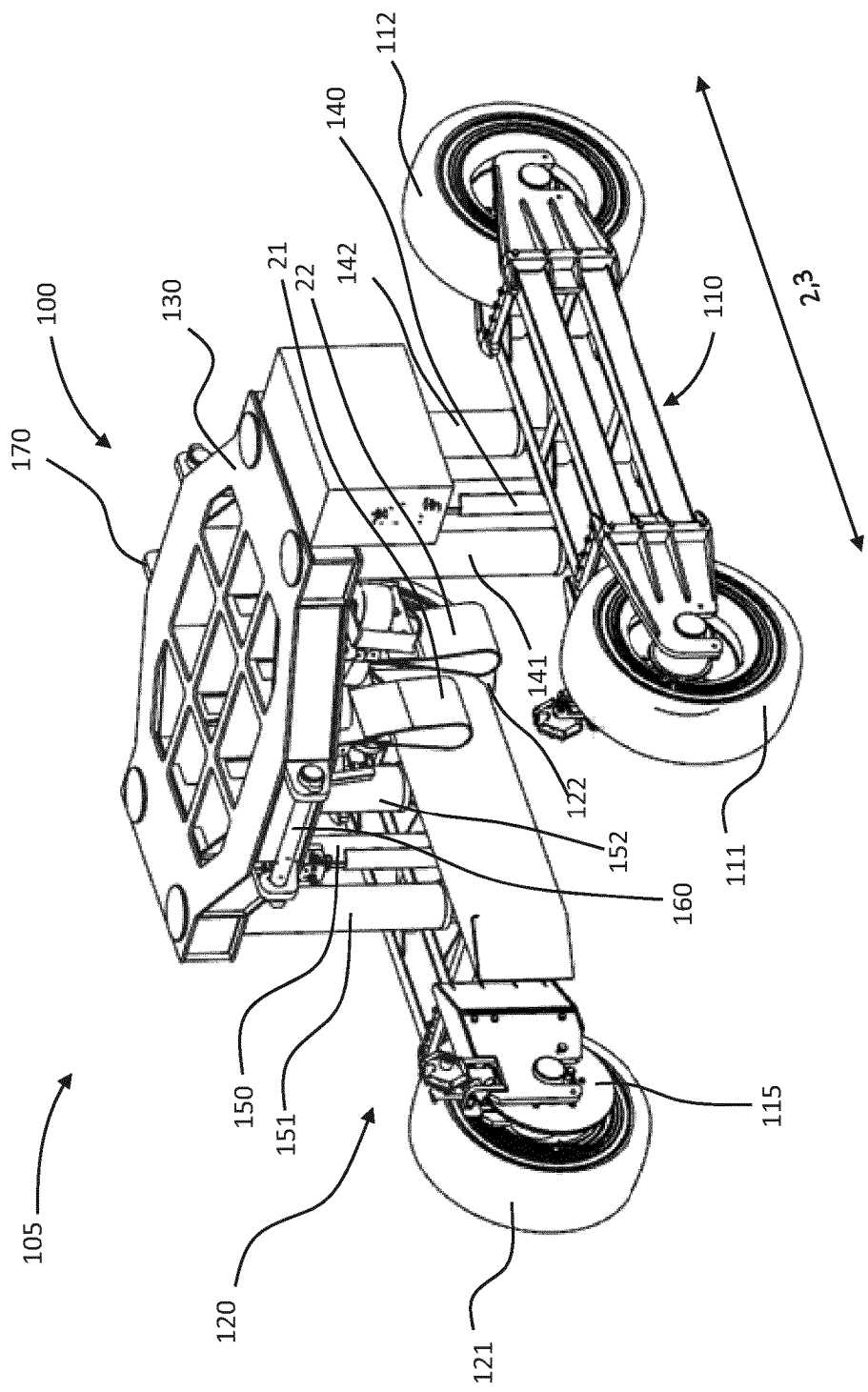
FIG. 12: shows a perspective view of a wheel unit.

In FIG. 12, a transport unit 100 is shown, comprising two ground transportation structures 110, 120 movable in a conveying direction 2 or the opposite direction 3, and a support frame 130, connecting the two ground transportation structures 110, 120 such that two runs 21, 22 of a belt of an enclosed belt conveyor can be fitted under the support frame 130 between the ground transportation structures 110, 120. Each of the ground transportation structures 110, 120 comprises a height adjustment device 140, 150, adapted to vary the position of at least a portion of the support frame. In this embodiment the height adjustment devices 140, 150 are hydraulic cylinders, arranged in a substantially vertical direction. The height adjustment devices 140, 150 comprise two height adjustment support structures 141, 142, 151, 152, each, wherein the height adjustment support structures are adapted to support the support frame towards the ground transportation structures. Preferably, the height adjustment support structures are extendable in a substantially vertical direction and adapted to move together with the height adjustment devices 140, 150.

The support frame 130 comprises two connectors 160, 170, one on each side of the support frame 130 in a conveying direction 2, opposite of each other. The connectors 160, 170 have a bar-shaped figure and are adapted to form a releasable connection, for example with a support structure. The ground support structures 110, 120 feature two wheels 111, 112, 121, 122 each, arranged on the bottom side of the ground transportation structures 110, 120, after one another in a conveying direction, providing a connection of the transport unit 100 with the ground. The transport unit 100 can thus be described as a wheel unit 105. The wheels 111, 112, 121, 122 each comprise a pneumatic tire, arranged on a wheel rim. Further, the wheel unit comprises a braking unit 115, which can be for example arranged on the axis of a wheel 121. In this embodiment, it can be seen in FIG. 12, that the extension of the support frame 130 in the conveying direction 2 is smaller than an extension of both the ground transportation structures 110, 120 in the conveying direction 2.

Figure 13:
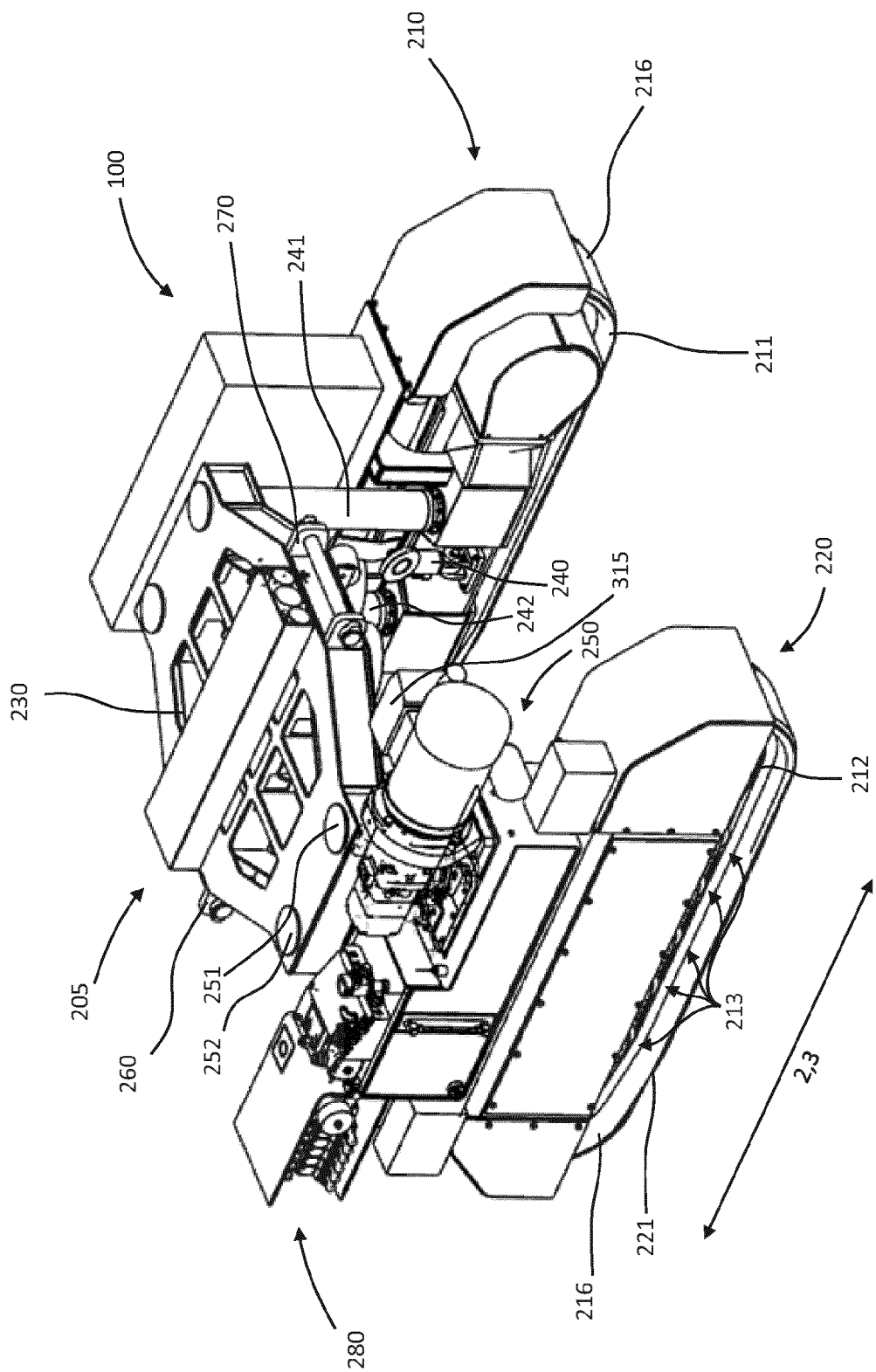
FIG. 13: shows a perspective view of a crawler unit.

FIG. 13 shows an alternative embodiment of a transport unit 100, in a similar setup as shown in FIG. 12, comprising two ground transportation structures 210, 220, arranged for a movement in a conveying direction 2 or the opposite direction 3, and a support frame 230 connecting the two ground transportation structures 210, 220 in a way that two runs of an enclosed belt conveyor can be fitted under the support frame 230 between the ground transportation structures 210, 220. Each of the ground transportation structures 210, 220 comprises a height adjustment device 240, 250, adapted to vary the position of at least a portion of the support frame. The height adjustment devices 240, 250 further comprise two height adjustment support structures 241, 242, 251, 252, each, wherein the height adjustment support structures are adapted to support the support frame towards the ground transportation structures. Preferably, the height adjustment support structures 241, 242, 251, 252 are extendable in a substantially vertical direction and adapted to move together with the height adjustment devices 240, 250. In this embodiment the height adjustment devices 240, 250 are hydraulic cylinders, arranged in a vertical direction. The support frame comprises two connectors 260, 270, one on each side of the support frame 230 in a conveying direction 2, opposite of each other. The connectors 260, 270 have a bar-shaped figure and are adapted to form a releasable connection, for example with a support structure. The ground support structures 210, 220 in this embodiment are crawler tracks 211, 221, each arranged on the bottom side of the ground transportation structures 210, 220, providing a connection of the transport unit 100 with the ground. The transport unit 100 in this embodiment can thus be described as a crawler unit 205. The crawler unit 205 further comprises a crawler drive 215 for driving the crawler tracks. The crawler tracks both comprise a crawler chain 216, two main crawler drive means 212, driving the chain 216 of each of the crawler tracks, and six auxiliary crawler drive means 213, supporting the crawler chain 216. The crawler unit 205 further comprises an operation unit 280, capable of operating the crawler. In this embodiment it can also be seen, that the extension of the support frame 230 in the conveying direction 2 is smaller than an extension of both the ground transportation structures 210, 220 in the conveying direction 2.

Figure 14:
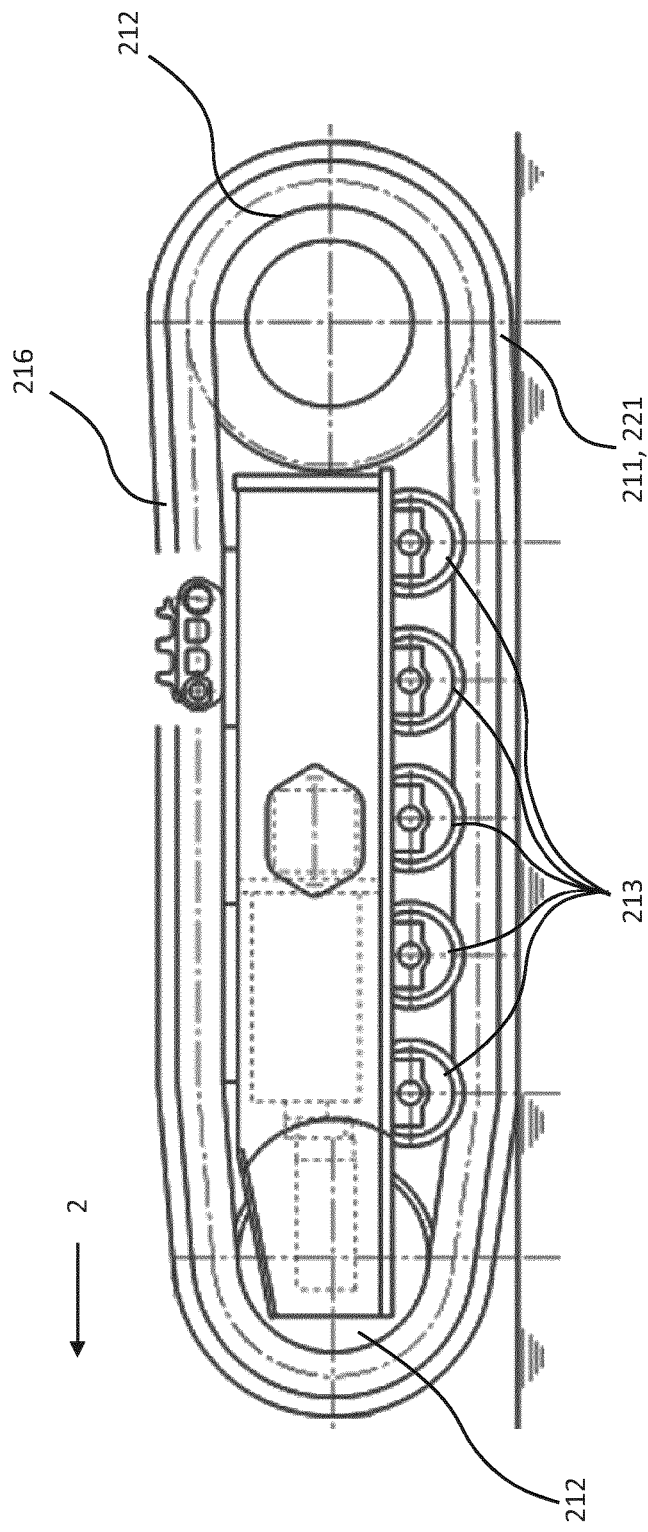
FIG. 14: shows a cross-sectional side view of a ground transportation structure of a crawler unit.

FIG. 14 shows a cross-sectional view of a crawler track 211, 221 of a crawler unit 205. In this embodiment, the crawler track 211, 221 comprises a crawler chain 216 being driven by the main crawler drive means 212, being located at the front and back end of the crawler track 211, 221, being driven by the crawler drive 215 in a conveying direction 2. The crawler track 211, 221 further comprises a set of five auxiliary crawler drive means 213, being arranged between the front and back main crawler drive means 212 in a longitudinal orientation behind another in the conveying direction 2.

FIGS. 15a-f, cross-sectional side views of three different spikes are shown. While FIGS. 15a, 15c, and 15e show the various forms of spikes 225, 226, 227, FIGS. 15b, 15d, and 15f show the various forms of spikes 225, 226, 227 being mounted in a crawler chain 216, accordingly. It is understood, that these types of spikes are only examples and the application of spikes in the crawler chain 216 is not limited by these examples.

Figure 16:
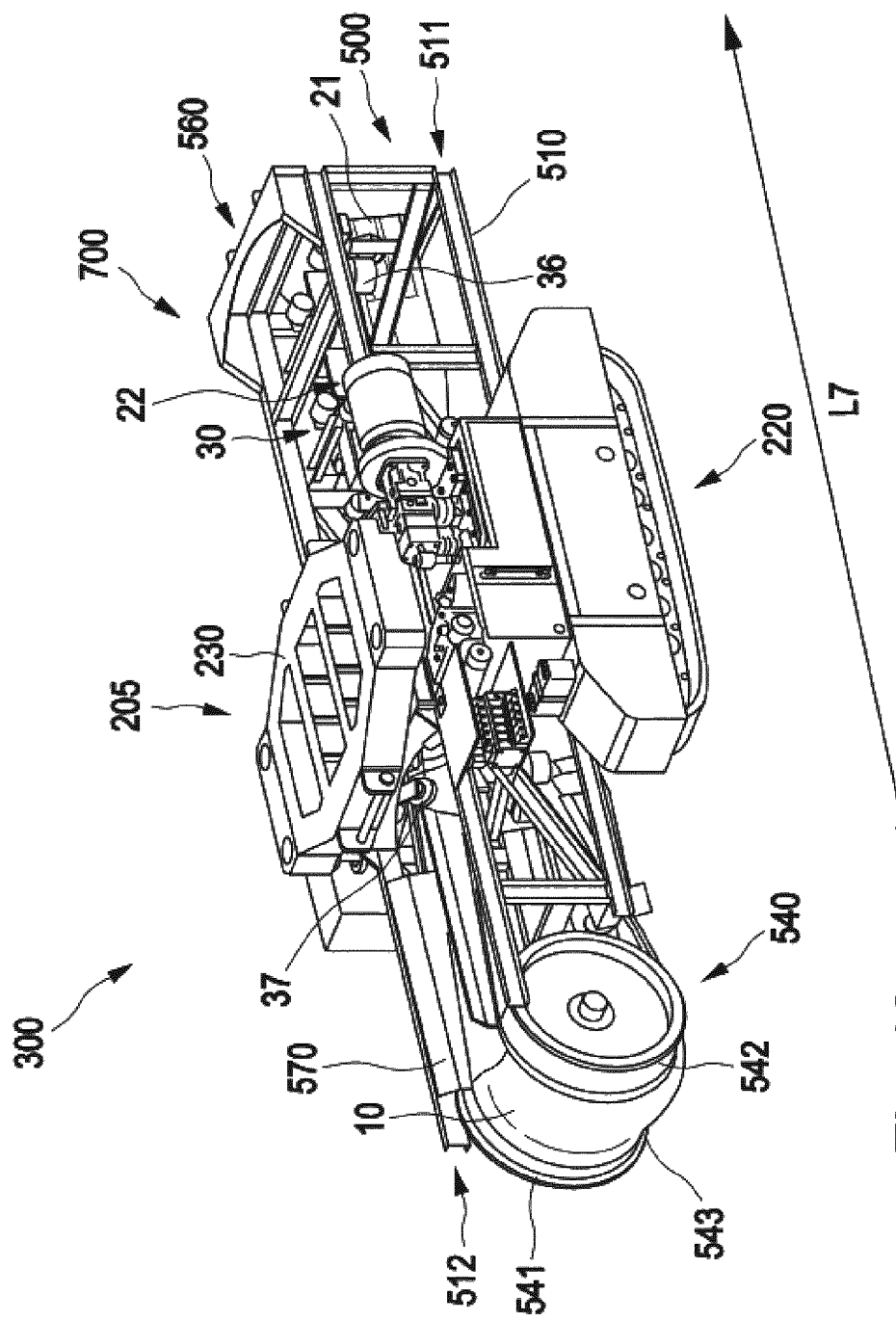
FIG. 16: shows a perspective view of a loading unit.

FIG. 16 shows a perspective view of a loading unit 700, comprising a material transfer unit 300 with a material transfer structure 500, and a crawler unit 205 according to FIG. 13. The material transfer structure 500 is mounted at the crawler unit 205 below the support frame 230 and comprises a base frame 510 with a first end 511 and a second end 512. The material transfer structure 500 further comprises rolling means 540, which are arranged on the second end 512 of the base frame 510 and which are adapted to turn the belt 10 between a conveyor run 21 and a return run 22 of an enclosed belt conveyor. The rolling means comprise of two return discs 541, 542 and a roller 543. The two return discs 541, 542 are arranged on each side of the belt 10 being in contact with a part of the belt 10 near the opposite longitudinal edges 11, 12. The roller 543 is preferably arranged between the two return discs, supporting the belt 10 in its center, between the opposite longitudinal edges. On the first end 511 of the base frame 510 there is further a connector 560 arranged to connect with a support structure, for example. On the second end 512 there is further a loading arrangement 570 arranged to guide fragmented material to be conveyed in the belt 10 of the enclosed belt conveyor. The material transfer structure further comprises a plurality of guide assemblies 30 for engaging opposite longitudinal edges of a belt 10 of an enclosed belt conveyor. The guide assemblies 30 are partly adapted as double guide assemblies 35, full guide assemblies 36, single guide assemblies 37, and half guide assemblies 38, arranged within the base frame 510, depending on the weight and need for guidance of the belt 10. The belt 10 is opened and closed within the material transfer structure 500 as described in FIG. 7a-f. In this particular embodiment, the conveyor run 21 of the belt 10 is closed and the return run 22 of the belt 10 is open in the material transfer structure. The material transfer unit has an overall length L7 in longitudinal direction.

Figure 17:
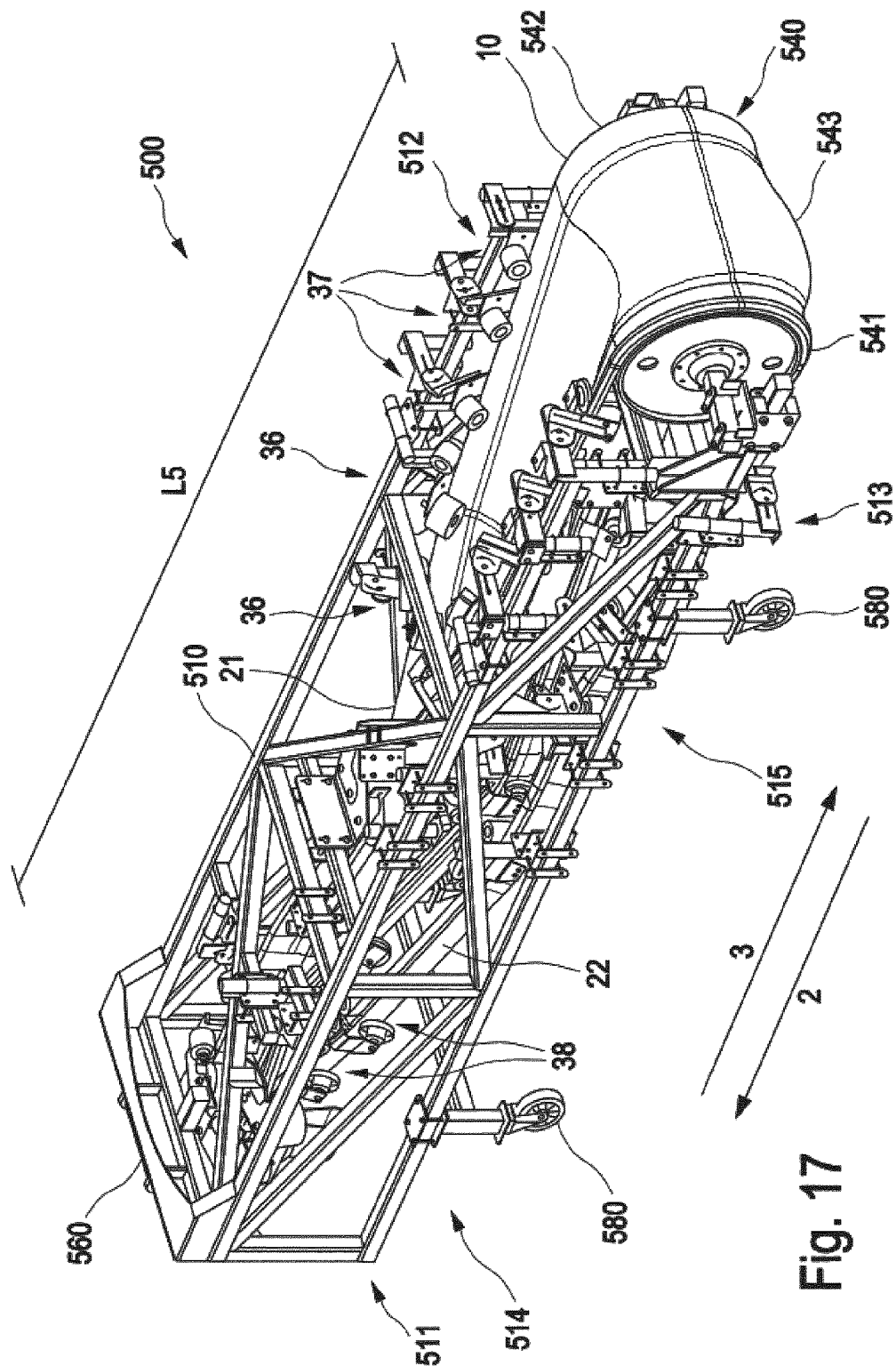
FIG. 17: shows a perspective view of a material transfer structure of the loading unit according to FIG. 16.

FIG. 17 shows a perspective view of the material transfer structure 500 of the loading unit 700 according to FIG. 16. In this figure, the guiding of the belt 10 is visualized in particular. The conveyor run 21 runs in conveying direction 3, exiting the base frame 510 at the first end 511 while the return run 22 runs in the opposite direction 3, entering the base frame 510 at the first end 511. Both, the conveyor run 21 and the return run 22 enter and exit the base frame 511 at substantially the same height level, respectively. When the return run 22 enters the base frame 511 in a closed position, the empty belt 10 is spread by guide assemblies 30 into a partly open state while being guided from the entry level height to a lower level through a first, inclined section 514 adjacent the first end 511 of the base frame 510. Once arrived in the lower state, the belt 10 of the return run is further spread to a fully open state and guided underneath the conveyor run 21 by further guide assemblies 30 in a second, less or not inclined section 515 at the second end 512 of the base frame 510. At the second end 512 of the base frame 510, the fully open belt 10 is turned by the rolling means 540 in a way that the inside of the return run 22 is turned to the outside of the conveyor run 21 and the outside of the previous return run 22 is turned to the inside of the conveyor run 21. In this position, the open belt 10 is filled with fragmented material through the loading arrangement 570. The conveyor run 21 of the belt 10 is then guided by the guide assemblies 30 from a fully open position to a partly open position in a section adjacent the second end 512 of the base frame 510 and then guided from a partly open position to a closed position in a section adjacent the first end 511 of the base frame 510. When exiting the base frame 510 at the first end 511, the conveyor run 21 is at the same level as the return run 22 entered the base frame 510. The material transfer structure 500 further comprises support rollers 580 arranged on the base frame 510 to support the material transfer structure towards the ground. The material transfer structure 500 has an overall length L5 in longitudinal extension, which is preferably the same length as the length L7 of the loading unit 700.

Figure 18:
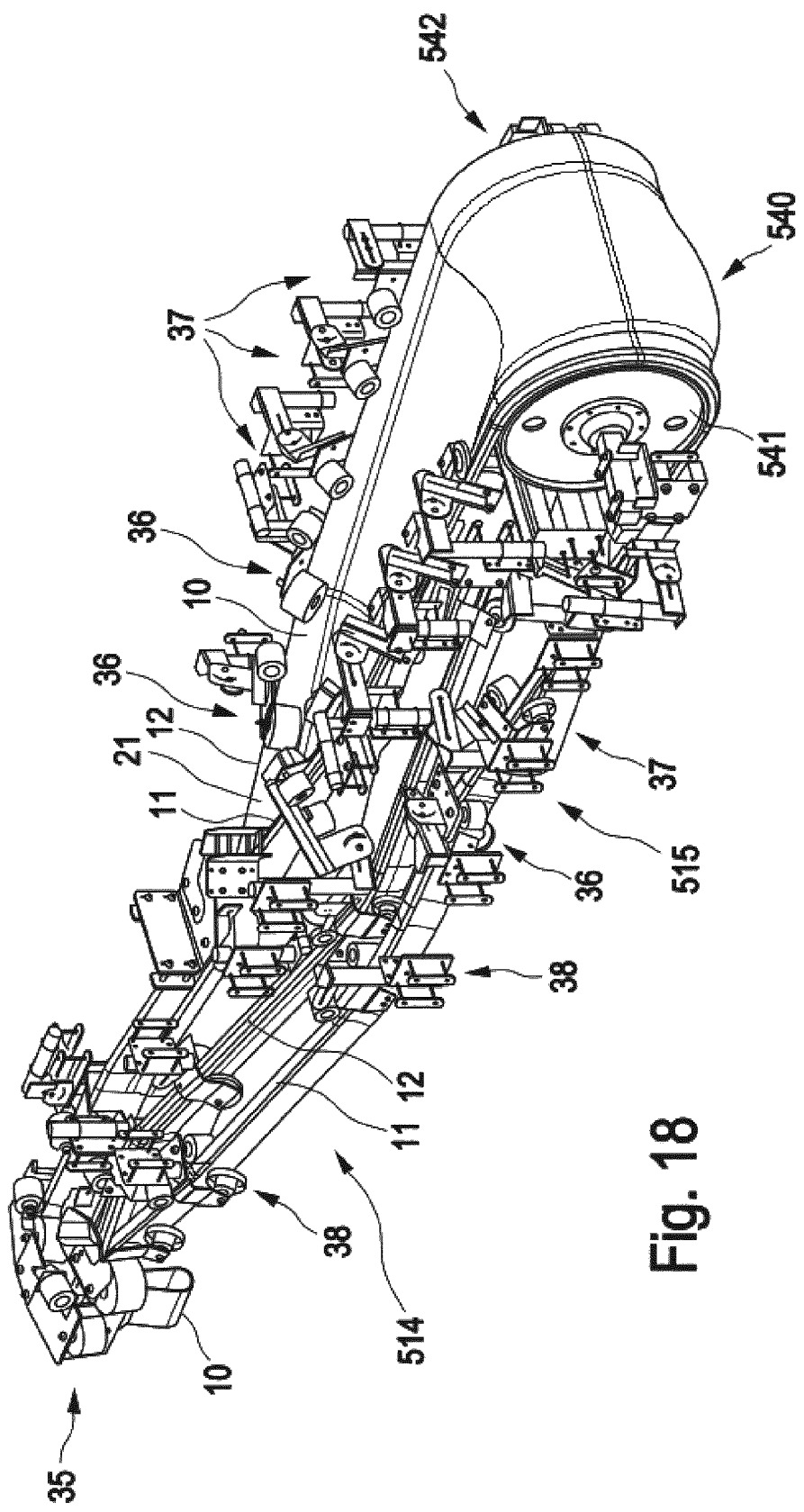
FIG. 18: shows a detailed perspective view of a material transfer structure of the loading unit according to FIG. 17.

FIG. 18 shows a detailed view of the material transfer structure 500 according to FIG. 17, in particular of the arrangement of the guide assemblies 30, which are arranged according to the guiding and carrying necessities of the material transfer structure 500. On the first end of the base frame a double guide assembly 35 is arranged, engaging both opposite longitudinal edges 11, 12 of the belt 10 together in a closed position, followed by a single guide assembly 38, and two of half guide assemblies 38, opening the belt 10 by separating the opposite longitudinal edges 11, 12 of the belt 10 into separate half guide assemblies 38. Then the belt 10 is guided to the lower end of the second end of the base frame, followed by a full guide assembly 36 and then a plurality of single guide assemblies 37 to open the belt from a partly open position and into a fully open position at the rolling means 540. The return discs 541, 542 of the rolling means each guide a longitudinal edge 11, 12 of the belt 10 when turning the belt 10 between the conveyor run 21 and the return run 22. After passing the rolling means 540, the belt 10 is reversely closed in similar fashion by first applying a plurality of single guide assemblies 37 to guide the belt 10 from fully open into a partly open position and into the closed position.

Figure 19:
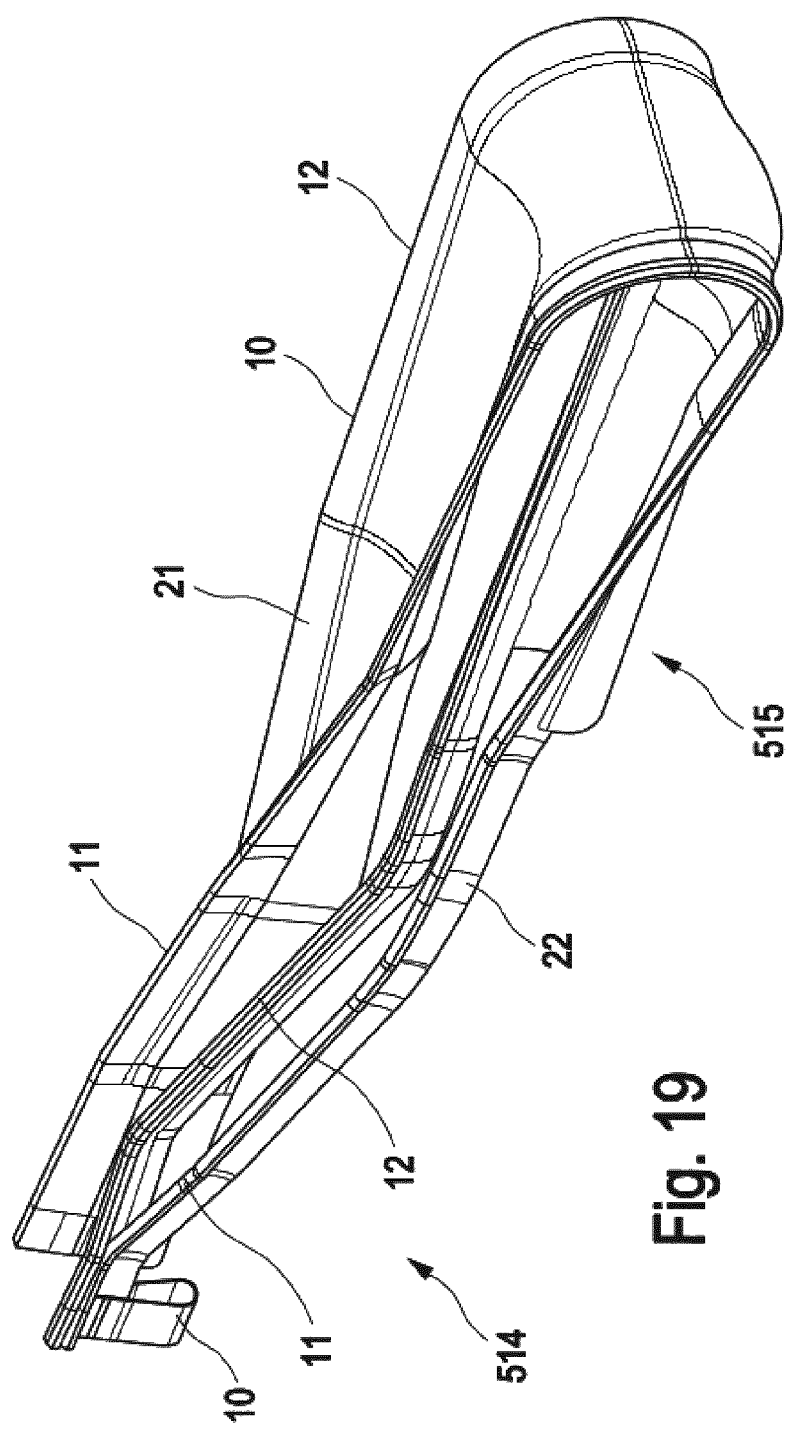
FIG. 19: shows a perspective view of a belt in a material transfer structure for the loading unit according to FIG. 18.

FIG. 19 shows the movement and in particular the opening and closing procedure of the belt 10 in the material transfer structure 500 according to FIG. 18.

Figure 20:
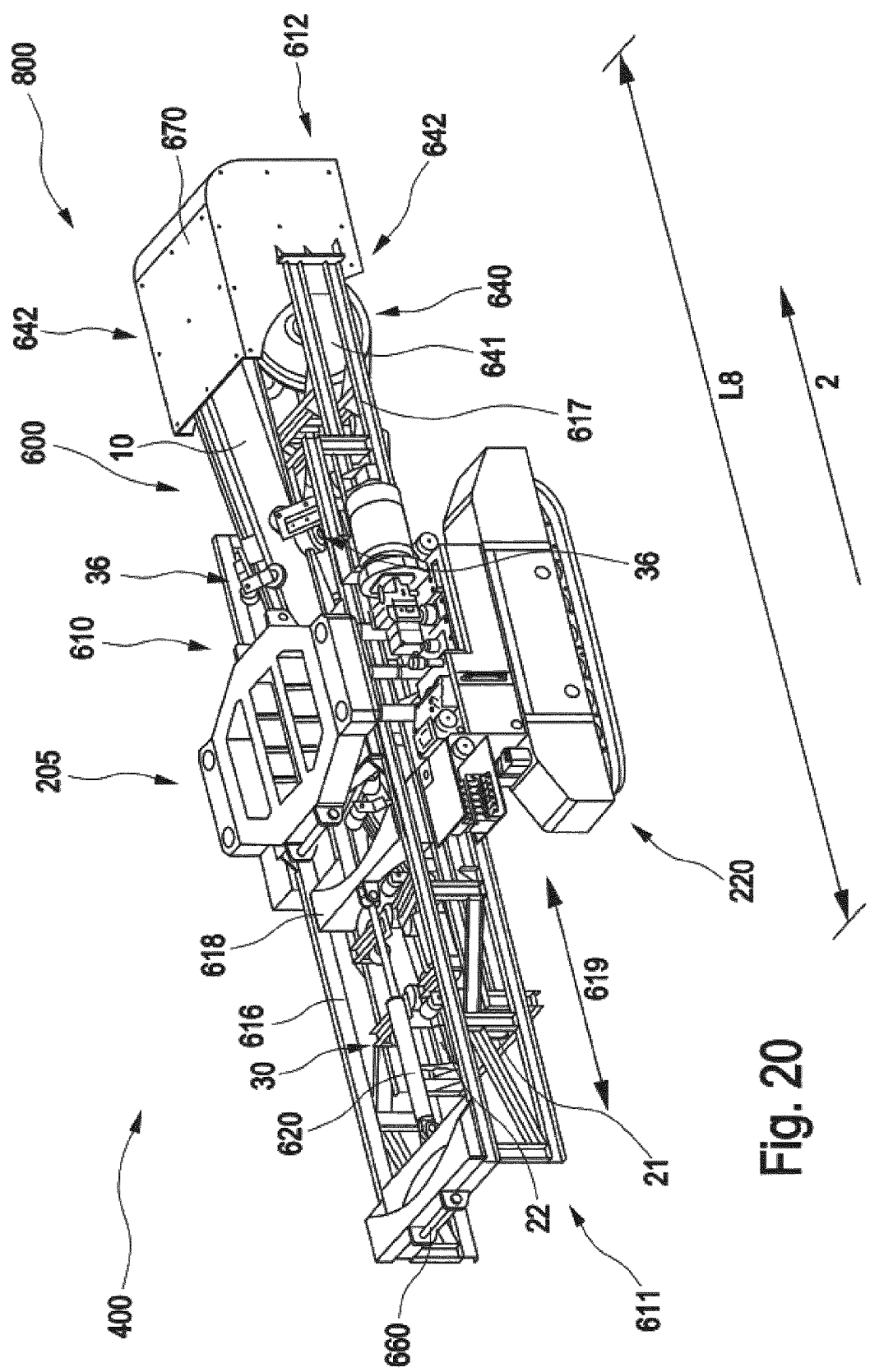
FIG. 20: shows a perspective view of a discharge unit.

FIG. 20 shows a discharge unit 800, comprising of a material transfer unit 400, with a material transfer structure 600, and a crawler unit 205 according to FIG. 13. The material transfer structure 600 is mounted at the crawler unit 205 below the support frame 230 and comprises a base frame 610 with a first end 611 and a second end 612. The base frame further comprises two parts 616, 617 which are connected with each other such that they are moveable in a translational movement 619 relative to each other in the conveying direction 2. This translational movement 619 is facilitated through a hydraulic cylinder 620, arranged between the two parts 616, 617 of the base frame 610, mounted on the hydraulic cylinder mounting element. In this embodiment, the first end 611 is located at one part 616 of the base frame 610 and the second end 612 is located at the other part 617 of the base frame 610. Preferably, the part 616 of the base frame 610 is fixedly mounted to the crawler unit 205, preferably on the support frame 230 of the crawler unit 205. The material transfer structure 600 further comprises rolling means 640, which are arranged on the second end 612 of the base frame 610 and which are adapted to turn the belt 10 between a conveyor run 21 and a return run 22 of an enclosed belt conveyor. The rolling means comprise of two return discs 641, 642 and a roller 643. The two return discs 641, 642 are arranged on each side of the belt 10 being in contact with a part of the belt 10 near the opposite longitudinal edges 11, 12. The roller 643 is preferably arranged between the two return discs, supporting the belt 10 in center between the opposite longitudinal edges. On the first end 611 of the base frame 610 there is further a connector 660 arranged to connect with a support structure, for example. On the second end 612 there is further a discharge arrangement 670 arranged to guide fragmented material to be discharged from the belt 10 of the enclosed belt conveyor. The material transfer structure further comprises a plurality of guide assemblies 30 for engaging opposite longitudinal edges of a belt 10 of an enclosed belt conveyor. The guide assemblies 30 are adapted as full guide assemblies 36, arranged within the base frame 610, but can be any other type of guide assemblies as well. The belt 10 is opened and closed within the material transfer structure 600 as described in FIG. 7a-f. In this particular embodiment, the conveyor run 21 of the belt 10 is open and the return run 22 of the belt 10 is closed in the material transfer structure. The discharge unit 800 has an overall length L8 in longitudinal direction. Through the hydraulic cylinder 620, mounted between the two parts 616, 617 of the base frame 610, it is possible to move one part 617 towards and away from the other part 616 and thus, to move the guide assemblies 30 and the rolling means 640 towards and away from the rest of the mobile haulage arrangement 1, 1a. This is particularly preferred as it is thus possible to loosen and in particular tighten the belt 10 of the mobile haulage arrangement.

Figure 21:
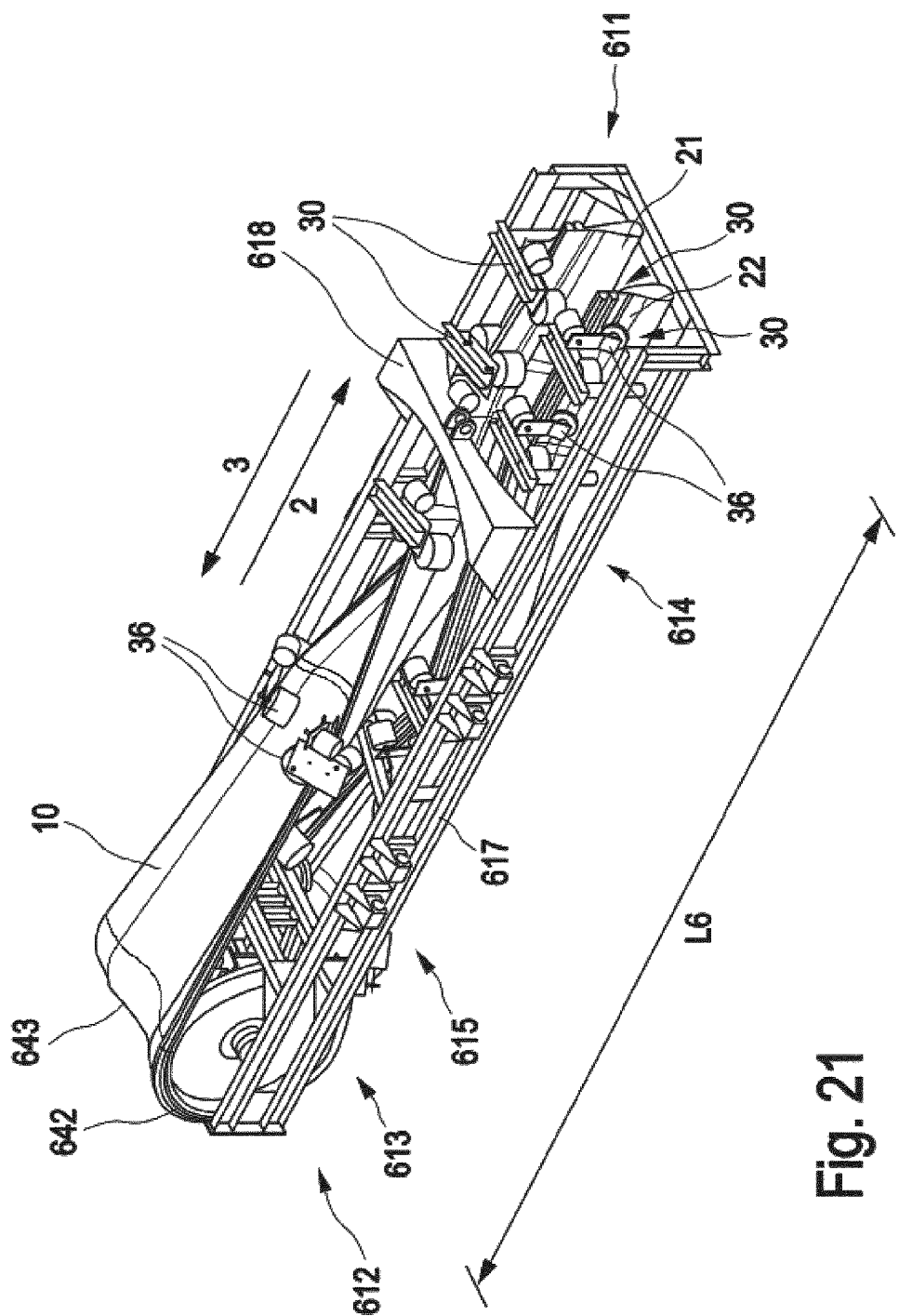
FIG. 21: shows a perspective view of a material transfer structure of the discharge unit according to FIG. 20.

FIG. 21 shows a perspective view of the material transfer structure 600 of the discharge unit 800 according to FIG. 20, in particular the part 616 of the base frame 610. In this figure, the guiding of the belt 10 within the discharge unit 800 is visualized in particular. The conveyor run 21 runs in conveying direction 3, entering the base frame 610 at the first end 611 while the return run 22 runs in the opposite direction 3, exiting the base frame 610 at the first end 611. Both, the conveyor run 21 and the return run 22 enter and exit the base frame 611 as substantially the same height level, respectively. When the conveyor run 22 enters the base frame 610 in a closed position, the belt 10 filled with fragmented material is first spread by guide assemblies 30 into a partly open position in a section adjacent the first end 611 of the base frame 610 and then spread into a fully open position in a section adjacent the second end 612 of the base frame 610. The belt 10 is then turned by the rolling means 640 in a way that the inside of the conveyor run 21 is turned to the outside of the return run 22 and the outside of the conveyor run 21 is turned to the inside of the return run 22. The return discs 641 and 642 of the rolling means 640 each guide a longitudinal edge 11, 12 of the belt 10 when turning the belt 10 between the conveyor run 21 and the return run 22. When being turned by the rolling means 640, the fragmented material transported in or on the belt 10 is then discharged from the discharge unit 800 through the discharge arrangement 670. The return run 22 of the belt 10 is then guided by the guide assemblies 30 from a fully open position at the lower end 613 of the second end 612 of the base frame 610 to a partly open position underneath the conveyor run 21 in a second, less or not inclined section 615 adjacent the second end of the base frame 610 and then to a closed position in an first inclined section 614 adjacent the first end 611 of the base frame 610 When exiting the base frame 610 at the first end 611, the return run 22 is at the same level as the conveyor run 21 entered the base frame 610 The material transfer structure 600 has an overall length L6 in longitudinal extension, which is preferably the same length as the length L8 of the discharge unit 800.

Figure 22:
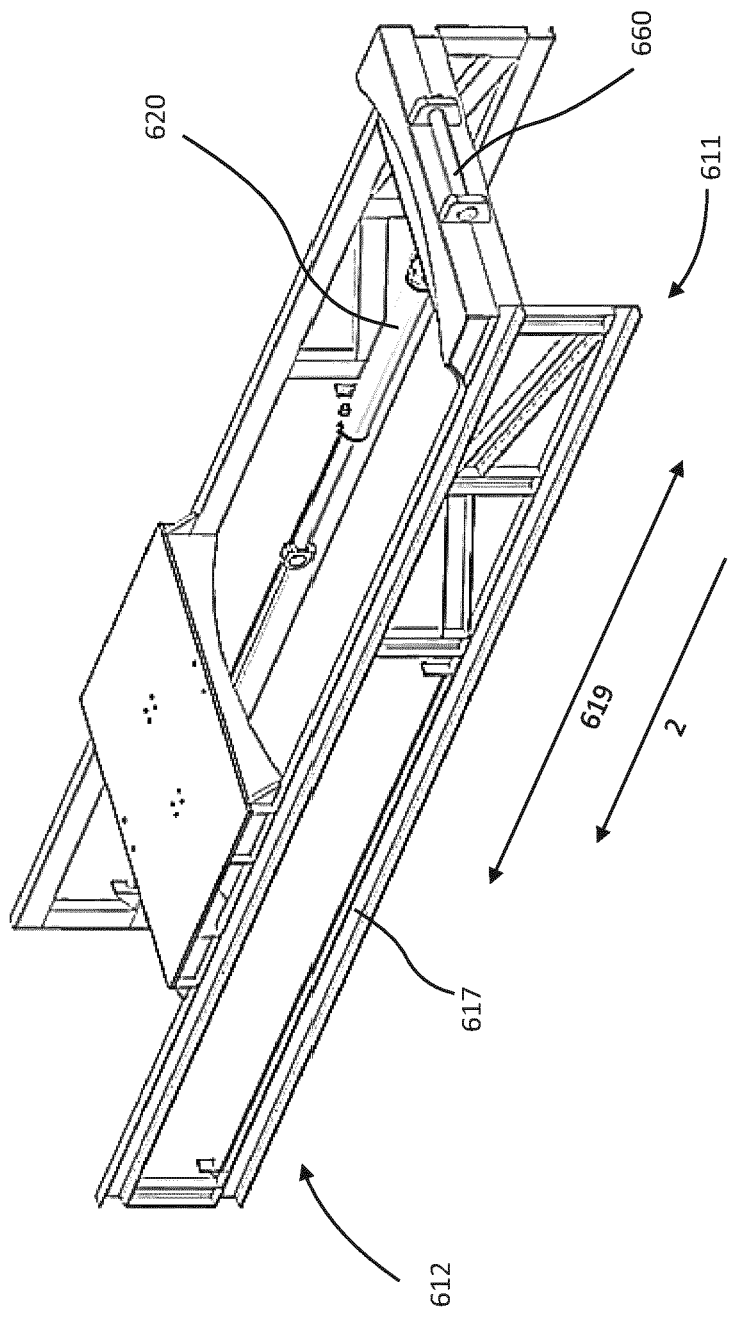
FIG. 22: shows a perspective view of a part of a base frame of a material transfer structure of the discharge unit according to FIG. 20.

FIG. 22 shows a perspective view of the part 617 of the base frame 610 of a material transfer structure 600 of the discharge unit 800 according to FIG. 20. The part 617 of the base frame can be arranged together with the part 616 so that the two parts 616, 617 are able to perform a translational movement 619 in the conveying direction 2. This is facilitated by a hydraulic cylinder 620, mounted on one part 617 of the base frame and mounted on the hydraulic cylinder mounting element 618 on the other part 616 of the base frame 610.

Figure 23:
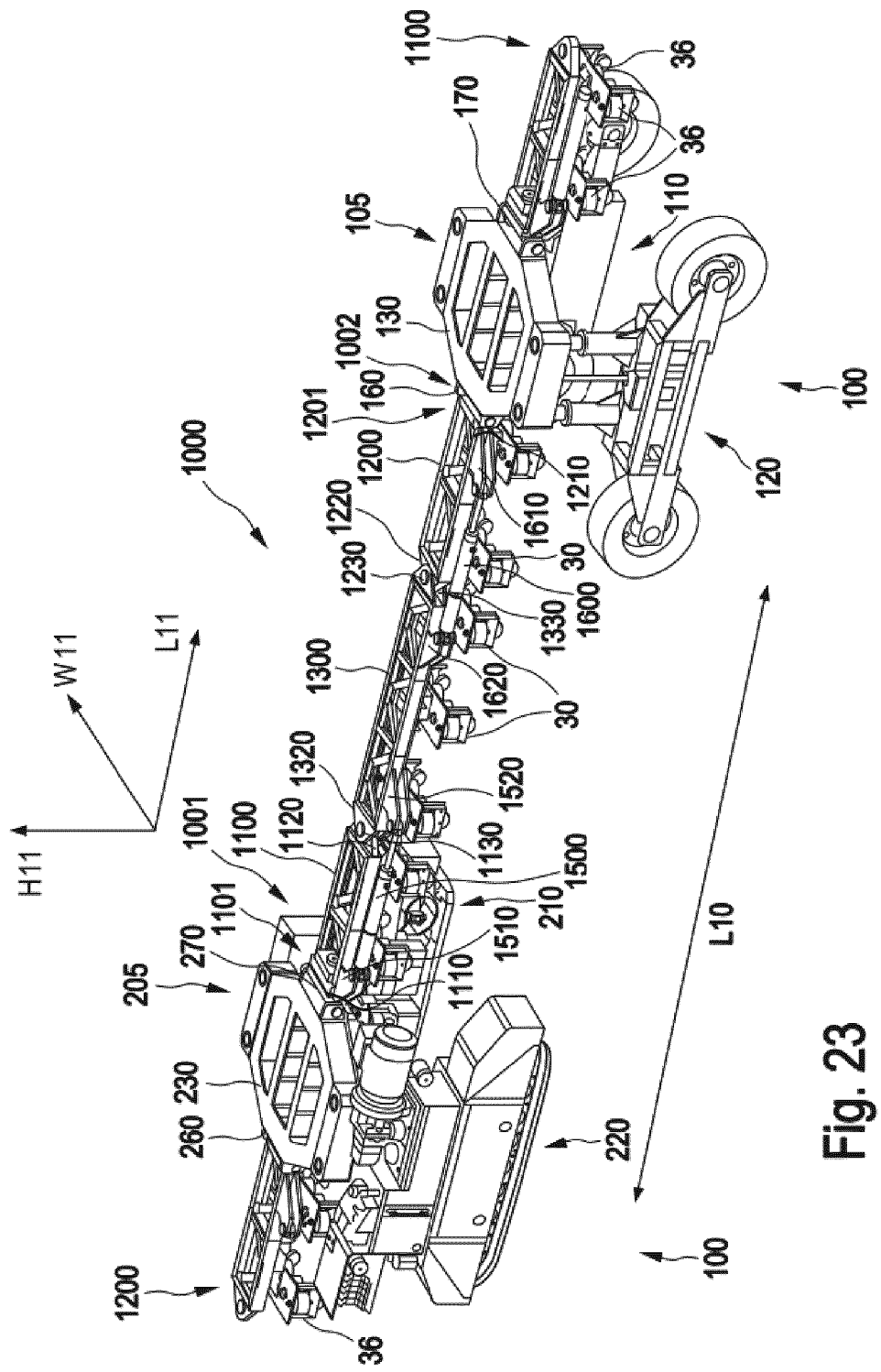
FIG. 23: shows a perspective view of a support structure mounted between a wheel unit and a crawler unit.

FIG. 23 shows a perspective view of a support structure 1000 mounted between a wheel unit 105 according to FIG. 12 and a crawler unit 205 according to FIG. 13. The support structure extends between a first end 1001 and a second end 1002 and comprises a first end element 1100 with a main extension in a longitudinal direction L11, a width extension in a width direction W11 orthogonal to the longitudinal direction L11 and a height extension in a height direction H11 orthogonal to the longitudinal direction L11 and the width direction W11. The support structure further comprises a second end element 1200 with a main extension in a longitudinal direction L11, a width extension in a width direction W11 orthogonal to the longitudinal direction L11 and a height extension in a height direction H11 orthogonal to the longitudinal direction L11 and the width direction W11. The support structure also comprises a link element 1300 with a main extension in a longitudinal direction L11, a width extension in a width direction W11 orthogonal to the longitudinal direction L11 and a height extension in a height direction H11 orthogonal to the longitudinal direction L11 and the width direction W11.

The first end element 1100, the second end element 1200 and the link element 1300 all comprise a framework structure, with longitudinal and width extension exceeding the height extension. The support structure further comprises a plurality of guide assemblies 30 for engaging opposite longitudinal edges of a belt of an enclosed belt conveyor, which can be, for example, full guide assemblies 36. In this embodiment, there are guide assemblies arranged at the first end element 1100, the second end element 1200 as well as the link element 1300. The first end element 1100 and the second end element 1200 both have an outer end 1101, 1201, respectively. Both outer ends 1101, 1201 comprise end connectors 1110, 1210, the first end connector 1110 and the second end connector 1210, respectively. The first and second end connectors 1110, 1210 both are adapted to form a connection with a transport unit 100, 105, 205.

In the shown embodiment, the first end connector 1110 has a ring-shaped form and engages with the bar-shaped form of the connector 270 of the crawler unit 205. Respectively, the second end connector 1210 forms a connection in the same way with the connector 160 of the wheel unit 105. On the opposite side of the crawler unit 205 in a longitudinal direction L11 another second end element 1200 is arranged and connected with the connector 260 of the crawler unit, while on the opposite side of the wheel unit 105 in a longitudinal direction L11 another first end element 1100 is arranged and connected with the connector 170 of the wheel unit.

It has to be understood that the transport units can be interchanged due to the modular setup of the mobile haulage arrangement to adapt to certain requirements. The connection formed between the first end connector 1110 and the connector 270 of the crawler unit 205 is adapted to allow for a rotation about an axis parallel to the width direction W11 and about an axis parallel to the longitudinal direction L11. The connection formed between the second end connector 1210 and the connector 160 of the wheel unit 105 is adapted to allow for a rotation about an axis parallel to the width direction W11. The first end element 1100 and the second end element 1200 both have an inner connector 1120, 1220, respectively, while the link element 1300 has two inner connectors 1320, 1330 on opposite ends of the link element 1300 in a longitudinal direction L11.

In this embodiment the inner connector 1120 of the first end element 1100 forms a connection with one of the end connectors 1320 of the link element 1300 while the inner connector 1220 of the second end element 1200 forms a connection with the other, opposite inner connector 1330 of the link element. Both connections allow for a rotation about an axis parallel to the height direction H11 and are supported by a connecting pin 1130, 1230 of the first and second end element 1100, 1200, respectively.

In this embodiment, the first end connector 1110 is fixed against a rotation about an axis parallel to the height direction H11, the second end connector 1210 is fixed against a rotation about an axis parallel to the height direction H11 and against a rotation about an axis parallel to the longitudinal direction L11, and the inner connectors 1120, 1220, 1320, 1330 are fixed against a rotation about an axis parallel to the width direction W11 and an axis parallel to the longitudinal direction L11, respectively.

Between the first end element 1100 and the link element 1300 as well as between the second end element 1200 and the link element, a first and second telescopic element 1500, 1600 are arranged, respectively. The first telescopic element 1500 is mounted on the first side to a first telescopic mounting element 1510, being arranged at the first end element 1100, and on the second side to a second telescopic mounting element 1520, being arranged at the link element 1300. Accordingly, the second telescopic element 1600 is mounted on the first side to a first telescopic mounting element 1610, being arranged at the second end element 1200, and on the second side to a second telescopic mounting element 1620, being arranged at the link element 1300.

The first and second telescopic elements 1500, 1600 are each adapted as a hydraulic cylinder, preferably being powered by a hydraulic valve block, being arranged at either one or both of the wheel unit and/or the crawler unit. The first and second telescopic elements 1500, 1600 are further arranged to control a rotational movement about the inner connectors 1120, 1220, of the first and second end elements 1100, 1200, respectively. Further, the first and second telescopic elements 1500, 1600 are adapted to register a distance by which it is retracted and/or extended.

Figure 24:
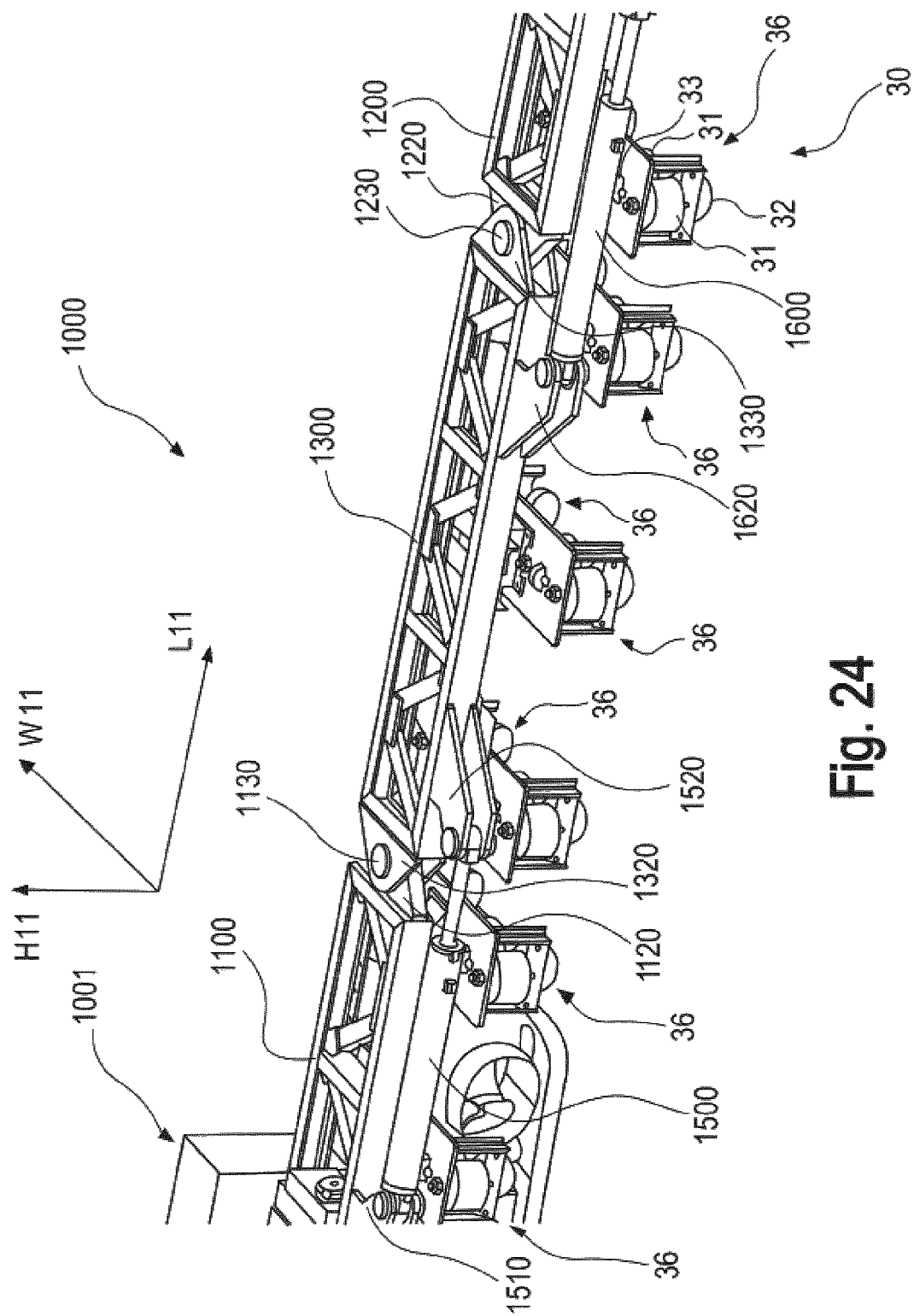
FIG. 24: shows a detailed perspective view of the support structure according to FIG. 23.

As can be seen from this embodiment, the first telescopic element 1500 is bridging the connection formed between the two inner connectors 1120, 1320 of the first end element 1100 and the link end element 1300 and the second telescopic element 1600 is bridging the connection formed between the two inner connectors 1220, 1330 of the second end element 1200 and the link element 1300. The overall length of the support unit L10 is about 6 m FIG. 24 shows a detailed perspective view of the support structure 1000 according to FIG. 23. Here it can be seen, that the guide assemblies 30 are adapted as full guide assemblies 36, comprising two opposite side guide rollers 31, a top guide roller 33 and a lower guide roller 32 for engaging the belt of an enclosed belt conveyor.

Figure 25:
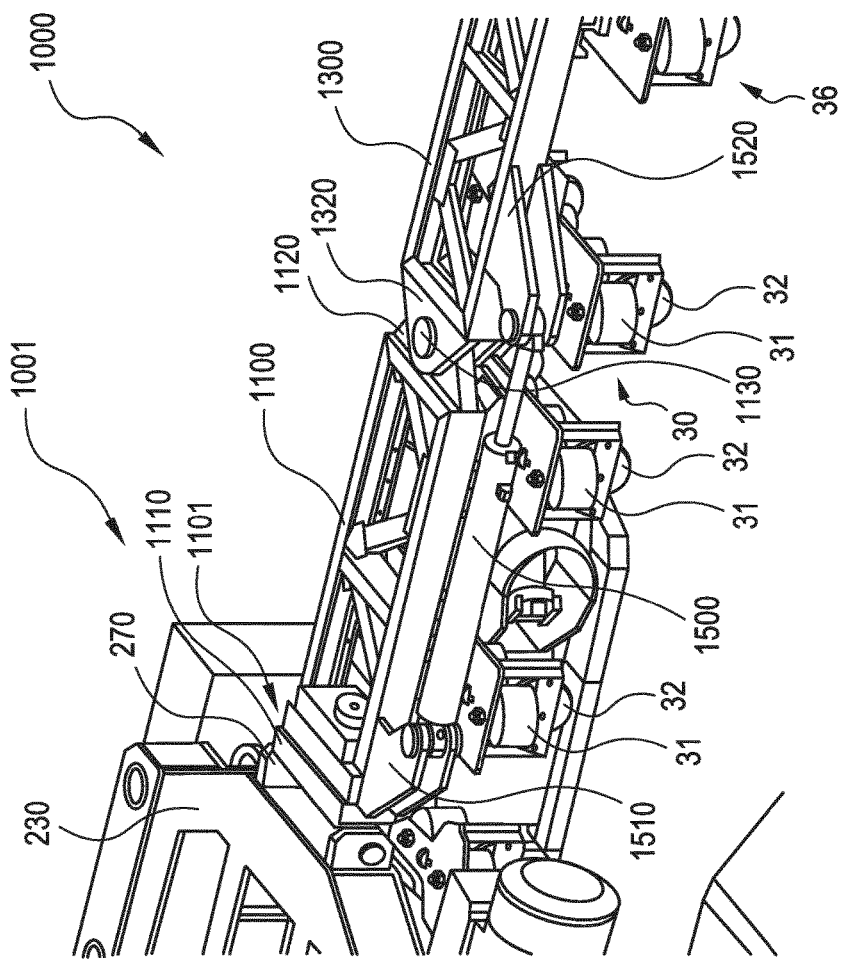
FIG. 25: shows a detailed perspective view of a first end of the support structure according to FIG. 24.

FIG. 25 shows a detailed perspective view of a first end 1100 of the support structure 1000 according to FIG. 24.

Figure 26:
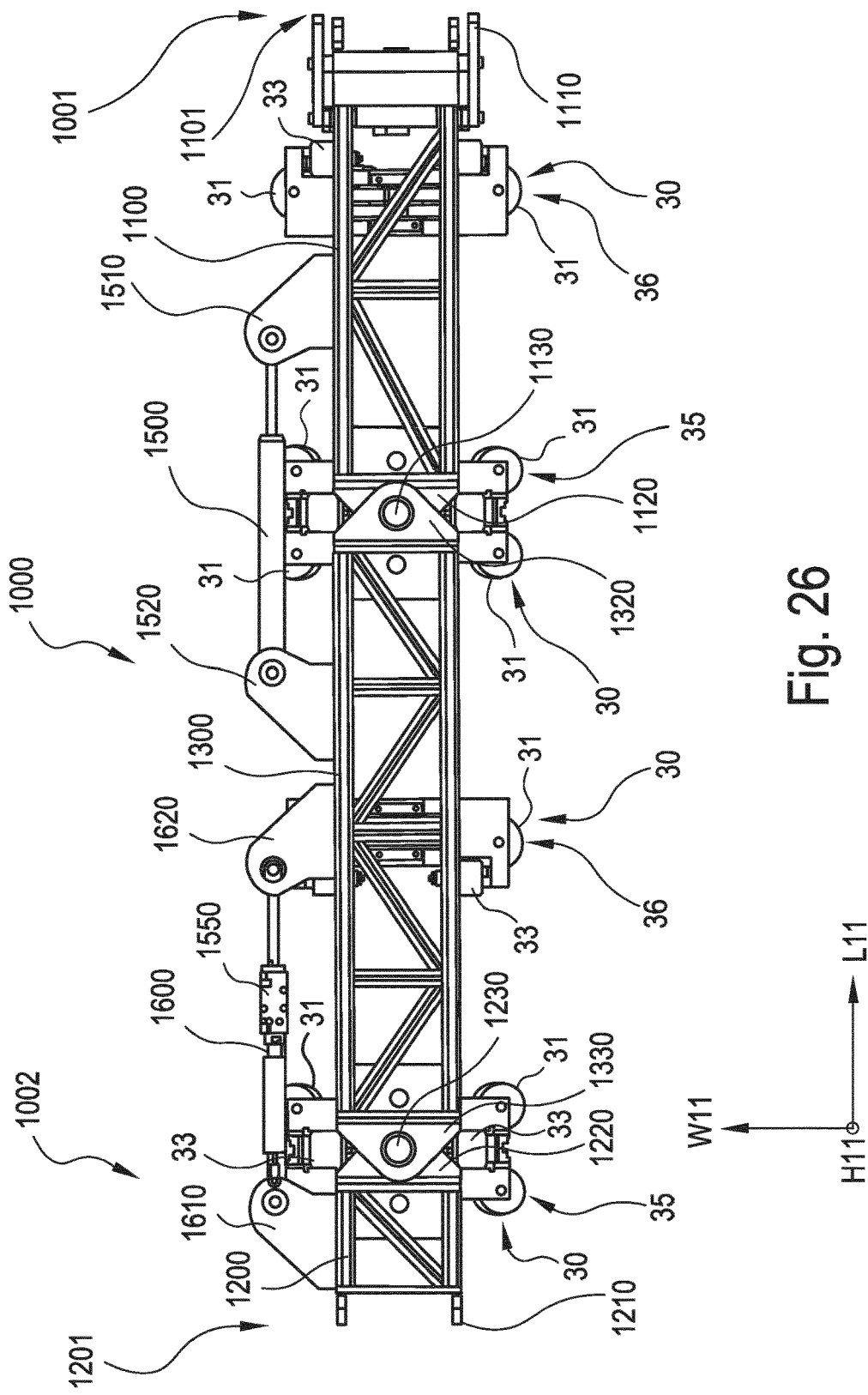
FIG. 26: shows a top view of a support structure in a straight position.
Figure 27:
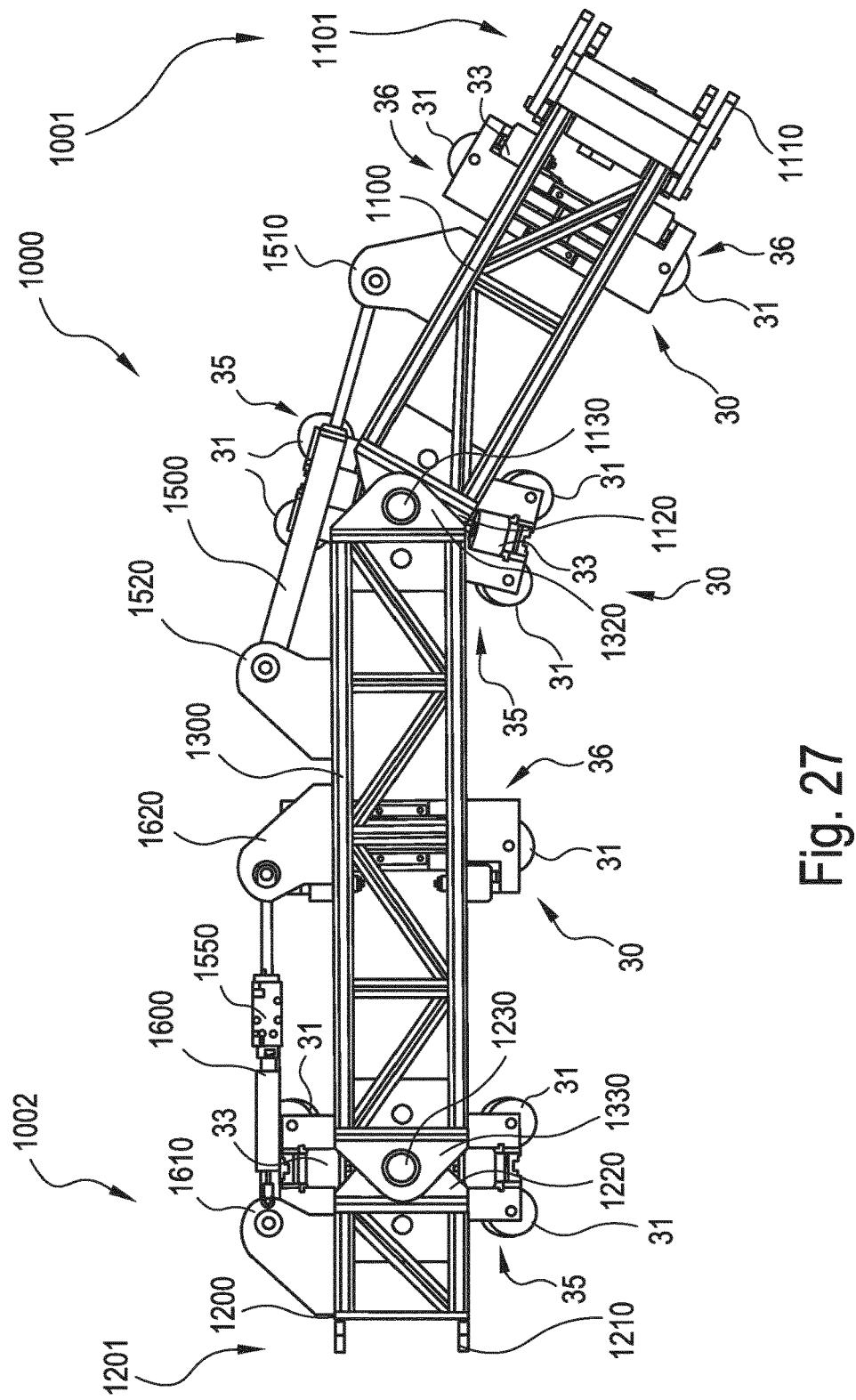
FIG. 27: shows a top view of the support structure according to FIG. 26 in a half-bent position.
Figure 28:
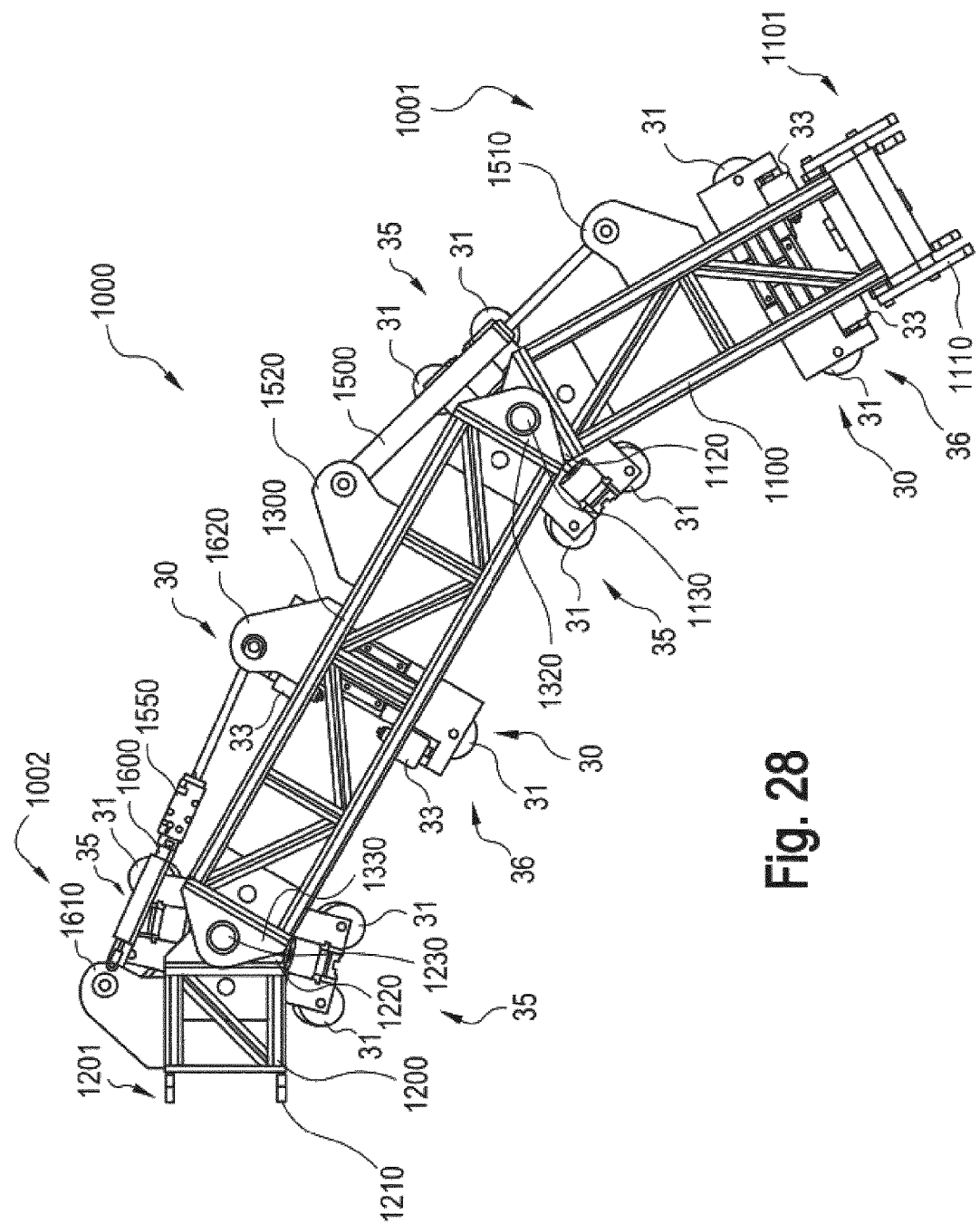
FIG. 28: shows a top view of the support structure according to FIG. 26 in a fully bent position.
Figure 29:
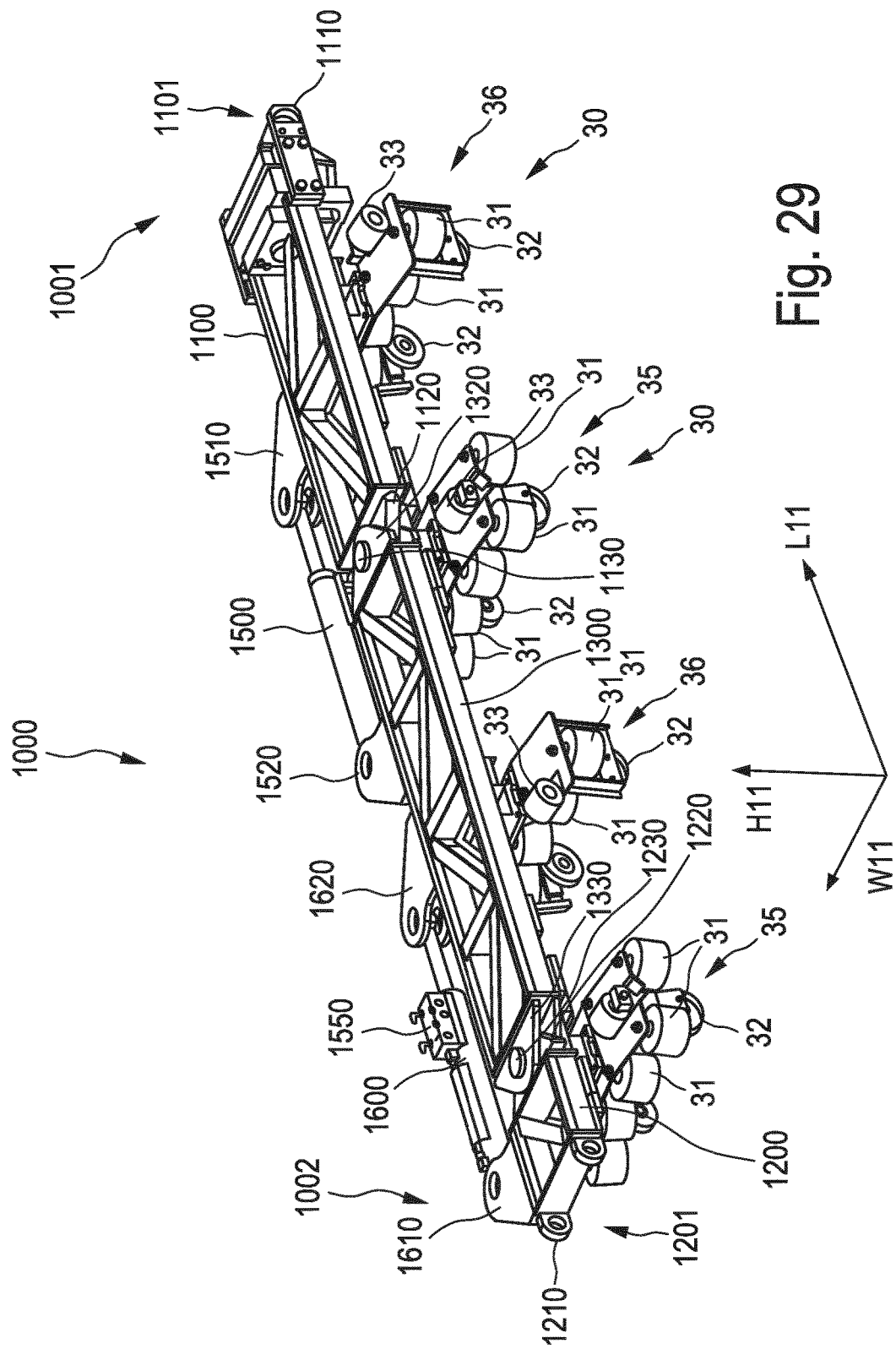
FIG. 29: shows a perspective view of the support structure according to FIG. 26 in a straight position.
Figure 30:
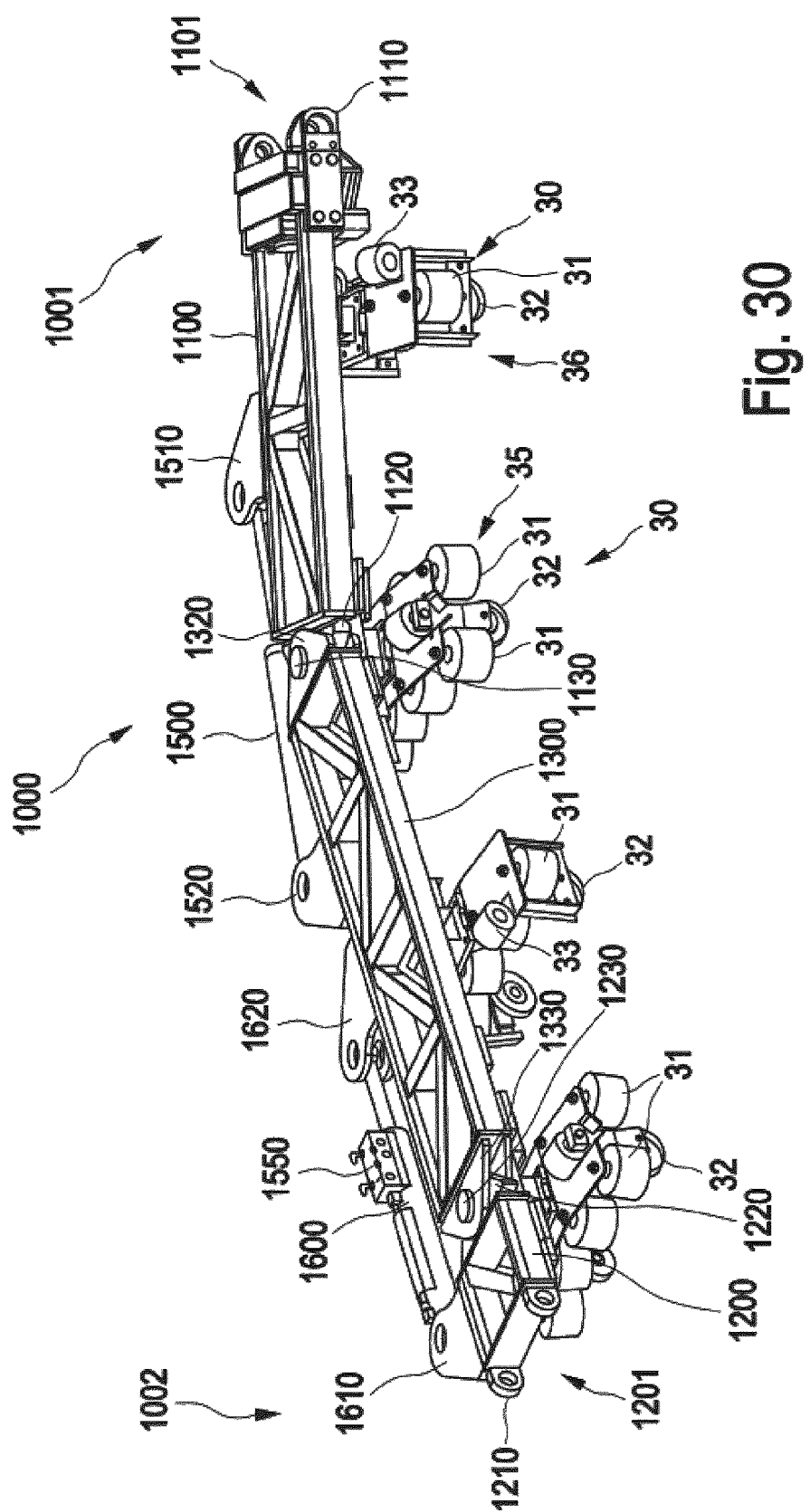
FIG. 30: shows a perspective view of the support structure according to FIG. 26 structure in a half-bent position.
Figure 31:
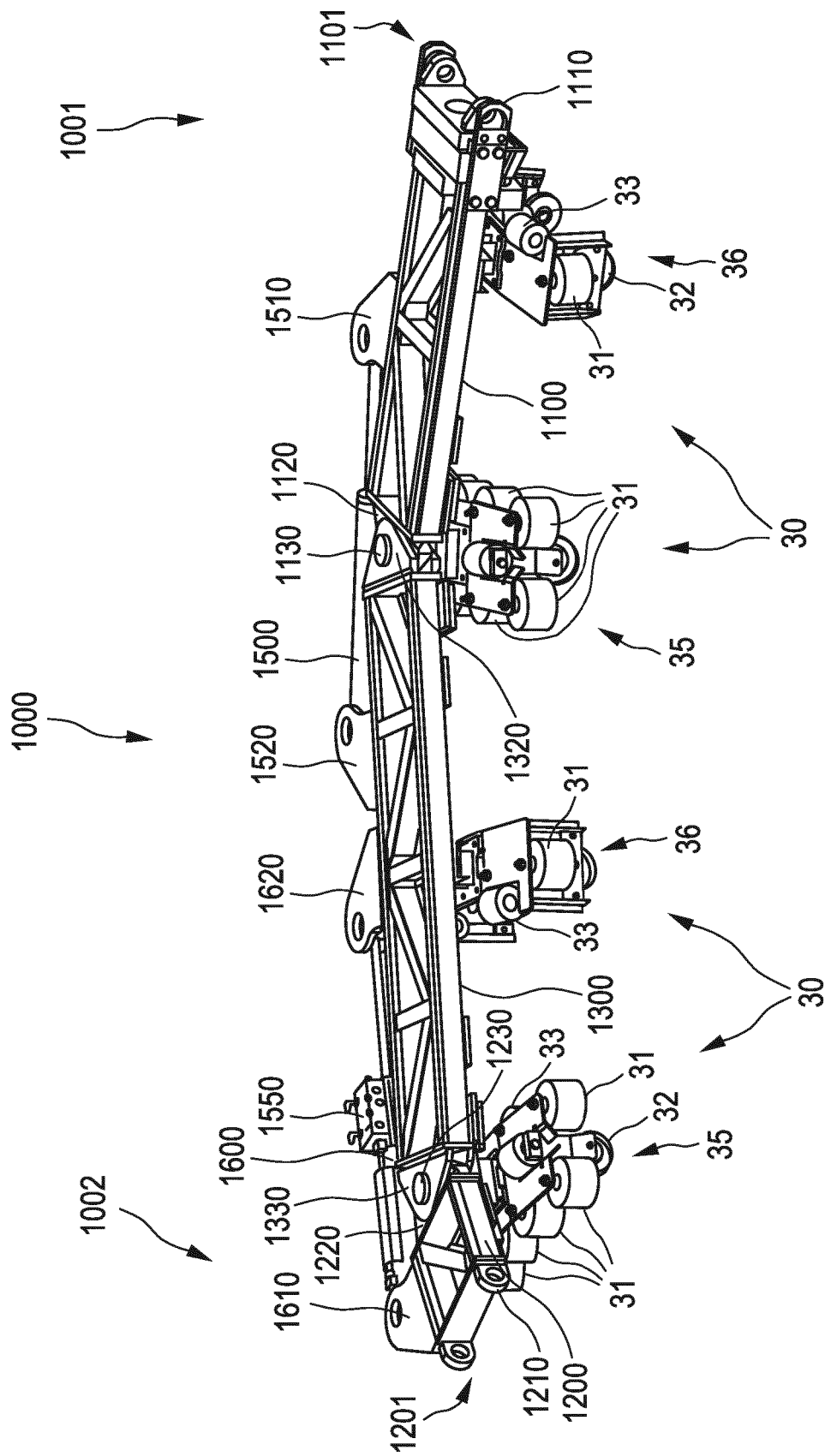
FIG. 31: shows a perspective view of the support structure according to FIG. 26 in a fully bent position.

FIGS. 26-31 show top and perspective view of a different embodiment of a support structure in straight, half-bent and fully bent positions, respectively. While FIGS. 26-28 show a top view of the support structure in straight, half-bent and fully bent positions, FIGS. 29-31 show a perspective view of these positions, respectively.

In this embodiment, the support structure extends between a first end 1001 and a second end 1002 and comprises a first end element 1100 with a main extension in a longitudinal direction L11, a width extension in a width direction W11 orthogonal to the longitudinal direction L11 and a height extension in a height direction H11 orthogonal to the longitudinal direction L11 and the width direction W11.

The support structure further comprises a second end element 1200 with a main extension in a longitudinal direction L11, a width extension in a width direction W11 orthogonal to the longitudinal direction L11 and a height extension in a height direction H11 orthogonal to the longitudinal direction L11 and the width direction W11.

The support structure also comprises a link element 1300 with a main extension in a longitudinal direction L11, a width extension in a width direction W11 orthogonal to the longitudinal direction L11 and a height extension in a height direction H11 orthogonal to the longitudinal direction L11 and the width direction W11.

The first end element 1100, the second end element 1200 and the link element 1300 all comprise a framework structure, with longitudinal and width extension exceeding the height extension. The support structure further comprises a plurality of guide assemblies 30 for engaging opposite longitudinal edges of a belt of an enclosed belt conveyor, which are in this embodiment partly adapted as full guide assemblies 36 and partly as double guide assemblies 35.

The first end element 1100 and the second end element 1200 both have an outer end 1101, 1201, respectively. Both outer ends 1101, 1201 comprise an end connector 1110, 1210, the first end connector 1110 and the second end connector 1210, respectively. The first and second end connectors 1110, 1210 both are adapted to form a connection with a transport unit and are in a ring-shaped form. The connection formed between the first end connector 1110 and the connector 270 of the crawler unit 205 is adapted to allow for a rotation about an axis parallel to the width direction W11 and about an axis parallel to the longitudinal direction L11. The connection formed between the second end connector 1210 and the connector 160 of the wheel unit 105 is adapted to allow for a rotation about an axis parallel to the width direction W11. The first end element 1100 and the second end element 1200 both have an inner connector 1120, 1220, respectively, while the link element 1300 has two inner connectors 1320, 1330 on opposite ends of the link element 1300 in a longitudinal direction L11.

In this embodiment the inner connector 1120 of the first end element 1100 forms a connection with one of the end connectors 1320 of the link element 1300 while the inner connector 1220 of the second end element 1200 forms a connection with the other, opposite inner connector 1330 of the link element. Both connections allow for a rotation about an axis parallel to the height direction H11 and are supported by a connecting pin 1130, 1230 of the first and second end element 1100, 1200, respectively. In this embodiment, the first end connector 1110 is fixed against a rotation about an axis parallel to the height direction H11, the second end connector 1210 is fixed against a rotation about an axis parallel to the height direction H11 and against a rotation about an axis parallel to the longitudinal direction L11, and the inner connectors 1120, 1220, 1320, 1330 are fixed against a rotation about an axis parallel to the width direction W11 and an axis parallel to the longitudinal direction L11, respectively. Between the first end element 1100 and the link element 1300 as well as between the second end element 1200 and the link element first and second telescopic elements 1500, 1600 are arranged, respectively. The first telescopic element 1500 is mounted on the first side to a first telescopic mounting element 1510, being arranged at the first end element 1100, and on the second side to a second telescopic mounting element 1520, being arranged at the link element 1300. Accordingly, the second telescopic element 1600 is mounted on the first side to a first telescopic mounting element 1610, being arranged at the second end element 1200, and on the second side to a second telescopic mounting element 1620, being arranged at the link element 1300. The first and second telescopic elements 1500, 1600 are each adapted as a hydraulic cylinder, preferably being powered by a hydraulic valve block, being arranged at either one or both of the wheel unit and/or the crawler unit. The first and second telescopic elements 1500, 1600 are further arranged to control a rotational movement about the inner connectors 1120, 1220, of the first and second end elements 1100, 1200, respectively. In this embodiment this is performed by the control unit 1550, arranged at the first telescopic element 1550. Further, the first and second telescopic elements 1500, 1600 are adapted to register a distance by which it is retracted and/or extended.

As can be seen from this embodiment, the first telescopic element 1500 is bridging the connection formed between the two inner connectors 1120, 1320 of the first end element 1100 and the link end element 1300 and the second telescopic element 1600 is bridging the connection formed between the two inner connectors 1220, 1330 of the second end element 1200 and the link element 1300.

In this embodiment there are two guide assemblies 30 in the form of full guide assemblies 35 arranged at the first end element. Further, there are two guide assemblies 30 in the form of full guide assemblies 35 arranged at the link element 1300. Two guide assemblies 30 in the form of double guide assemblies are arranged at the connection between the first end element 1100 and the link element 1300 and two guide assemblies 30 in the form of double guide assemblies 35 are arranged at connection between the second end element and the link element. The full guide assembly 36 comprises two side guide rollers 31, a top guide roller 33 and a lower guide roller 32, arranged to engage the opposite longitudinal edges of a belt of an enclosed belt conveyor. The double guide assembly 35 comprises two sets of two side guide rollers 31 each, a top guide roller 33 and a lower guide roller 32, wherein each set is arranged to engage the opposite longitudinal edges of a belt of an enclosed belt conveyor.

The position of the support structure 1000 shown in FIGS. 26 and 29, respectively, can be described as a straight position. In this straight position, the first end element 1100, the second end element 1200 and the link element are arranged in a substantially straight direction parallel to the longitudinal direction. This means that the neither of the first and second end element 1100, 1200 is rotated in a rotation about an axis parallel to the height direction H11 on the two connections formed by the inner connectors 1120, 1320, 1220, 1330. This position is used for a movement of a mobile haulage arrangement in a substantially straight direction, parallel to the longitudinal direction.

The position of the support structure 1000 shown in FIGS. 27 and 30, respectively, can be described as a half-bent position. In this half-bent position, the first end element 1100 is rotated in a rotation about an axis parallel to the height direction H11 on a connection formed by the inner connectors 1120, 1320, deflecting from the straight direction and forming a bend. The second end element 1200 is not rotated, still remaining in a straight direction with the link element 1300. To achieve the rotation of the first end element 1100, the first telescopic element 1500 is extended, thus pushing the first telescopic mounting element 1510 away from the second telescopic mounting element 1520. As the connection formed between the inner connectors 1120 and 1320 allows the first end element 1100 for a rotation about an axis parallel to the height direction H11 but is fixed against rotation about an axis parallel to the width direction W11 and an axis parallel to the longitudinal direction L11, the first end element is rotated about an axis parallel to the height direction H11 only. The amount of rotation about the axis parallel to the height direction is corresponding with the amount of extension of the telescopic element in relation to the extension in a straight position. In this embodiment it can be seen, that the double guide roller 35 arranged at the connection formed by the inner connectors 1120, 1320 is rotated by substantially the half of the amount of rotation of the first end element, thus allowing for a smooth bend of a belt engaged by the double guide roller 35.

The position of the support structure 1000 shown in FIGS. 28 and 31, respectively, can be described as a fully bent position. In this fully bent position, the first end element 1100 is rotated in a rotation about an axis parallel to the height direction H11 on a connection formed by the inner connectors 1120, 1320, deflecting from the straight direction and forming a bend. The second end element 1200 is also rotated in a rotation about an axis parallel to the height direction H11 on a connection formed by the inner connectors 1220, 1330, deflecting from the straight direction and forming a bend. To achieve the additional rotation of the second end element 1200, the first telescopic element 1600 is extended, thus pushing the second telescopic mounting element 1620 away from the first telescopic mounting element 1610. As the connection formed between the inner connectors 1220 and 1330 allows the second end element 1200 for a rotation about an axis parallel to the height direction H11 but is fixed against rotation about an axis parallel to the width direction W11 and an axis parallel to the longitudinal direction L11, the second end element is rotated about an axis parallel to the height direction H11 only. The amount of rotation about the axis parallel to the height direction is corresponding with the amount of extension of the telescopic element in relation to the extension in a straight position. In this embodiment it can be seen, that the double guide roller 35 arranged at the connection formed by the inner connectors 1220, 1330 is rotated by substantially the half of the amount of rotation of the first end element, thus allowing for a smooth bend of a belt engaged by the double guide roller 35. It has to be understood that in this embodiment various bending positions of the first end element 1100, the second end element 1200 and the link element 1300 towards another can be realized.

Figure 32:
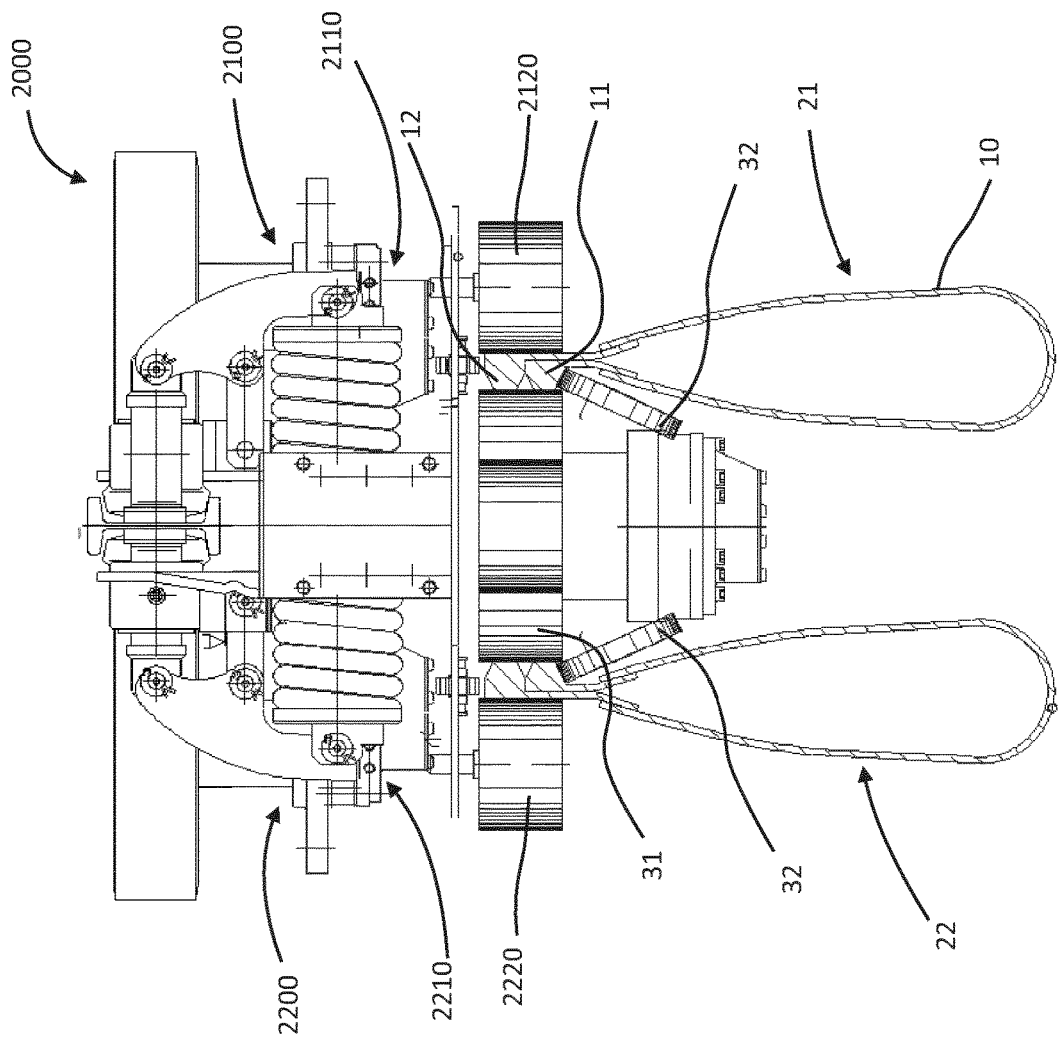
FIG. 32: shows a cross-sectional side view of a drive arrangement.

FIG. 32 shows a cross-sectional side view of a drive arrangement 2000. The drive arrangement 2000 is used to drive both, the belt 10 of the conveyor run 21 and the belt 10 of the return run 22 in the conveying direction 2 and the opposite, return direction 3, respectively. Such a conveying direction is indicated, for example, in FIGS. 2a and 2b as described herein.

The drive arrangement 2000 comprises a conveyor drive assembly 2100 and a return drive assembly 2200. The conveyor drive assembly 2100 comprises a conveyor drive unit 2110. The conveyor drive unit 2110 is adapted to actuate a conveyor run drive roller 2120 with a predetermined torque. Similarly, the return drive assembly 2200 comprises a return drive unit 2210. Said return drive unit 2210 is adapted to actuate a return drive roller 2220 with a predetermined torque. The predetermined torque with which the conveyor run drive roller 2120 and the return run drive roller 2220 are driven is the same for both drive rollers and is controlled by a control unit (not shown) comprised in the drive arrangement 2000.

In order to drive the belt 10 of the conveyor run 21 in the conveying direction 2, the conveyor run drive roller 2120 is brought into friction contact with that side of the enclosed belt conveyor that is opposite to the one on which the two wedge-shaped profiles constituting the two opposite longitudinal edges 11, 12 are arranged. When the conveyor run drive roller 2120 is driven at the predetermined torque, the momentum of said torque is transferred to the belt 10, thereby moving the belt 10 in the conveying direction 2 at a velocity resulting from the torque applied. In addition to the conveyor drive roller 2120, an idle roller 34 and a lower guide roller 32 are brought into contact with the belt 10 of the conveyor run 21 such as to guide the belt 10 of the conveyor run 21 to the drive arrangement. The idle roller 34 is arranged on the side of the belt 10 that is opposite to the side on which the conveyor drive roller 2120 is arranged. The lower guide roller 32 is arranged below the two opposite longitudinal edges 11, 12 and brought into contact with the first one of the two opposite longitudinal edges 11. The idle roller 34 and the lower guide roller 32 are not actively actuated by the conveyor drive unit 2110. Alternatively, the idle roller 34 could be provided as a second conveyor drive roller or the position of the conveyor drive roller 2120 and the idle roller 34 could be exchanged The belt 10 of the return run 22 is driven in the return direction 3 by a respective return drive roller 2220, arranged at the belt 10 of the return run in a similar manner as the conveyor run drive roller 2120. The return drive roller 2220 is driven by the return drive unit 2210 at the same torque as applied on the conveyor drive roller 2120. The belt 10 of the return run 22 is also guided to the return drive assembly by an idle roller 34 arranged on the opposite side of the belt 10 as the return drive roller 2220 in contact with the opposite longitudinal edges 11, 12 of the enclosed belt conveyor 20 and by a lower guide roller 32, arranged below the first one of the two opposite longitudinal edges 11. Again, the idle roller 34 could also be a second return drive roller instead or the position of the return drive roller 2220 and the idle roller 34 could be exchanged.

Driving both, the conveyor run drive roller 2120 and the return run drive roller 2220 with the same predefined torque causes a constant movement of the enclosed belt conveyor 20, also when the enclosed belt conveyor 20 drives a along a curved path, as shown, for example, in FIG. 2b. FIG. 2b shows a mobile haulage arrangement 1 comprising an enclosed belt conveyor (not shown) for conveying fragmented material from the loading end 70 to the discharge end 80. The mobile haulage arrangement is arranged in inside bends 5, 7 and outside bends 6, 8.

In order to convey the fragmented material in the conveying direction 2, as indicated in FIG. 2a, the enclosed belt conveyor 20 has to, for example, drive through inside bent 7 and outside bend 6 of the mobile haulage arrangement. Accordingly, when returning from the discharge end 80 to the loading end 70, the enclosed belt conveyor 20 has to drive inside bend 5 and outside bend 8. The inside bend 5 has a smaller bending radius than the outside bend 6. Likewise, the inside bend 7 has a smaller bending radius than the outside bend 8. In order to achieve a continuous movement of the enclosed belt conveyor in this case, the enclosed belt conveyor has to drive through the outside bends 6 and 8 with an increased velocity compared to the movement in a substantially straight direction. Further to that, the enclosed belt conveyor 20 has to drive through the inside bends 5 and 7 with a reduced velocity compared to the movement in substantially strait direction.

Since the velocity that is effected by a predetermined torque depends on the radius of the bending of the enclosed belt conveyor 20, the velocity is automatically adjusted to be lower or higher when the enclosed belt conveyor drives through the left and right outside and inside bending along the curved path. In particular, since the actuation of the conveyor drive roller 2120 and the return drive roller 2220 is torque-controlled, both drive rollers will continue to apply this torque, even if the resulting velocity changes due to a change in bending radius of the mobile haulage arrangement and, thus, a change in direction of the enclosed belt conveyor 20.

In the example of FIG. 2b that means that the belt 10 of the conveyor run 21 is automatically—by means of the torque in combination with a respective bending radius—actuated to drive at a decreased velocity at the right inside bend 7 and to drive at an increased velocity at the left outside bend 6. The belt 10 of the return run is also actuated, by the bending radius of the inside and outside bends, to drive at a decreased velocity through the left inside bend 5 and at an increased velocity through the right outside bend 8.

This way a continuous movement of the enclosed belt conveyor 20 can be achieved, even in cases where the enclosed belt conveyor 20 has to drive along a curved path, allowing for an adjustment of the velocity of each drive arrangement at each position of the enclosed belt conveyor 20. In particular, this way it is possible to drive both, the belt 10 of the conveyor run 21 and the belt 10 of the return run 22 using the same drive arrangement 2000.

Figure 33:
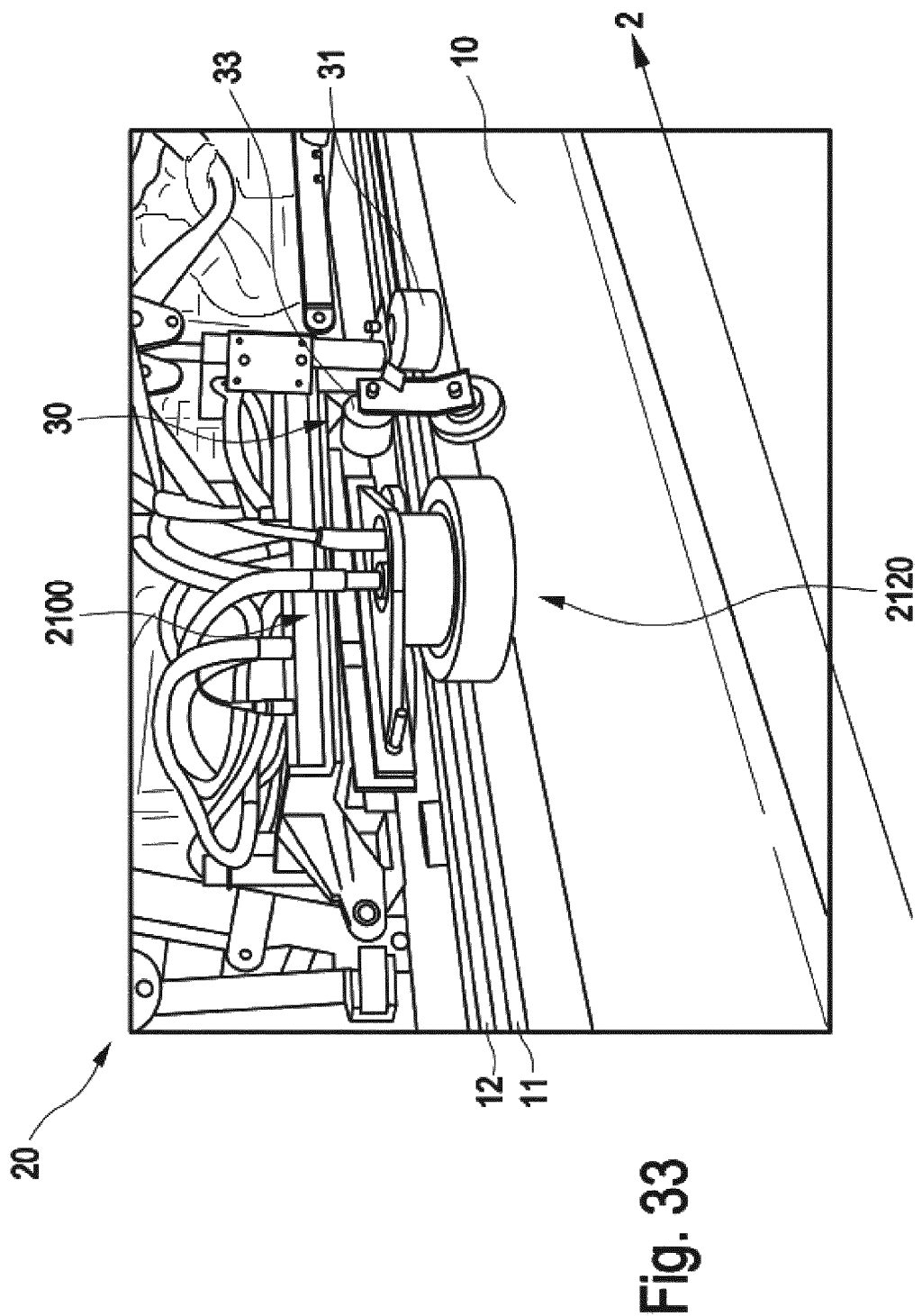
FIG. 33: shows a perspective view of a mounted drive arrangement.
Figure 34:
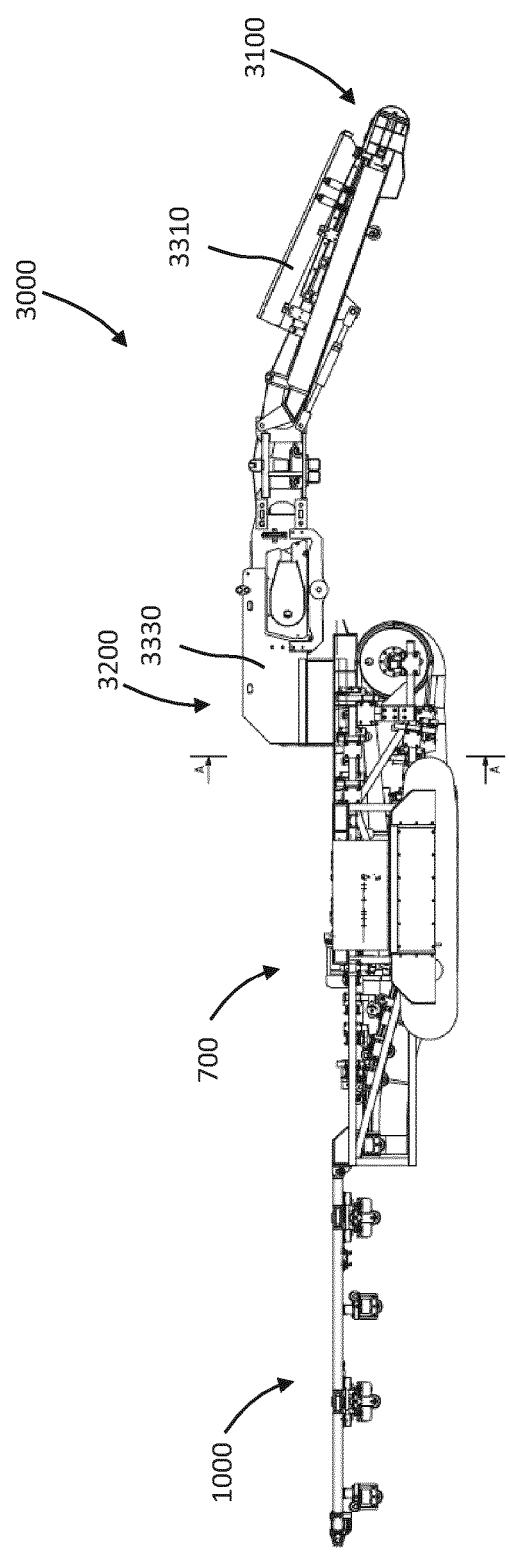
FIG. 34: shows a side view of a bridge structure of a mobile haulage arrangement.
Figure 35:
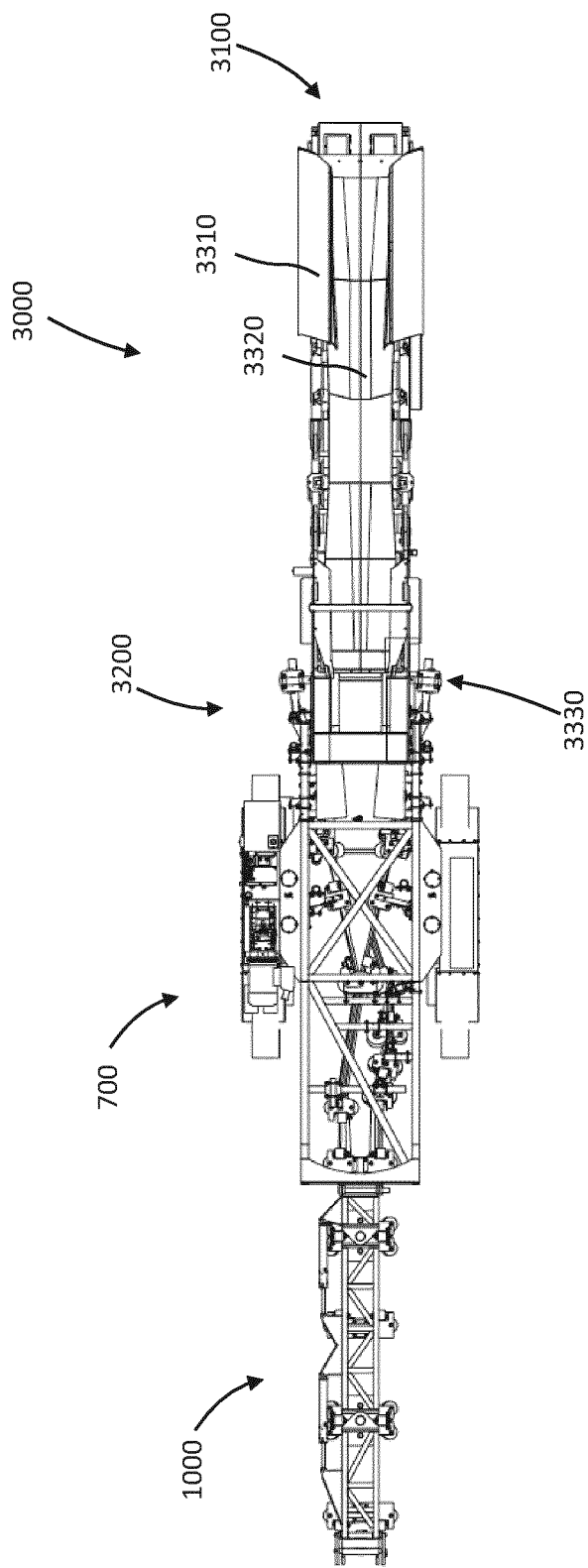
FIG. 35: shows a top view of the bridge structure according to FIG. 34.
Figure 36:
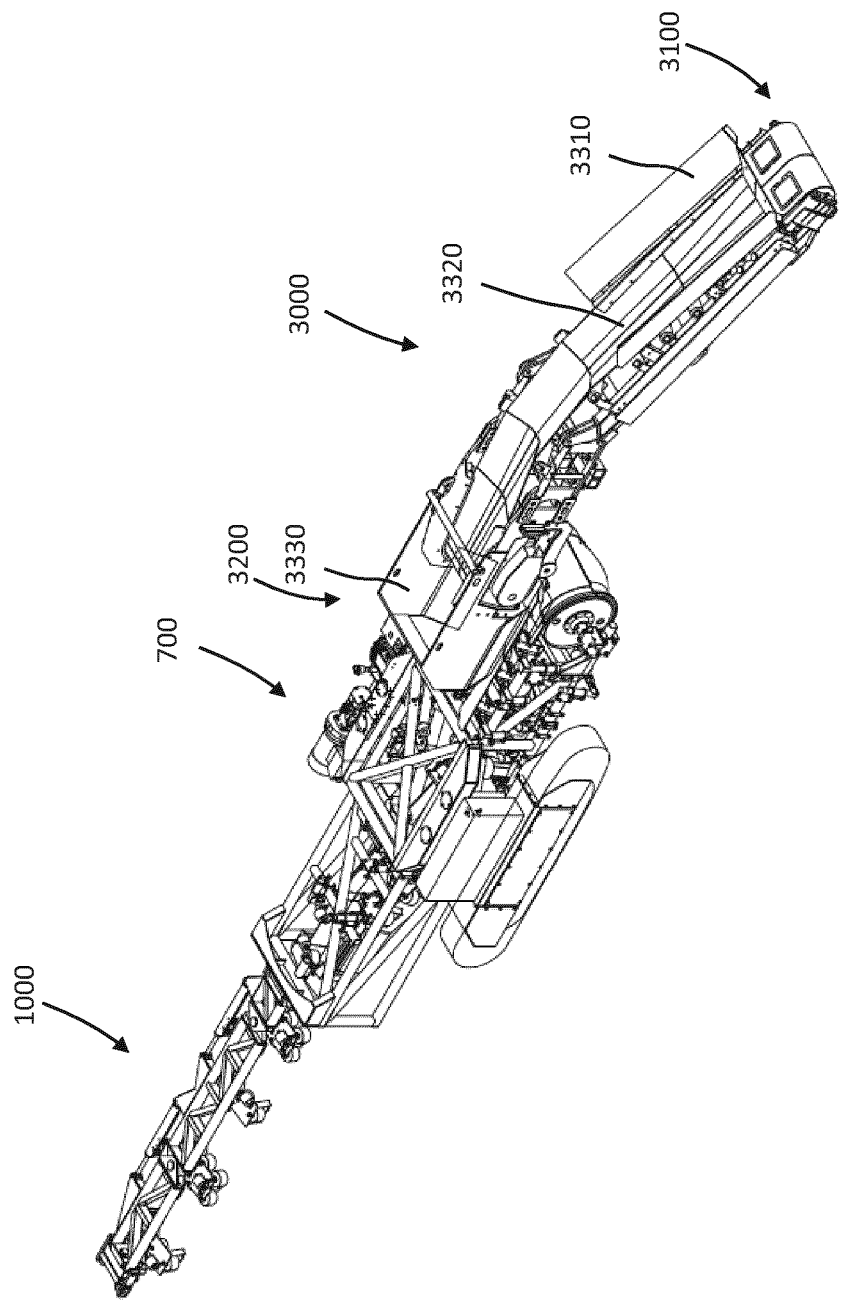
FIG. 36: shows a perspective view of the bridge structure according to FIG. 34.
Figure 37:
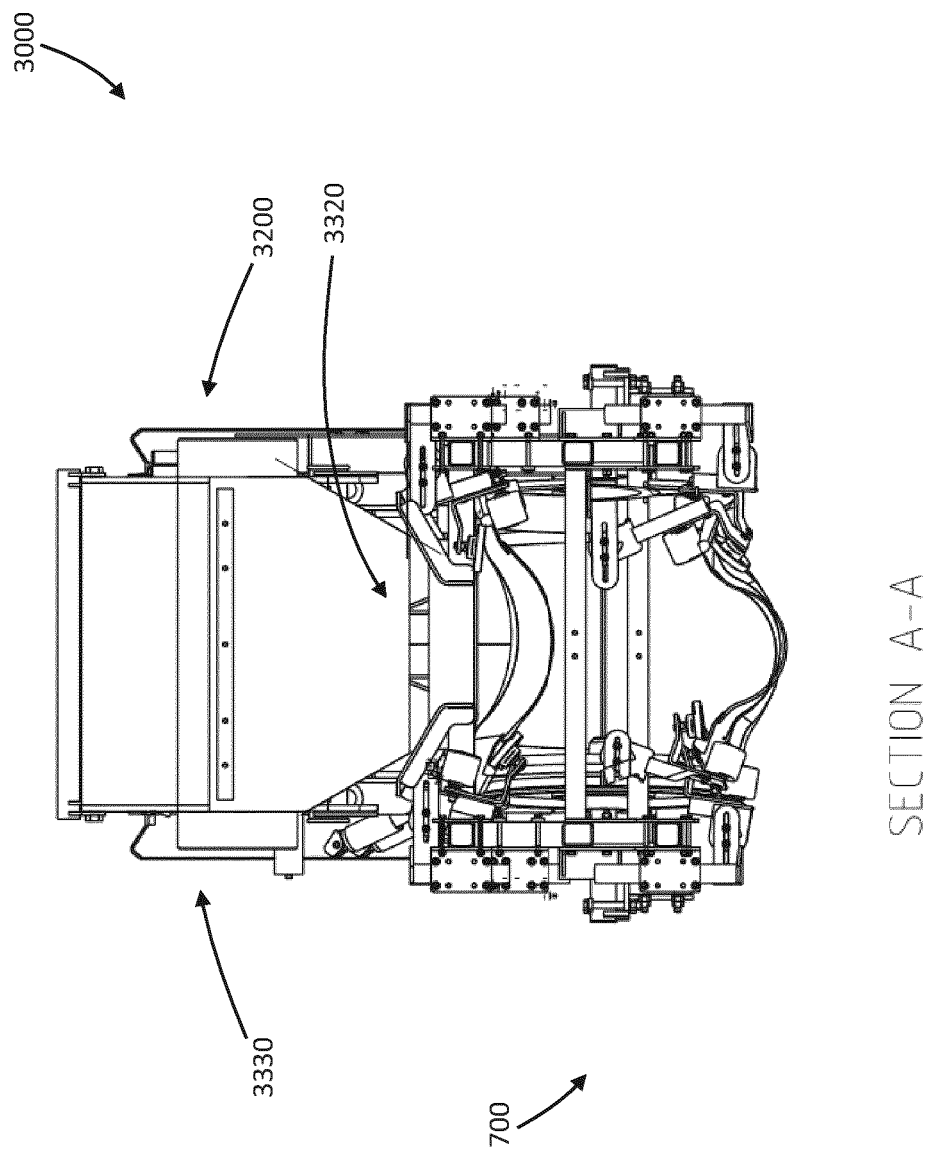
FIG. 37: shows a cross-sectional view view of the bridge structure according to section A-A indicated in FIG. 34.

FIG. 33 shows a perspective view of a part of a drive arrangement 2000 for an enclosed belt conveyor 20. The conveyor run of enclosed conveyor belt 20 is driven in the conveying direction 2 by the drive assembly 2100 In this case, conveyor run drive 2120 is brought into friction contact with the front side of the two opposite longitudinal edges 11, 12 of the belt 10. A guide assembly 30 is provided upstream of the drive assembly. The guide assembly 30 comprises a top guide roller 33 and a side guide roller 31. The top guide roller 33 and side guide roller 31 are in friction contact with the enclosed belt conveyor 20. They are used to guide the belt 10 of the enclosed belt conveyor 20 away from the drive assembly 2100. During movement of the enclosed belt conveyor 20, top guide roller 33 rotates around its center axis, which is substantially parallel to the ground if the mobile haulage arrangement is provided in a basic operation position on a substantially horizontal ground. Side guide roller 31 also rotates around its center axis, which is substantially orthogonal to the ground if the mobile haulage arrangement is provided in a basic operation position on a substantially horizontal ground. Albeit not shown, a similar arrangement is provided for the belt 10 of the return run 22.

Figure 38:
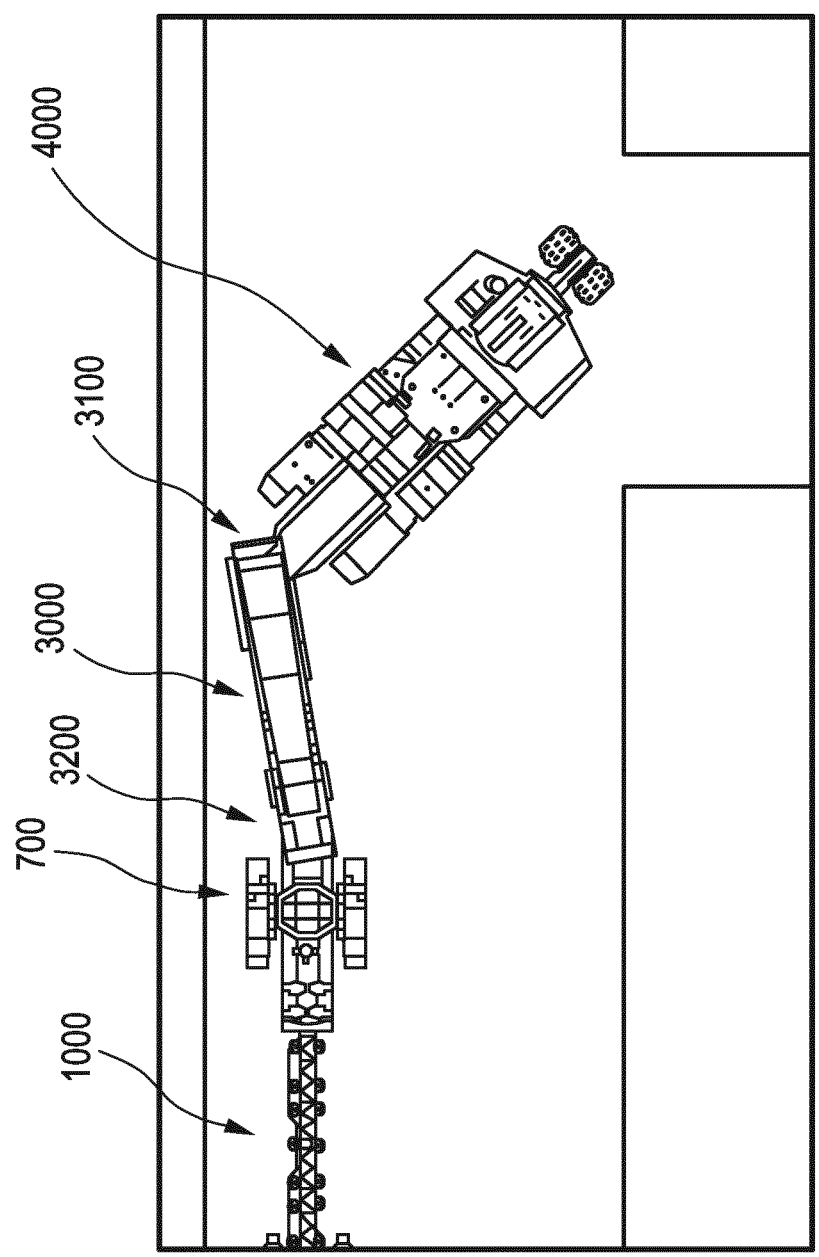
FIG. 38 shows a top view of the bridge structure according to FIG. 34 with the bridge structure inclined relative to the loading unit and the cutting or mining device.

FIGS. 34-38 show a bridge structure 3000 of a mobile haulage arrangement. FIG. 38 shows a top view of the bridge structure 3000 with the bridge structure 3000 inclined relative to the loading unit 700 and the cutting or mining device 4000.

The receiving fragmented material is conveyed via a conveyor 3320 of the bridge structure 3000 from the cutting or mining device 4000 to the loading unit 700.

The bridge structure 3000 is with its first end 3100 connected to the un cutting or mining device 4000 via a universal joint allowing for a rotational movement about a substantially vertical axis and/or a rotational movement about one or two substantially horizontal axes (in a basic operation position of the mobile haulage arrangement and the cutting or mining device on a substantially horizontal ground), as can be seen in particular in FIG. 38. An input chute 3310 is provided at the first end 3100 of the bridge structure 3000 to provide spillage of fragmented material.

The second end 3200 of the bridge structure 3000 provides the fragmented material via an output chute 3330 to the loading unit 700. As can be seen from FIG. 38, also the connection at the second end 3200 of the bridge structure 3000 allows at least for a rotational movement about a substantially vertical axis (in a basic operation position of the mobile haulage arrangement and the cutting or mining device on a substantially horizontal ground). The second end 3200 of the bridge structure 3000 can also be referred to as trolley.

LIST OF REFERENCE NUMBERS 1 mobile haulage arrangement
1a mobile haulage arrangement alternative setup
2 conveying direction
3 opposite direction
4 fragmented material
5 left inside bend
6 left outside bend
7 right inside bend
8 right outside bend
10 belt
11 opposite longitudinal edge
12 opposite longitudinal edge
13 belt edge core
20 enclosed belt conveyor
21 conveyor run
22 return run
30 guide assembly
31 side guide roller
32 lower guide roller
33 top guide roller
34 idle roller
35 double guide assembly
36 full guide assembly
37 single guide assembly
38 half guide assembly
41 side guide mounting means
42 lower guide roller bearing
70 loading end of mobile haulage arrangement
80 discharge end of mobile haulage arrangement
100 transport unit
105 wheel unit
110 ground transportation structure of wheel unit
111 wheel
112 wheel
115 brake unit
120 ground transportation structure of wheel unit
121 wheel
122 wheel
130 support frame of wheel unit
140 height adjustment device of wheel unit
141 height adjustment support structure
142 height adjustment support structure
150 height adjustment device of wheel unit
151 height adjustment support structure
152 height adjustment support structure
160 connector of wheel unit
170 connector of wheel unit
205 crawler unit
210 ground transportation structure of crawler unit
211 crawler track
212 main crawler drive means
213 auxiliary crawler drive means
215 crawler drive
216 crawler chain
220 ground transportation structure of a crawler unit
221 crawler track
225 crawler spike
226 crawler spike
227 crawler spike
230 support frame of crawler unit
240 height adjustment device
241 height adjustment support structure
242 height adjustment support structure
250 height adjustment device
251 height adjustment support structure
252 height adjustment support structure
260 connector
270 connector
280 operation unit
300 material transfer unit
400 material transfer unit
500 material transfer structure
510 base frame
511 first end of base frame
512 second end of base frame
513 lower side of second end of base frame
514 first, inclined section adjacent first end of base frame
515 second, less inclined section adjacent second end of base frame
540 rolling means
541 return disc
542 return disc
543 roller
560 connector
570 loading arrangement
580 support rollers
600 material transfer structure
610 base frame
611 first end of base frame
612 second end of base frame
613 lower side of second end of base frame
614 first, inclined section adjacent first end of base frame
615 second, less inclined section adjacent second end of base frame
616 part of base frame
617 part of base frame
618 hydraulic cylinder mounting element
619 translational movement in conveying direction
620 hydraulic cylinder
640 rolling means
641 return disc
642 return disc
643 roller
660 connector
670 discharge arrangement
700 loading unit
800 discharge unit
1000 support structure
1001 first end of support structure
1002 second end of support structure
1100 first end element
1101 outer end of first end element
1110 first end connector
1120 inner connector of first end element
1130 connecting pin of first end element
1200 second end element
1201 outer end of second end element
1210 second end connector
1220 inner connector of second end element
1230 connecting pin of second end element
1300 link element
1320 inner connector of link element
1330 inner connector of link element
1500 first telescopic element
1510 first telescopic mounting element
1520 second telescopic mounting element
1550 telescopic element control unit
1600 second telescopic element
1610 first telescopic mounting element
1620 second telescopic mounting element
2000 drive arrangement
2100 conveyor drive assembly 2110 conveyor drive unit
2120 conveyor run drive roller
2200 return drive assembly
2210 return drive unit
2220 return run drive roller
2300 control unit
2500 master drive arrangement
2600 auxiliary drive arrangement
3000 bridge structure
3100 first end of bridge structure
3200 second end of bridge structure
3310 input chute of bridge structure
3320 conveyor of bridge structure
3330 output chute of bridge structure
4000 cutting or mining device
A30 angle between side roller center axis and longitudinal belt edge
A31 angle between longitudinal belt edge before and after side roller engagement
A32 angle between virtual tangential lines
H11 height direction
H12 height of second end element
H13 height of link element
L1 length of mobile haulage arrangement
L1a length of mobile haulage arrangement alternative setup
L5 length of material transfer structure
L6 length of material transfer structure
L7 length of loading unit
L8 length of discharge unit
L10 length of support structure
L11 longitudinal direction
L12 length of second end element
L13 height of link element
R1 radius
R2 radius
R3 radius
R4 radius
W1 width between belt edge core and belt edge
W11 width direction
W12 width of second end element
W13 width of link element
XE center axis
XS center axis

The invention claimed is:

1. A support structure for supporting an enclosed belt conveyor between two transport units, the support structure comprising
a first end element having a main extension in a longitudinal direction, a width extension in a width direction orthogonal to the longitudinal direction, and a height extension in a height direction orthogonal to the longitudinal and the width direction;
at least one guide assembly arranged to engage opposite longitudinal edges of a belt of an enclosed belt conveyor; and
a first telescopic element connected to the first end element, wherein an outer end of the first end element has a first end connector arranged to form a connection with a first transport unit, the connection allowing for rotation about an axis parallel to the width direction and about an axis parallel to the longitudinal direction, the first end element having an inner connector arranged to form a connection allowing for rotation about an axis parallel to the height direction, and the first telescopic element being arranged to form a connection with a second end element, a link element, or a transport unit connected to the inner connector of the first end element.

2. The support structure according to claim 1, wherein the first telescopic element is arranged to control a rotational movement about the inner connector of the first end element.

3. The support structure according to claim 1, further comprising a second end element having a main extension in a longitudinal direction, a width extension in a width direction orthogonal to the longitudinal direction and a height extension in a height direction orthogonal to the longitudinal and the width direction, wherein an outer end of the second end element has a second end connector arranged to form a connection with a second transport unit, the connection allowing for rotation about an axis parallel to the width direction, the second end element having an inner connector arranged to form a connection allowing for rotation about an axis parallel to the height direction.

4. The support structure according to claim 3, further comprising a link element having a main extension in a longitudinal direction, a width extension in a width direction orthogonal to the longitudinal direction and a height extension in a height direction orthogonal to the longitudinal and the width direction, the link element having two opposite inner connectors, each inner connector being arranged to form a connection allowing for rotation about an axis parallel to the height direction.

5. The support structure according to claim 4, further comprising a second telescopic element connected to the second end element, wherein the second telescopic element is arranged to form a connection with the link element connected to the inner connector of the second end element.

6. The support structure according to claim 5, wherein the second telescopic element is arranged to control a rotational movement about the inner connector of the second end element.

7. The support structure according to claim 3, wherein the first end connector is fixed against rotation about an axis parallel to the height direction and/or the second end connector is fixed against rotation about an axis parallel to the height direction and/or an axis parallel to the longitudinal direction and/or the inner connectors are fixed against rotation about an axis parallel to the width direction and/or an axis parallel to the longitudinal direction.

8. The support structure according to claim 3, wherein the inner connectors of the first and second end elements are connected to each other, the inner connector of the first end element is connected to one of the inner connectors of the link element, and the inner connector of the second end element is connected to the other one of the inner connectors of the link element.

9. The support structure according to claim 3, wherein the first telescopic element is arranged to bridge at least one connection formed between two inner connectors, and/or the second telescopic element is arranged to bridge at least one connection formed between two inner connectors.

10. The support structure according to claim 5, wherein the first and/or the second telescopic element is a hydraulic cylinder.

11. The support structure according to claim 5, wherein the first and/or the second telescopic element is arranged to register a distance by which it is retracted and/or extended.

12. The support structure according to claim 3, wherein the at least one guide assembly is arranged at at least one connection formed between two inner connectors such that the guide assembly is rotatable about an axis parallel to the height direction.

13. The support structure according to claim 12, wherein the at least one guide assembly arranged at the at least one connection formed between two inner connectors includes at least two sets of guide rollers, wherein each set of guide rollers is arranged to engage opposite longitudinal edges of the belt of the enclosed belt conveyor.

14. The support structure according to claim 3, wherein the first and/or the second end connector is arranged to limit the rotation about the axis parallel to the width direction and/or that the first end connector is arranged to limit the rotation about the axis parallel to the longitudinal direction.

15. The support structure according to claim 3, wherein the inner connectors and/or the first and/or the second telescopic element and/or the at least one guide assembly arranged at at least one connection formed between two inner connectors is arranged to limit the rotation about an axis parallel to the height direction.

16. The support structure according to claim 3, wherein the first end element and/or the second end element and/or the link element is a framework element with longitudinal and width extensions exceeding the height extension.

17. The support structure according to claim 1, wherein the support structure is free of ground supporting elements.

18. The support structure according to claim 4, wherein a combined extension along the longitudinal direction of the first and second end element and a link element is about 6 m.

19. A method for supporting an enclosed belt conveyor between two transport units, the method comprising:
providing a support structure, the support structure including a first end element having a main extension in a longitudinal direction, a width extension in a width direction orthogonal to the longitudinal direction, and a height extension in a height direction orthogonal to the longitudinal and the width direction, at least one guide assembly arranged to engage opposite longitudinal edges of a belt of the enclosed belt conveyor, a first telescopic element connected to the first end element, and a second end element having a main extension in a longitudinal direction, a width extension in a width direction orthogonal to the longitudinal direction and a height extension in a height direction orthogonal to the longitudinal and the width direction, the second end element having an inner connector arranged to form a connection allowing for rotation about an axis parallel to the height direction, wherein an outer end of the first end element has a first end connector arranged to form a connection with a first transport unit, the connection allowing for rotation about an axis parallel to the width direction and about an axis parallel to the longitudinal direction, the first end element having an inner connector arranged to form a connection allowing for rotation about an axis parallel to the height direction, and the first telescopic element being arranged to form a connection with a second end element, a link element, or a transport unit connected to the inner connector of the first end element, and wherein an outer end of the second end element has a second end connector arranged to form a connection with a second transport unit, the connection allowing for rotation about an axis parallel to the width direction;

connecting the first end connector to a first transport unit; and connecting the second end connector to a second transport unit.

* * * * *